US012657273B2

(12) United States Patent     (10) Patent No.:   US 12,657,273 B2

Schillen et al.     (45) Date of Patent:    Jun. 16, 2026

(54) FACE AUTHENTICATION INCLUDING MATERIAL DATA EXTRACTED FROM IMAGE

(71) Applicant: TRINAMIX GMBH, Ludwigshafen Am Rhein (DE)

(72) Inventors: Peter Schillen, Mannheim (DE); Benjamin Guthier, Mannheim (DE); Nicolas Wipfler, Ludwigshafen am Rhein (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 121 days.

(21) Appl. No.: 18/728,108

(22) PCT Filed: Feb. 13, 2023

(86) PCT No.: PCT/EP2023/053423

§ 371 (c)(1),
(2) Date: Jul. 11, 2024

(87) PCT Pub. No.: WO2023/156315

PCT Pub. Date: Aug. 24, 2023

(65) Prior Publication Data

US 2025/0094553 A1    Mar. 20, 2025

(30) Foreign Application Priority Data

Feb. 15, 2022    (EP) ..................................... 22156892

(51) Int. Cl.
    *G06F 21/00*     (2013.01)
    *G06F 21/32*     (2013.01)

(52) U.S. Cl.
    CPC .................................. *G06F 21/32* (2013.01)

(58) Field of Classification Search
CPC .... G06F 21/32; G06V 10/141; G06V 10/147; G06V 40/168; G06V 40/172; G06V 40/40;

(Continued)

(56) References Cited

U.S. PATENT DOCUMENTS

2015/0347833 A1* 12/2015 Robinson ............... G01B 11/25
                                          348/49
2018/0373923 A1   12/2018 Negi et al.

(Continued)

FOREIGN PATENT DOCUMENTS

| CN | 106407914 A | 2/2017 |
| EP | 3623995 A1 | 3/2020 |
| WO | 2018091638 A1 | 5/2018 |
| WO | 2018091640 A2 | 5/2018 |
| WO | 2018091649 A1 | 5/2018 |
| WO | 2020187719 A1 | 9/2020 |

OTHER PUBLICATIONS

Eichler, et al., "Wirkung von Luerstrahlung auf Gewebe (Effect of Luer radiation on tissue)", Lasertechnik in der Medizin: Grundlagen, Systeme, Anwendungen (Laser technology in medicine: basics, systems, applications), pp. 171-266 (1991).

(Continued)

*Primary Examiner* — William A Corum, Jr.

(74) *Attorney, Agent, or Firm* — Armstrong Teasdale LLP

(57) ABSTRACT

Disclosed herein is a method for authorizing an object of a device to perform at least one operation on the device that requires authentication, including the steps:

receiving, from a user interface associated with a device, an unlock request for the device from a user;

in response to receiving the unlock request, triggering illumination of the object with patterned infrared illumination;

triggering to capture at least one image of the object using a camera located on the device while the object is being illuminated with the patterned infrared illumination;

(Continued)

extracting material data from at least one image; and allowing or declining the object to perform at least one operation on the device that requires authentication based on the material data.

18 Claims, 15 Drawing Sheets

(58) Field of Classification Search
CPC ...... G06V 40/161; G06V 10/26; G06V 10/54; G06V 10/774; G06T 2210/12; G06T 2210/22
See application file for complete search history.

(56) References Cited

U.S. PATENT DOCUMENTS

| | | | |
|---|---|---|---|
| 2019/0080149 A1 | 3/2019 | Gernoth et al. | |
| 2020/0082155 A1* | 3/2020 | Kalscheur | G06V 10/141 |
| 2020/0134344 A1* | 4/2020 | Joshi | G06V 10/431 |
| 2022/0245964 A1* | 8/2022 | Levinski | G06V 10/141 |
| 2025/0061180 A1* | 2/2025 | Lennartz | G06V 40/40 |

OTHER PUBLICATIONS

International Search Report for PCT/EP2023/053423 dated Feb. 27, 2023, 4 pages.

Written Opinion for PCT/EP2023/053423 dated Feb. 27, 2023, 8 pages.

Dahad, "Beam Profile Analysis Beats Facial Recognition Cheats", accessed from https://www.eetimes.com/beam-profile-analysis-beats-facial-recognition-cheats/.

Pascu, "trinamiX's beam profile analysis boosts biometric facial recognition on mobile devices", accessed from https://www.biometricupdate.com/202007/trinamixs-beam-profile-analysis-boosts-biometric-facial-recognition-on-mobile-devices.

Stein, "Your future face-scanning phone could check for live skin", accessed from https://www.cnet.com/tech/mobile/your-future-face-scanning-phone-could-check-for-live-skin/.

Anonymous, "Secure face authentication behind OLED for unlock and mobile payment", accessed from www.trinamixsensing.com/media/product_brief_face_unlock_and_mobile_payment.pdf.

Anonymous, "trinamiX Face Authentication is the first to be certified as highly secure behind OLED", accessed from https://trinamixsensing.com/news-events/press/trinamix-face-authentication-is-the-first-to-be-certified-as-highly-secure-behind-oled/.

* cited by examiner

FIG.4

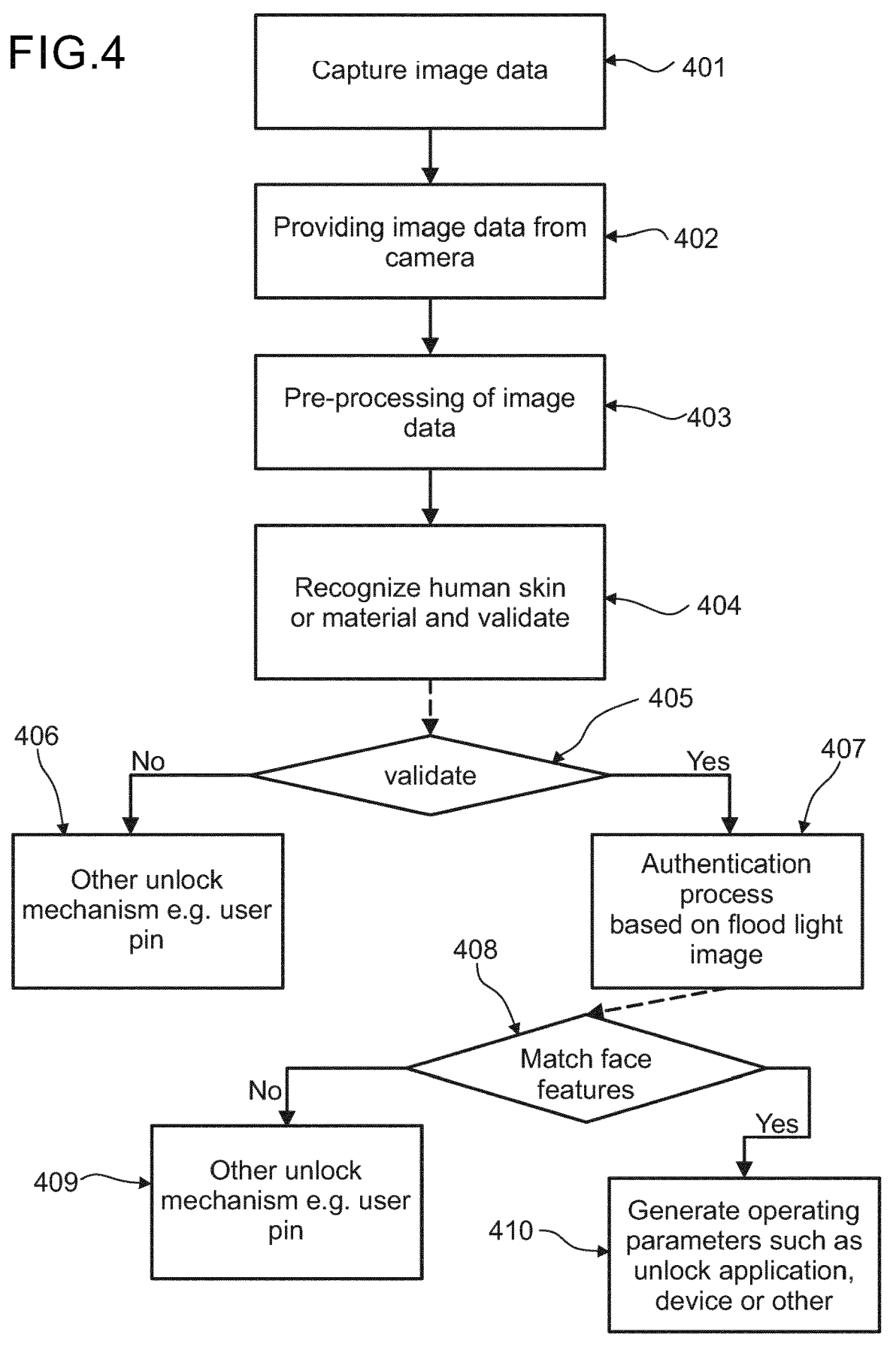

Capture image data — 401

Providing image data from camera — 402

Pre-processing of image data — 403

Recognize human skin or material and validate — 404

405

406    No    validate    Yes    407

Other unlock mechanism e.g. user pin

Authentication process based on flood light image

408

Match face features

No    409    Other unlock mechanism e.g. user pin

Yes

410    Generate operating parameters such as unlock application, device or other 2D image Dot pattern

420

421

422

2D image

Dot pattern

601

602

603

FACE AUTHENTICATION INCLUDING MATERIAL DATA EXTRACTED FROM IMAGE

CROSS-REFERENCE TO RELATED APPLICATIONS

This application is a U.S. National Phase Application of International Patent Application No. PCT/EP23/53423, filed Feb. 13, 2023, and claims priority to European Patent Application No. 22156892.6, filed Feb. 15, 2022, each of which are hereby incorporated by reference herein.

FIELD OF THE INVENTION

The invention relates to a method, an apparatus and a computer program for identifying an object, in particular, for authenticating an object.

BACKGROUND OF THE INVENTION

In the prior art material detection from images may be conducted through filtering techniques. Such techniques analyse the beam profile and require intensive computing resources and in some instances may not deliver the required reliability. Hence there is a need to improve material detection in terms of reliability and computing expenses.

SUMMARY OF THE INVENTION

It is therefore an object of the present invention to provide methods and apparatuses facing the above-mentioned technical challenges. Specifically, it is an object of the present invention to provide a method and apparatus for reliable identification of materials in general. Further, a reliable identifying and/or authenticating of an object or person is aimed to be achieved, in particular, for situations where a user of a device shall be authorized to perform at least one operation on the device that requires authentication. In particular, it is an object to provide a method and apparatus that reliably identify at least one material information of an object or the object itself, preferably with a low technical effort and with low requirements in terms of technical resources and cost, and even in complex situations, e.g. where the object comprises or is covered by various, and possibly, unwished materials.

This technical problem is solved by the technical subject-matter with the features of the independent patent claims. Advantageous technical embodiments of the invention, which can be realized individually or in combination, are presented in the dependent claims and/or in the following specification and/or the embodiments described with respect to the drawings.

In a first aspect of the present invention the technical problem of the invention is solved by a computer implemented method for extracting material information of an object from a pattern image of the object, wherein the method comprises: receiving the pattern image showing the object; manipulating the pattern image to generate a partial image; extracting material information of the object from the partial image by providing the partial image to a data-driven model, wherein the data-driven model is parametrized according to a training data set including partial images and material information; providing the extracted material information.

In another aspect, the disclosure relates to a method for authorizing an object of a device to perform at least one operation on the device that requires authentication, comprising the steps: receiving, from a user interface associated with a device, an unlock request for the device from a user; in response to receiving the unlock request, triggering illumination of the object with patterned infrared illumination; triggering to capture at least one image of the object using a camera located on the device while the object is being illuminated with the patterned infrared illumination; extracting material data from at least one image; and allowing or declining the object to perform at least one operation on the device that requires authentication based on the material data.

In another aspect, the disclosure relates to a device for authorizing a user of a device to perform at least one operation on the device that requires authentication, the device comprising a processor configured to perform the following steps:

receiving, from a user interface associated with a device, an unlock request for the device from a user;

in response to receiving the unlock request, triggering illumination of the user with patterned infrared illumination;

triggering to capture at least one image of the user using a camera located on the device while the user is being illuminated with the patterned infrared illumination;

extracting material data from the image; and allowing or declining the user to perform at least one operation on the device that requires authentication based on the material data.

In another aspect, the disclosure relates to a computer program for authorizing a user of a device to perform at least one operation on the device that requires authentication, the computer program including instructions causing a computer to execute the steps of the method according to the disclosure.

In a further embodiment of the present invention the technical problem of the invention is solved by the computer implemented method, wherein the material information is derived from reflections of a pattern illumination.

Since material information is extracted from a partial image generated by manipulating the pattern image of the object the computing resources to identify the material can be reduced. Further by providing the partial images to the data-driven model, not the complete pattern image including, in particular, also potential background is utilized for the extracting of material information. In addition, the part of the training process of the data-driven model that is necessary to train the identification model to unregard potential very variable background can be avoided leading to a decrease in the necessary training data. In particular, the size of a training data set may be decreased by a huge amount, as the data size of each of the partial images (which are many to achieve a well trained model) may be less or equal than the data size of each corresponding pattern image of the pattern images (which are many to achieve a well trained model). Hence, an accurate identification of material information of an object and/or identification and/or authentication of an object and even in complex situations, e.g. where the object comprises or is covered by various, and possibly, unwished materials and is to be authorized as a user of a device to perform at least one operation on the device that requires authentication, is provided for which less training data for training a data-driven model needs to be utilized, in particular, technical efforts and requirements in terms of technical resources, costs and computing expenses are reduced. Accordingly, the data-driven model need fewer parameters, and thus, e.g. fewer neurons in the first layer. The sizes of the layer are thus smaller. All this further leads to a reduction of overfitting problems. All stated technical effects apply to the method, apparatus, data medium and uses of these of the invention, as the model is trained such that after training the model is utilizable by the method, apparatus, data medium and uses of these of the invention.

Moreover, the manipulation of the pattern image into smaller sections for the partial image, e.g. via cropping or the like, has the further advantage that it can be avoided that the data-driven model bases its computations too strongly on correlations of features in completely different areas of the image showing the object. Considering only correlations of features that are near to each other on the object, i.e. can be found in the same area of the object, leads to a higher accuracy of the output results. In addition, since the material information is further used for identification, in particular, authentication of the object, identification, in particular, authentication of the object can hardly be spoofed in cases where an attacker aims to achieve wrongful identification/ authentication by imitating parts of the correct person ('s face) using images, masks e.g. made of silicone, replica, e.g. made of latex, silicon, fabric, or the like. The invention increases security aspects, as spoofing attacks are advanta-geously prevented. In addition, identification, in particular, identification/authentication of an object, in particular, in cases where object is a user of a device that is to be authorized to perform at least one operation on the device that requires authentication is advantageously possible. In particular, for cases in which the user of the device e.g. wears parts that are not skin, e.g. glasses, beard, hat, etc., or a (partial) mask due to hygienic requirements or health reasons. Such occlusions and/or features may be detected by its material information and its detection is used in for identification/authentication/authorization. Hence, the invention, in particular, applies for identification/authenti-cation/authorization purposes in an unlocking process of a device by a user of the device. As a result, the confidence level and the overall reliability of the method, apparatus, data medium and uses of these of the invention is increased.

As a result, the invention provides the extraction of material information of an object, the identification and/or authentication of an object and the authorizing a user of a device to perform at least one operation on the device that requires authentication all with an increased prediction accuracy utilizing a machine learning identification model that can be trained less computationally expensive, in par-ticular, with utilizing less training data and less computa-tional resources.

Thus, the invention provides the extraction of material information of an object, the identification and/or authenti-cation of an object with an increased accuracy. The utiliza-tion of a machine learning identification model trained based on partial images reduces computational expense and hence enables use on less sophisticated computing resources such as in mobile device, e.g. a smartphone or a tablet.

In an embodiment of the invention, the object is a face, e.g. of a human being, preferably a user of the device. In a more preferred embodiment of the invention, the material information relates to human skin, silicone, resin, latex, paper, metal, or the like. In an even more preferred embodi-ment of the invention the material information comprises a material class and/or a material type. The material class may include biological or non-biological material, translucent or non-translucent materials, metal or non-metal, skin or non-skin, latex or non-latex, silicon or non-silicon, fabric or non-fabric, reflective or non-reflective, specular reflective or non-specular reflective, foam or non-foam, hair or non-hair, roughness groups or the like. The material type may include further specifications of the material class such as in class biological the type may be human skin or in class non-biological the type may be plastics, glass, and metal. Further sub-types may be assigned to each type. In an embodiment, material information may indicate a material type and/or data derived from the material type. Material information may be suitable for obtaining a material type. Material information may comprise chemical composition and/or material type. Example for material type may be inorganic material, organic material, silicon, metal, wood, skin or the like. Data derived from material type may be data based on material type. In the exemplary case of skin being the material type, data derived from the material type may comprise object being a living organism. Living organism may be for example human.

The inventors have developed a technology for measuring distance of an object (to a reference point, e.g. the location of the camera) as well as the material of that object. Therefore standard hardware is used. That is, for example an IR laser point projector (e.g. VCSEL array) for projecting a spot pattern onto the object and a camera, e.g. CMOS, etc., which records the objected under illumination may be used. In contrast to the structured light approach established in the prior art, the use of only one camera is necessary.

The information about distance of the object and the information about the material of the object is extracted from the shape of a spot reflected by the object. The ratio of the light intensity in the central part of the spot to that in the outer part of the spot contains information about distance of the object. The material or information about the material of the object may further be extracted from the intensity distribution of the spot reflected by the object. This is inter alia possible, as each material reflects light differently. For example (infra red (IR)) light penetrates skin relatively deeply which leads to a certain broadening of the spot. Further analysis of the material of the object may be done by applying a series of filters to the reflected image to extract various and different information of the spot. Accordingly, for example skin, as the material of the object, can be detected. In addition, for example material information about the material of the object or material features like beard, glasses, hat, scarf or the like may be determined. Detail are described below. Accordingly, a rule based con-sistency check may be applied, and thus, spoofing attacks may be prevented to a high degree and the security level is thus increased, for detection of material information in general, and in particular, for identification/authentication of an object, e.g. a user of a device.

Supplementary or alternative the advantages of artificial intelligence may be used. For example, the prior art teaches the training of neural networks to detect if an image contains a desired object. However, the training of such neural networks requires a large number of images. This often leads to an overfitting of the neural network and to a decrease in accuracy of the results. Further, often, even after an appro-priate training, only poor recognition reliability is obtained, in particular, in cases where an object/user is covered/wears/ comprises unwished parts/occlusion, e.g. masks, glasses, replica or the like.

According to the subject-matter according to claim 1, inter alia a pattern image showing the object is received and manipulated to generate a partial image, possibly including no or one or more pattern features, which is then provided to a data-driven model (e.g. a neural network or a machine learning based identification model) to extract material information of the object. Hence, the subject-matter according of the invention provides the use of a neural network with less training data. Thus, overfitting is prevented and at the same time the identification accuracy is increased. In particular, the invention provides a method that allows to accurately identify material information of an object and that allows to utilize less training data for training a data-driven model for identifying the object. Moreover, it is further an object of the invention to provide a training method that allows to provide an data-driven model that is usable in the method to identify/authenticate material information and/or an object and that can be trained to provide a good prediction accuracy and, at the same time, utilizes less training data and less computational resources.

The method refers to a computer implemented method and can thus be performed by a general or dedicated computer or computing device, like a smartphone, laptop, tablet, etc., that is adapted to perform the method, for instance, by executing a respective computer program. Moreover, the method can also be performed by more than one computer, for instance, by a computer network or any other kind of distributed computing, wherein in this case the steps of the method can be performed by one or more computing units.

The method allows identifying of material information of an object. For example, the material information may be a assigned to one or more of a material name, a material group, material class or material type, e.g. biological or non-biological material, translucent or non-translucent materials, metal or non-metal, skin or non-skin, latex or non-latex, silicon or non-silicon, fabric or non-fabric, reflective or non-reflective, specular reflective or non-specular reflective, foam or non-foam, hair or non-hair, roughness groups or the like. Hence, the material information may relate to human skin, silicone, resin, latex, paper, materials out of which masks may be manufactured.

An example for determining a material information of an object refers, for instance, to determining whether (parts) an object, from which an image has been taken, comprises skin or fur, i.e. belongs to the class of human or animal beings, or comprises metal or plastic, i.e. belongs to the class non-living materials such as glasses or masks. For example, an owner of a mobile device may take a picture of (parts) an object for which material information of (the parts) the object is then derived. The term object refers to (parts of) an entity, person, animal, or the like, non-living object, such as glasses, mask, replica or the like, for which material information may be derived. For example, the object may be a face, fingerprint or any comparable part of a body that may inter alia be used for identifying purposes.

The defined method comprises receiving the pattern image showing the object. For example, the pattern image can be received from a camera unit taking the image while the object is illuminated with a light pattern. Supplementary or alternative, the pattern image can also be received from a storage unit on which the pattern image is already stored. Supplementary or alternative, the pattern image can also be received by a user input, for instance, when a user indicates which of a/the plurality of images stored on a storage should be utilized as pattern image.

According to preferred embodiment of the invention, material information of an object is derived from reflections of a pattern illumination or light pattern on the object.

In general, a sensor may be configured for recording at least one image of a light beam originating from at least one object, e.g. via reflection. The term reflection image (or simply denoted pattern image) may refer to an image determined by the sensor element comprising at least one reflection feature (or simply denoted feature). As used herein, the term determining at least one (reflection) feature refers to imaging and/or recording at least one light beam generated by the object in response to illumination with a light beam, in particular with the at least one illumination feature (or simply denoted feature). In particular, the sensor element may be configured for determining and/or imaging and/or recording at least (reflection) image. Preferably, the (reflection) image may comprise at least one pattern comprising the at least one (reflection) feature.

Specifically, the pattern image may refer to an image of an object that has been taken while an object is or has been illuminated with a light pattern, which is also denoted as pattern illumination or illumination pattern. The light pattern may comprise one or more pattern features. The pattern image may include contributions from reflections on the object of the light pattern and/or from the texture of the object. The texture relates to surface characteristics such as size, shape, density, arrangement, proportion, or the like, of certain parts of the object.

The light pattern light pattern may be generated by any kind of light pattern generating unit, e.g. laser light, in particular, infrared laser light. In particular, it is preferred that one or more vertical-cavity surface-emitting lasers (VCSEL) are utilized to generate a light pattern comprising a plurality of laser light spots. However, also other light sources can be utilized for generating the light pattern, for instance, LED light sources of one or more colours can also be utilized.

Preferably, the pattern image is acquired by a detector, sensor, or the like. A detector may be a stationary device or a mobile device. Further, the detector may be a stand-alone device or may form part of another device, such as a computer, a vehicle or any other device. Further, the detector may be a hand-held device. As used herein, the term sensor or sensor element generally refers to a device or a combination of a plurality of devices configured for sensing at least one parameter, and in particular, may be part of a detector. In the present case, the parameter specifically may be an optical parameter, and the sensor element specifically may be an optical sensor element. The sensor element may be formed as a unitary, single device or as a combination of several devices. The sensor element may comprise a matrix of optical sensors. The sensor element may comprise at least one CMOS sensor. The matrix may be composed of independent pixels such as of independent optical sensors. Thus, a matrix of inorganic photodiodes may be composed. Alternatively, a commercially available matrix may be used, such as one or more of a CCD detector, such as a CCD detector chip, and/or a CMOS detector, such as a CMOS detector chip. Thus, generally, the sensor element may be and/or may comprise at least one CCD and/or CMOS device and/or the optical sensors may form a sensor array or may be part of a sensor array. In an embodiment of the invention, a commercially available matrix may be used, such as one or more of a CCD detector, such as a CCD detector chip, and/or a CMOS detector, such as a CMOS detector chip.

The detector and/or sensor and/or or sensor element may be configured for detection of biological tissue, in particular human skin. As used herein, the term biological tissue generally refers to biological material comprising living cells. The detector may be a device for detection, in particular optical detection, of biological tissue, in particular of human skin. As used herein, an optical sensor generally refers to a light-sensitive device for detecting a light beam, such as for detecting an illumination and/or a light spot generated by at least one light beam. As further used herein, a light-sensitive area generally refers to an area of the optical sensor which may be illuminated externally, by the at least one light beam, in response to which illumination at least one sensor signal is generated. The light-sensitive area may specifically be located on a surface of the respective optical sensor. The described sensors or optical sensors and/or sensor elements or optical sensor elements may be sensitive in one or more of the ultraviolet, the visible or the infrared spectral range. The light-sensitive areas of the sensor may be oriented towards the object such that the sensor may record at least one reflected image of a light beam originating from the object.

The defined method comprises manipulating the pattern image to generate a partial image. In an embodiment, the partial image may comprise at least parts of at least one pattern feature, preferably one or more pattern features. In one embodiment, a pattern feature may comprise an essentially symmetric, preferably an essentially radially symmetric, more preferably an essentially normal distribution, Gauss, Laplace-Gauss distribution, Cauchy distribution, t-distribution, Logistic distribution or the like, intensity distribution. In one embodiment, a partial image comprising a pattern feature may be defined as the partial image comprises parts of an image comprising at least one maximum of the intensity distribution. In one embodiment, a partial image comprising no pattern feature may be defined as the partial image comprises an image comprising no maximum of the intensity distribution, preferably, the partial image comprises an image comprising a rising and/or falling, that is a positive and/or negative, intensity of the intensity distribution.

In one embodiment, a pattern feature of the light pattern refers to a part of the light pattern that can be differentiated from other pattern features, for instance, due to an unlighted distance between the pattern features or due to a different arrangement of the light in different pattern features. Preferably, a pattern feature refers to one or more light spots arranged in a predetermined pattern, wherein the light pattern is preferably on repeating the predetermined pattern. In particular, it is preferred that the light pattern refers to a point cloud, wherein the points refer to light spots, where-in a pattern feature can in this case refer to one light spot. In this case, the light pattern can refer, for example, to a hexagonal or triclinic lattice of light spots that are substantially similar and comprise a circular shape. However, a pattern feature can also refer to more than one light spot, for instance, to one hexagon comprising six light spots, wherein in this case, for example, the feature patterns, i.e., the hexagons, can be repeated to form a regular light pattern.

As explained above the light pattern is reflected from the object and the according pattern image showing the object is received. Hence, the pattern image comprises the reflected pattern feature(s). A reflected pattern feature in the pattern image is also denoted as a pattern feature in the following. In an embodiment, pattern features may be selected from the pattern image. For example, in an embodiment the selecting of the pattern features can comprise first deriving the information indicating the position and extent of the object from the pattern image. In this embodiment, known methods for deriving information from pattern images can be utilized. In an embodiment known methods for determining a distance at which a pattern feature is reflected from the camera can be utilized for receiving information on the extent and position of the object. For example, pattern features within a predetermined distance range with respect to each other can be regarded as belonging to the same object and can thus be selected. Moreover, an outline of an object can be determined, for instance, by comparing the distance of pattern features neighbouring each other. The outline can then be determined if the distance of neighbouring pattern features lies above a predetermined threshold. Furthermore, in additional or alternative embodiments information indicating the position and extent of the object in the pattern image can also be derived from the pattern image by deriving materials from the reflective characteristics of each pattern feature. Also in this case already known methods for deriving material characteristics from characteristics of reflected light can be utilized and it can be determined that pattern features indicating a material associated with the object are selected as pattern features located on the object. For example, pattern features indicating that they are reflected by the skin of a human can in this case be determined as belonging to the face of a human and thus can be selected as being located on the object.

In one embodiment, the pattern features located on the object may be selected from the pattern image, for example, by determining whether the position of the pattern feature is located within an outline of the object. In this context, the selecting of the pattern features can also comprise determining the position of each pattern feature in the pattern image. For example, respective feature detection algorithms can be utilized. Since the pattern features may be predetermined and further clearly distinguishable from other parts of the image not illuminated by the pattern features, such feature recognition methods can be based on easy rules. For example, it can be determined that a pixel of the pattern image may comprise a light intensity over a predetermined threshold is part of a pattern feature. Moreover, also light intensities of neighbouring pixels can, depending on the geometric form of a pattern feature, be taken into account for determining the position of pattern features. However, also more sophisticated feature extraction methods can be utilized, or a user can perform the position determination by a respective input. The pattern features on the object can then be selected by comparing the position of the pattern features with the indicated position and extend of the object and by selecting pattern features lying within the boundaries of the object.

In an embodiment, a partial image including one or more pattern features is generated out of the pattern image via manipulation. The pattern image may be manipulated by image augmentation techniques such as cropping, rotating, blurring, or the like. In one embodiment, the image augmentation may be randomized. Hence, the data size of partial image may be less or equal than the data size of pattern image. Through such manipulation the background information with the features, e.g. relating to the object, e.g. facial features, may be suppressed. In particular, for the extraction of the material information the pattern or the pattern features of the partial image is of interest. Hence, the size of data to be stored and/or processed later is reduced.

Generally, the cropping of an image may refer to removing all areas of the pattern image outside of the cropped pattern image. The cropping of the pattern image to generate one or more partial images, here denoted as cropped images or cropped pattern images, may be performed such that each (or parts of several) cropped image may comprise a predetermined size and may contain no or at least one of the selected pattern features. The predetermined size can, for instance, be determined in form of a predetermined area that should be covered by a cropped image, or any other characteristic that can determine the size of an area, for instance, a radius in case of a circular area, etc. Preferably, a cropped image may refer to rectangular images determined by a predetermined height and width. In an embodiment, cropping may be based on identifying peaks of pattern or pattern features and cropping a certain size around the peaks. Multiple cropped image may be derived such that they do or do not overlap. A cropped image can generally have any shape and can thus be characterized also by different size characterisations. For example, the cropped image can be circular and characterized by a respective radius. Preferably, each cropped image may comprise the same predetermined size. However, for different cropped images also different predetermined sizes can be utilized, for example, for images cropped in a centre of an object a larger size can be predetermined than for images cropped within a predetermined distance from the outline of the object. Preferably, a cropped image may be centered around a selected pattern feature. Even more preferably, for each selected pattern feature a cropped image may be generated comprising at least the respective selected pattern feature preferably centered within the cropped image. Further, it is preferred that a cropped image may comprise more than one pattern feature, for example, in a addition to central pattern features also all or a part of the neighbouring pattern features.

In a further step, the method comprises extracting material information of the object from the partial image by providing the partial image to a data-driven model. The data-driven model may also be denoted as machine learning based identification model or simply model in the following. The data-driven model may comprise a neural network (abbreviated as NN in the following), in particular a convolutional neural network (abbreviated as CNN in the following) or a Residual Neural Network (abbreviated as ResNet in the following). In general, a NN recognize and/or classifies known patterns into unknown data after learning the patterns in a training phase.

The input to the model, such as a data set, one or more pattern image, one or more partial images, one or more representation and/or one or more cluster, may further refer without further specification to the input used during the training of the model, that is to training input, such as a training data set, one or more training pattern image, one or more training partial images, one or more training representation and/or one or more training cluster. The term material information, also denoted as material data, may further refer without further specification to the input used for the training of the model, that is, to training material information, also denoted as training material data. All descriptions, specifications and definitions provided for the data set, the one or more pattern image, the one or more partial images, the one or more representation, the one or more cluster and/or material information apply accordingly for the training data set, the one or more training pattern image, the one or more training partial images, the one or more training representation, the one or more training cluster and/or training material information.

The data-driven model is parameterized to extract the material information from the partial image. That is, the data-driven model has been trained such that it can extract or provide material information of the object based on the partial image as input. Generally, the model is trained by using known partial images and known material information.

Generally, a data-driven model is trained utilizing images that have been generated in accordance with the same rules as the pattern images that are later utilized for provide material information of the object. The machine learning based identification model can utilize any known machine learning algorithm. Neural networks are especially suitable for being utilized in the context of feature and/or material and/or object recognition techniques on images. Thus, it is preferred that the data-driven model is based on a neural network algorithm. More preferably the neural network refers to a convolutional neural network.

A possible process for generating material information and/or material data from an pattern image and/or image data, e.g. infrared image and/or infrared image data, may be a suitable filtering technique. For extracting material information a beam profile analysis may be performed by applying an image filter, in particular, a material dependent image filter, on pattern features of the pattern image.

Such a technique is for example described in WO 2020/187719 A1 and is described herein below. The disclosure of WO 2020/187719 A1 is hereby incorporated by reference.

In this case, utilizing the partial image, e.g. generated from the pattern image via manipulation such as cropping, etc., and not the full pattern image itself is especially preferable as input for the model. This inter alia provides the technical advantageous effect of prevention of the neural network algorithm to base material decision decisions too strongly on correlations on features that lie in completely different regions of the image. As a result, a much higher accuracy in the output, e.g. the extracted and/or determined material information is achieved. Further, false positive results are prevented. Due to its training the model can then output the material information when provided with the partial image as input.

In an embodiment, the model may be parametrized to output a classifier such as human skin or no human skin, material or no material. The model may also be parametrized to more complex outputs such as human skin, material class (latex, silicon, fabric, etc.) or the like.

The result, i.e. the output of the model, e.g. the extracted material information, can then be provided and/or outputted. For example, the result can be provided to an output unit of the device providing a visual or audio output. Moreover, the output can be further processed, for example, to identify, in particular, authenticate object, as it described below with further details. Supplementary or alternatively, the output may be used to unlock a door or device if it has been determined that the identity of the potential user allows for the respective access. Supplementary or alternatively, the output may be used to control a device not only to provide access to restricted resources, but further, for instance, to control movements or positions of automatic devices or robots based on an identification of an object. For example, if an object in the way of a moving robot has been identified as a chair, the robot can be controlled to move around the respective object.

In a further embodiment of the present invention the technical problem of the invention is solved by the computer implemented method, wherein the pattern image shows the object while the object is illuminated with a pattern illumination, the pattern illumination is a regular pattern and/or a periodic pattern and/or a dot pattern and/or speckle pattern, in particular, with at least 2, preferably at least 6, more preferably at least 20 pattern features and/or dots and/or speckles per face area at a distance of 5-200 cm, preferably 30-60 cm, more preferably 15-80 cm.

In an embodiment, a pattern in the pattern image results from the object being illuminated with the pattern illumination, and/or wherein the pattern image comprises contributions from reflections of the pattern illumination and/or from a texture of the object. Hence, pattern image may be an image of the object using a camera located on the device while the object is being illuminated with the patterned infrared illumination. In this context background contribution of the pattern image may include contributions from the texture signifying features of the object such as eyes, nose or the like. Further background contribution of the pattern image may include contributions from background light illumination, such as sun light.

A light pattern illuminates the object. Preferably, the light pattern refers to a regular light pattern comprising regularly arranged pattern features. However, in other embodiments the light pattern can also refer to an irregular pattern or even to an arbitrary pattern.

In an embodiment, pattern image may be an image. Image may comprise image data. A partial image may be an image. A partial image may comprise a part of an image, in particular a pattern image. Pattern image may be manipulated to generate a partial image. A pattern image may show the object while the object is illuminated with a light pattern. Partial image may show at least a part of the object while the object is illuminated with a light pattern. Image of the object captured while the object is being illuminated with the patterned infrared illumination may also be referred to as pattern image. Pattern image is capture while object is being illuminated with patterned infrared illumination. Preferably, the pattern image arises as the reflection of the light pattern when the light pattern is reflected from the object. Preferably, the material information is derived from reflections of the pattern illumination. A pattern feature of the light pattern of the illumination or of the pattern image may refers to a part of the light pattern or of the pattern image that can be differentiated from other pattern features, as described above. In an embodiment, the image may comprise a pattern image showing the object while the object is illuminated with illumination and/or a partial image showing at least a part of the object while the object is illuminated with illumination. Image may comprise infrared pattern image data. Image may be referred to as infrared pattern image data.

In a further embodiment of the present invention, the technical problem of the invention is solved by the computer implemented method, the manipulation step further comprising determining a representation of the partial image, wherein the representation is associated with a physical signature embedded in the reflections of the pattern illumination in the partial image.

In a further embodiment of the present invention the technical problem of the invention is solved by the computer implemented method, wherein the step of extracting material information of the object from the partial image further comprises providing the representation of partial image to a data-driven model, and/or providing a cluster of the partial image to a data-driven model, wherein the data-driven model is parametrized according to the training data set further comprising the representation of one or more of the partial images and/or the cluster of one or more of the partial images, and wherein the data-driven model is parameterized to extract the material information.

In a further embodiment of the present invention the technical problem of the invention is solved by the computer implemented method, wherein the partial image is part of a data set of partial images; and wherein a cluster is derived via clustering of the partial images of the data set based on the representation, wherein the cluster is associated to the representation.

In an embodiment, the manipulating of the pattern image to generate a partial image including no or one or more pattern features comprises the partial image is generated from the pattern image via techniques such as cropping, rotating, blurring, or the like, as it is described herein below, in particular, for particular parts of the embodiment as described with respect to FIG. 4.

In an embodiment, an outline of the object indicating the position and extent of the object based on a flood light image can be determined in accordance with any known feature extraction method for visible light images. Preferably, the flood light image shows the object while it is illuminated with flood light, e.g. flood light illumination is provided. The pattern image shows the object while it is illuminated with pattern illumination. In particular, automatic algorithms, like machine learning algorithms or simple feature detection algorithms can be utilized. Generally, for all embodiments utilizing more than one image, for instance, more than one pattern image, for example, for a distance determination of feature patterns, or a flood light image for outline detection, it is preferred that the respective images are taken at the same time or at least in a predetermined time range around the time at which the pattern image has been taken and are moreover taken by the same camera or a camera comprising a predetermined distance to the camera taking the pattern image. This allows to directly derive from the position of features in one image, for instance, in a flood light image, the position of the feature in other pattern images. In a possible further embodiment of the invention, methods that only approximate the position and extend of the object can be utilized or methods can be utilized with less accuracy, for instance, with less computational resources.

In an embodiment, the information about the outline of the object of interest from e.g. the flood light image can be used to indicate the position and extend of the object in the pattern image and this to find those pattern features, such as light spots, in the pattern image which are located on the object. Preferably, for each such pattern feature, the pattern image may be cropped such that the cropped pattern image, that is the partial image, shows the pattern feature in the center and a preset amount of the neighborhood of the pattern feature. Preferably, the partial image being a cropped image may not only contain the central pattern feature, but also some of the neighboring feature. In one embodiment, the partial image being a cropped image may no. The chosen cropping size is a compromise between overfitting of the neural network if too large images are cropped and too low accuracy of the object recognition if too small images are cropped. Hence, the size of the cropped images can be chosen based on the requirements for a particular use case.

In an embodiment, patterned infrared illumination may comprise at least in parts a regular or irregular pattern.

In an embodiment, object may be a user and/or a spoofing object. Spoofing object may be suitable for spoofing an authentication or authentication process.

In an embodiment, triggering to capture at least one image of the object using a camera located on the device while the object is being illuminated with the patterned infrared illumination may comprise capturing at least one image of the object using a camera located on the device while the object is being illuminated with the patterned infrared illumination. Triggering to capture at least one image of the object using a camera located on the device while the object is being illuminated with the patterned infrared illumination may result in by capturing at least one image of the object using a camera located on the device while the object is being illuminated with the patterned infrared illumination. In an embodiment, triggering to capture at least one image of the object using a camera located on the device while the object is being illuminated with the patterned infrared illumination may be followed by capturing at least one image of the object using a camera located on the device while the object is being illuminated with the patterned infrared illumination.

In an embodiment, triggering illumination of the object with patterned infrared illumination may comprise illuminating the object with patterned infrared illumination. Triggering illumination of the object with patterned infrared illumination may result in illuminating the object with patterned infrared illumination. Triggering illumination of the object with patterned infrared illumination may be followed by illuminating the object with patterned infrared illumination.

In an embodiment, extracting material data

In an embodiment, authentication may comprise or may refer to an authentication process. Authentication may comprise or may refer facial recognition authentication, in particular a facial recognition authentication process.

In an embodiment, method may be a computer implemented method.

In an embodiment, extracting material data from the image may comprise generating the material type and/or data derived from the material type. Preferably, extracting material data may be based on the image, more preferably the pattern image, most preferably the partial image. Material data may be extracted by using a model. Extracting material data may include providing the image to a model and/or receiving material data from the model. Providing the image to a model may comprise and may be followed by receiving the image at an input layer of the model or via a model loss function. Model may be a data-driven model. Data-driven model may comprise a convolutional neural network and/or an encoder decoder structure such as an autoencoder. Other examples for generating a representation may be FFT, wavelets, deep learning, like cnns, energy-based models, normalizing flows, gans, vision transformers, or transformers used for natural language processing, autoregressive image modelling. GANs, Autoregressive Image Modeling, Normalizing Flows, Deep Autoencoders, Deep Energy-Based Models, Vision Transformers. Supervised or unsupervised schemes may be applicable to generate representation, also embedding in e.g. Euclidian space. Data-driven model may be parametrized according to a training data set including at least one image and material data, preferably at least one pattern image and material data. In another embodiment, extracting material data may include providing the image to a model and/or receiving material data from the model. In another embodiment, data-driven model may be trained according to a training data set including at least one image and material data. In another embodiment, data-driven model may be parametrized according to a training data set including at least one image and material data. Data-driven model may be parametrized according to a training data set to receive the image and provide material data based on the received image. Data-driven model may be trained according to a training data set to receive the image and provide material data as output based on the received image. Training data set may comprise at least one image and material data, preferably material data associated with the at least one image. Image may comprise a representation of the image. Representation may be a lower dimensional representation of the image. Representation may comprise at least a part of the data or the information associated with the image. Representation of an image may comprise a feature vector. In an embodiment, determining a representation, in particular a lower-dimensional representation may be based on principal component analysis (PCA) mapping or radial basis function (RBF) mapping. Determining a representation may also be referred to as generating a representation. Generating a representation based on PCA mapping may include clustering based on features in the pattern image and/or partial image. Additionally or alternatively, generating a representation may be based on neural network structures suitable for reducing dimensionality. Neural network structures suitable for reducing dimensionality may comprise an encoder. In an example, neural network structure may be an autoencoder. In an example, neural network structure may comprise a convolutional neural network (CNN). CNN may comprise at least one convolutional layer and/or at least one pooling layer. CNNs may reduce the dimensionality of a partial image and/or an image by applying a convolution, eg based on a convolutional layer, and/or by pooling. Applying a convolution may be suitable for selecting feature related to material information of a partial image.

In an embodiment, extracting material data from the image with a data-driven model may comprise providing the image to a data-driven model. Additionally or alternatively, extracting material data from the image with a data-driven model may comprise may comprise generating an embedding associated with the image based on the data-driven model. An embedding may refer to a lower dimensional representation associated with the image such as a feature vector. Feature vector may be suitable for suppressing the background while maintaining the material signature indicating the material data. In this context, background may refer to information independent of the material signature and/or the material data. Further, background may refer to information related to biometric features such as facial features. Material data may be determined with the data-driven model based on the embedding associated with the image. Additionally or alternatively, extracting material data from the image by providing the image to a data-driven model may comprise transforming the image into material data, in particular a material feature vector indicating the material data. Hence, material data may comprise further the material feature vector and/or material feature vector may be used for determining material data.

In an embodiment, material data of the object such as a user may be extracted from the at least one image.

In an embodiment, data-driven model may be an ensemble model. Ensemble model may comprise a machine learning architecture trained by ensemble learning. Usually, data-driven models exhibit a high variance and rely strongly on a small number of features. To reduce the low accuracy accompanying the sensitivity of data-driven models to the input data ensemble modelling can be performed resulting increasing the accuracy of the trained model. Ensemble learning may refer to training more than one algorithm for solving a problem. In the context of the application, more than one data-driven model may be trained and/or used for extracting material data. In an embodiment, an ensemble model may be trained based on a plurality of data-driven models, so called weak learners. Weak learners may be trained to solve a part of the problem. Data-driven model trained based on weak learners can be referred to as meta model. Hence, data-driven model may be a meta model. In an example, a plurality of weak learners may be trained based on a plurality of materials and a meta model may output a material data based on the weak learners. For example, meta model may combine the outputs of the weak leaners and/or meta model may be trained to combine the outputs of the weak learners. Additionally or alternatively, ensemble learning may comprise training more than one machine learning architecture and inputting error of at least one machine learning architecture to another machine learning architecture. Training more than one machine learning architecture may be sequential, parallel or a combination thereof. Examples for ensemble learning techniques may comprise Bagging, Boosting, Stacking, Blending or the like.

In an embodiment, allowing or declining the object to perform at least one operation on the device that requires authentication based on the material data may include allowing the object to perform at least one operation on the device that requires authentication if the material data matches desired material data and/or authentication may be successful. Desired material data may be predetermined material data. Authentication may be successful if the image can be matched with an image template. Template may be stored for matching with an image captured of the object. Further, allowing or declining the object to perform at least one operation on the device that requires authentication based on the material data may include declining the object to perform at least one operation on the device that requires authentication if the material data does not match desired material data and/or authentication may be unsuccessful. Authentication may be unsuccessful if the image cannot be matched with an image template. In an embodiment, object may be declined if the material data may not match the desired material data independent of an authentication of the object. At least one operation on the device that requires authentication may be access to the device, eg unlocking the device, and/or access to an application, preferably associated with the device and/or access to a part of an application, preferably associated with the device. In an embodiment, allowing the user to access a resource may include allowing the user to perform at least one operation with a device and/or system. Resource may be a device, a system, a function of a device, a function of a system and/or an entity. Additionally and/or alternatively, allowing the user to access a resource may include allowing the user to access an entity. Entity may be physical entity and/or virtual entity. Virtual entity may be a database for example. Physical entity may be an area with restricted access. Area with restricted access may be one of the following: security areas, rooms, apartments, vehicles, parts of the before mentioned examples, or the like. Device and/or system may be locked. Device and/or system may only be unlocked by authorized user.

In an embodiment, method for authorizing an object of a device to perform at least one operation on the device that requires authentication, comprising:

a material detection processor configured for receiving, from a user interface associated with a device, an unlock request for the device from a user; and in response to receiving the unlock request, triggering illumination of the object with patterned infrared illumination; and triggering to capture at least one image of the object using a camera located on the device while the object is being illuminated with the patterned infrared illumination; and extracting material data from at least one image; and allowing or declining the object to perform at least one operation on the device that requires authentication based on the material data.

In an embodiment, the capturing of the at least one image may comprise capturing the at least one image of the object using a camera located on the device while the object is being illuminated with the patterned infrared illumination.

In an embodiment, the authenticating may use a facial recognition authentication process operating on the image and/or the extracted material data.

In an embodiment, authentication process may be validated based on the extracted material data.

In an embodiment, the validation based on the extracted material data may comprise determining if the extracted material data corresponds a desired material data. Determining if extracted material data matches the desired material data may be referred to as validating. Allowing or declining the object to perform at least one operation on the device that requires authentication based on the material data may comprise validating the authentication or authentication process. Validating may be based on material data and/or image. Determining if the extracted material data corresponds a desired material data may comprise determining a similarity of the extracted material data and the desired material data. Determining a similarity of the extracted material data and the desired material data may comprise comparing the extracted material data with the desired material data. Desired material data may refer to predetermined material data. In an example, desired material data may be skin. It may be determined if material data may correspond to the desired material data. In the example, material data may be non-skin material or silicon. Determining if material data corresponds to a desired material data may comprise comparing material data with desired material data. A comparison of material data with desired material data may result in a allowing and/or declining the object to perform at least one operation that requires authentication. In the example, skin as desired material data may be compared with non-skin material or silicon as material data and the result may be declination since silicon or non-skin material may be different from skin.

In an embodiment, the authentication process or its validation may include generating at least one feature vector from the material data and matching the material feature vector with associate reference template vector for material.

In an embodiment, the patterned infrared illumination may be a regular pattern and/or a periodic pattern with pattern features, in particular, with at least 2, preferably at least 6, more preferably at least 20 pattern features per face area at a distance of 5-200 cm, preferably 30-60 cm, more preferably 15-80 cm.

In an embodiment, the extracting of material data may comprise performing a beam profile analysis by applying an image filter, in particular a material dependent image filter, on pattern features of the image and/or by providing image to a data-driven model, wherein the data-driven model may be parametrized according to a training data set including images and material information;

In an embodiment, the operation requiring authentication may include unlocking the device.

In an embodiment, the extracting of material data may comprise manipulating the image to generate a partial image and extracting material data of the object from the partial image by providing the partial image to a data-driven model, wherein the data-driven model may be parametrized according to a training data set including partial images and material data.

In an embodiment, the manipulating of the image may comprise:

suppressing texture information from the object located in a region of interest, in particular, a face of the user; and/or partitioning the image and/or data of the image; and/or cropping the image to a partial image; and/or determining a bounding box for a region of interest in the image and cropping the image to extract the region of interest.

In an embodiment, the material information may comprise a material class and/or a material type.

In an embodiment, a model may be suitable for determining an output based on an input. In particular, model may be suitable for determining material data based on an image as input. A model may be a deterministic model, a data-driven model or a hybrid model. The deterministic model, preferably, reflects physical phenomena in mathematical form, e.g., including first-principles models. A deterministic model may comprise a set of equations that describe an interaction between the material and the patterned electromagnetic radiation thereby resulting in a condition measure, a vital sign measure or the like. A data-driven model may be a classification model. A hybrid model may be a classification model comprising at least one machine-learning architecture with deterministic or statistical adaptations and model parameters. Statistical or deterministic adaptations may be introduced to improve the quality of the results since those provide a systematic relation between empiricism and theory. In an embodiment, the data-driven model may be a classification model. The classification model may comprise at least one machine-learning architecture and model parameters. For example, the machine-learning architecture may be or may comprise one or more of: linear regression, logistic regression, random forest, piecewise linear, nonlinear classifiers, support vector machines, naive Bayes classifications, nearest neighbours, neural networks, convolutional neural networks, generative adversarial networks, support vector machines, or gradient boosting algorithms or the like. In the case of a neural network, the model can be a multi-scale neural network or a recurrent neural network (RNN) such as, but not limited to, a gated recurrent unit (GRU) recurrent neural network or a long short-term memory (LSTM) recurrent neural network. The data-driven model may be parametrized according to a training data set. The data-driven model may be trained based on the training data set. Training the model may include parametrizing the model. The term training may also be denoted as learning. The term specifically may refer, without limitation, to a process of building the classification model, in particular determining and/or updating parameters of the classification model. Updating parameters of the classification model may also be referred to as retraining. Retraining may be included when referring to training herein. In an embodiment, the training data set may include at least one image and material information.

In an embodiment, a partial image may be generated by manipulating the pattern image. A partial image may be generated from the pattern image by manipulating the pattern image. Manipulation may include determining a representation of the partial image, wherein the representation is associated with the physical signature embedded in the reflections of the partial image. Manipulating the pattern image to generate a partial image may comprise generating a partial image, in particular from the pattern image and generating a representation of the partial image, preferably a low-dimensional representation of the partial image. Generating a representation of the partial image may be referred to as determining a representation of the partial image. Generated partial image may be manipulated further to generate a representation of the partial image. Representation may be a lower dimensional representation of the partial image. Hence, manipulating the pattern image may include determining a lower dimensional representation of partial image. In an embodiment, partial image may comprise a representation of a partial image. Representation may be associated with the physical signature of the object. Representation of a partial image may be a lower dimensional representation of the partial image. Partial image, in particular representation of the partial image, may be independent of at least a part of the background of the pattern image. Being independent of at least a part of the background of the pattern image may be referred to as suppressing and/or removing at least a part of the background. Background may refer to information independent of the material information. In an embodiment, a background signature in the pattern image and/or partial image may be suppressed by generating, i.e. deriving, one or more representations below, in particular, for particular parts of the embodiment as described with respect to FIGS. 7a and 7b. In an embodiment, a representation is a mapping of a discrete variable to a vector of continuous numbers. In the context of e.g. neural networks, representations are low dimensional, learned continuous vector representations of discrete variables. The use and/or generation of at least one representation within the invention achieves that the dimensionality of categorical variables is reduced. The representations overcome the limitations of traditional encoding methods and may be used for purposes such as finding nearest neighbours, input into another model, and visualizations. As a result, the generation and/or use of at least one representation provides the technically advantageous effect, for example, that background may be suppressed and hence that the size of the model is reduced. Thus, storage and/or processing of the model on the device is significantly reduced. Partial image and/or pattern image comprise more features than the representation of the partial image. Hence, amount of data associated with a partial image may be higher than for the representation of the partial image.

In an embodiment, identifying the object, in particular authenticating the object based on the material information may comprise determining a matching score of the image with a template of the object, in particular a user. Identifying the object may refer to allowing a user to access a resource. In particular, an authenticated user may be allowed to access a resource. Identifying may be a part of authorizing a user. Identifying may refer to proving a claim of an object, of a user. Claim may be related to the identity of the object. Identifying may include presenting and/or verifying biometric information, certified documents or the like. Biometric information associated with the object may be presented with an image of the object. Biometric information may be information related to the appearance of the user. Biometric information may be associated with information related to finger, face, hand, iris, lips or the like. Certified documents may be documents certified by a governmental institution, an educational institution, an office of administration or the like. User may prove his/her identity by providing biometrical information. In some embodiment, identification may be at least one of facial authentication, fingerprint authentication, authentication with iris.

In an embodiment, identifying the object, in particular authenticating the object based on the material information may comprise at least one of the following steps:

generating a low-level representation of the image; and determining a matching score of the low-level representation of the image and a low-level representation template.

Additionally or alternatively, identifying the object, in particular, authenticating the object based on the material information may comprise validating the authenticating of the object based on material data.

In an embodiment, identifying the object, in particular, authenticating the object based on the material information may comprise of authenticating the object and validating the authenticating of the object based on material data.

In an embodiment, authentication result may be provided based on the matching score. In an embodiment, matching score may indicate the similarity between the captured image and a template. Template may comprise an image of at least a part of an authorized user. Template may comprise a low-level representation associated with an authorized user. Enrolled user may be an authorized user. Authorized user may be a user allowed to access a resource. Preferably, matching score may indicate the similarity between the low-level representation of the image and a low-level representation template. Low-level representation may comprise at least one feature vector. Feature vector may be indicative of a feature associated with the image. Template vector may be indicative of a feature associated with the template, in particular a template of an enrolled user. Low-level representation template may comprise at least one template vector. Feature vector and/or template vector may comprise a n-dimensional vector. Vector may comprise at least one numerical value, preferably n numerical values. Matching score may indicate the distance between the feature vector and the template vector. In an example, a matching score may be obtained by determining the vector product of the feature vector and the template vector. Vector product may be a dot product.

In an embodiment, a background signature in the pattern image and/or partial image may be suppressed by generating, i.e. deriving, one or more representations and/or applying a clustering to generate one or more clusters, as it is described herein below, in particular, for particular parts of the embodiment as described with respect to FIGS. 7a and 7b. In general, clustering may comprise the of grouping of the whole or parts of the one or more pattern images and/or the one or more partial images and/or the one or more representations in a way that those in a first cluster (also denoted as group) are more similar with respect to a particular property, e.g. luminance, translucency and/or background, to each other than to those in other (second, third, . . . ). The described clustering inter alia provides the technical advantageous effect, that the background of the object (that is shown in an image) is irrelevant for purposes of e.g. determining material information and/or identifying, in particular, authenticating an object.

In an embodiment, the clustering may be based on one or more representation of one of more of the partial images and/or one of more of the pattern images. In a more preferred embodiment of the invention, the clustering and/or one or more clusters is associated to one or more of the representations, for example in one to one correspondence.

In a further embodiment of the present invention the technical problem of the invention is solved by an apparatus for extracting material information of an object from a pattern image of the object, wherein the apparatus comprises: a receiving unit configured to receive the pattern image showing the object; a manipulating unit configured to manipulate the pattern image to generate a partial image; an extracting unit configured to extract material information of the object from the partial image by providing the partial image to a data-driven model, wherein the data-driven model is parametrized according to a training data set including partial images and material information; a provisioning unit configured to provide the extracted material information.

In a further embodiment of the present invention the technical problem of the invention is solved by a computer implemented method for training a data-driven model suitable for extracting material information of an object from a pattern image of the object, wherein the method comprises: receiving the pattern image showing the object; manipulating the pattern image to generate a partial image; training a data-driven model to determine material information of the object from the partial image, wherein the training comprises parametrizing the data-driven model according to a training data set including partial images and material information, providing the trained data-driven model.

In a further embodiment of the present invention the technical problem of the invention is solved by an apparatus for training a data-driven model suitable for extracting material information of an object from a pattern image of the object, wherein the method comprises: a receiving unit configured to receive the pattern image showing the object; a manipulating unit configured to manipulate the pattern image to generate a partial image; a training unit configured to train a data-driven model to determine material information of the object from the partial image, wherein the training comprises parametrizing the data-driven model according to a training data set including partial images and material information, a provisioning unit configured to provide the trained data-driven model.

In a further embodiment of the present invention the technical problem of the invention is solved by a non-transitory computer-readable data medium storing a computer program including instructions causing a computer to execute the steps of the method of the invention.

In a further embodiment of the present invention the technical problem of the invention is solved by a computer program for extracting material information of an object from a pattern image of the object, the computer program including instructions causing a computer to execute the steps of the method according to the invention.

In a further embodiment of the present invention the technical problem of the invention is solved by a computer program for extracting material information of an object from a pattern image of the object, the program comprising program code means for causing a system and/or an apparatus and/or a device, or the like, to execute a method according to the invention, when the program is run on a computer controlling the system and/or the apparatus and/or the device, or the like.

In a further embodiment of the present invention the technical problem of the invention is solved by a data structure product comprising manipulated image data for extracting material information from a pattern image e.g. as acquired by an IR sensor, wherein the manipulated image data includes partial images; and/or at least one representation associated with a physical signature of the partial image, in particular, embedded in reflections of the partial image; and/or at least one cluster associated with the representation and/or material information labelling the pattern features in the pattern image.

In a further embodiment of the present invention the technical problem of the invention is solved by a use of the manipulated data of the invention and/or obtained by the method of the invention and/or use of the trained data-driven model obtained by the method of the invention to authenticate an object, in particular, to biometrically authenticate an object.

In a further aspect of the present invention the technical problem of the invention is solved by a computer implemented method for identifying an object, in particular, for authenticating an object, wherein the method comprises: receiving, a request to unlock the device; in response to receiving the request, providing an illumination; capturing at least one image while the illumination is provided; extracting material information from the image; and identifying the object, in particular, authenticating the object based on the material information.

In an embodiment, the method steps are performed by the device.

In an embodiment, the object is a user of the device, wherein the method is for authorizing the user to perform at least one operation on the device that requires authentication, in particular, unlocking the device, wherein the receiving of the request comprises receiving of the request from a user interface associated with a device, the request to unlock the device, the capturing of the at least one image comprises capturing the at least one image of the user using a camera located on the device while the user is being illuminated with the illumination; the method further comprises allowing or declining the user to perform the at least one operation on the device that requires authentication based on the material information.

In an embodiment, wherein the image comprises a pattern image, the authenticating uses a facial recognition authentication process operating on the pattern image data and/or the material information, and wherein the facial recognition authentication process is validated based on the material data. Operating a facial recognition authentication process on the image and/or the material data may refer to validating the authentication process based on material data. Operating a facial recognition authentication process on the pattern image data and/or the material information Validating an authentication process based on material data may include determining if the material information corresponds to a desired material information The term object generally refers to an entity that can be identified and/or authenticated and that comprises a material for which material information, also denoted as material data, may be determined. The object may be a human or an animal being or a non-living thing. In an embodiment, the object may be a user of a device.

Identifying an object refers to determining an identity of the object. The identity can refer to a general identity, for instance, a class identity that indicates that the object is part of a predetermined object class, or a specific identity that refers to determining whether the object refers to a predetermined unique object. An example for determining a general identity of an object refers, for instance, to determining whether an object on an image is a human being, i.e. belongs to the class of human beings, is a chair, i.e. belongs to the class of chairs, etc. Examples for a specific identification that can refer to identifying a predetermined individual, for instance, an owner of a smartphone, identifying a specific individual chair, for instance, a specific chair belonging to a specific owner, etc. In an embodiment, the method allows for an authenticating of an object. Authenticating an object in particular refers to identifying a specific object. Preferably, the method is adapted to authenticate a human being in order to allow access to locked resources with restricted access. In an embodiment, the authentication of a human being is utilized to allow or deny access to a computing device.

The term device generally refers to a technical device that is capable of providing an illumination and/or of triggering to capture an image. The device may comprise a plurality of sub-devices, e.g. camera, processor, memory, display, modules capable of communicating via (tele-)communication (5G, Wi-Fi, Bluetooth etc.) interfaces. Preferably, the device may further comprise and/or may be associated with a server, such as a cloud server, a virtual server, a cloud-based server. In an embodiment, the device is a handheld device, such as a smartphone or the like. In an embodiment, the object may be a user of the device.

The device is configured such that the user may perform at least one operation on the device. An operation may for example be any interaction (input and/or output) with the device, for which the device is capable. In an embodiment, such operation is only possible after the user of the device is identified and/or authorized. Hence, fraudulent operations or operations by an attacker, e.g. using spoofing techniques, is prevented by an improved identification and/or authentication of the object (i.e. the user). This technical advantageous effect is inter alia achieved by the claimed subject-matter.

In particular, as the identification and/or authentication is based on material information, identification and/or authentication can hardly be spoofed using images, masks or replica. Further, the materials of certain accessories and/or the accessories itself, e.g. beard, glasses, head, scarf or the like may be an information on which identification and/or authentication may be based. In particular, the device may distinguish between skin and non-skin material. Hence, spoofing attacks are prevented in a satisfactory manner and the overall security level of the device is increased.

In a further step, the device receives a request to unlock the device. The request may be provided by the object, in particular, by the user that e.g. aims to interact with the device. In an embodiment, the request may received from a user interface or the like that, in particular, is associated with the device. The request may be an unlock request, e.g. a request to put the device into a state in which the user may interact with the device, e.g. to perform at least one operation on the device.

In response to receiving the request, the device provides an illumination. While illumination is provided, the device captures at least one image. Preferably, the illumination is an illumination of the object. Even more preferably, the image is an image of the object. In a possible embodiment of the invention, the device may provide a visual, audible or the like indication to the object to put the device into a position such that the illumination illuminates the object, and, In an embodiment, that the image may be captured such that it shows the object, or parts of the object, e.g. in the face of the user. In an alternative embodiment, such an indication is not necessary, that is, the illumination and the image may independent of the object. However, in case the illumination was sufficient and/or the image later does not show the object in a sufficient manner, as e.g. wrong parts of the object are on the image and/or parts of the object on the image are illuminated in a sufficient manner due the e.g. a misplaced illumination, the later identification and/or authentication is denied as e.g. the device inter alia determines that the image and/or the material information from the image is not suitable to identify and/or authenticate the object.

In an embodiment, the illumination is triggered by the device and/or the device triggers to capture the image. Accordingly, in an embodiment, a camera or the like and/or illuminators (as each e.g. described with further detail below) are located on the device and/or associated with the device. In an embodiment, the illumination is an infrared illumination. In an even more preferred embodiment of the invention, illumination is a flood illumination and/or a patterned illumination. In an even more preferred embodiment of the invention, illumination is an infrared flood illumination and/or an infrared patterned illumination. Accordingly, in an embodiment, the image is a pattern image, as described with further details above and below.

Hence, in an embodiment, material information is extracted from the infrared pattern image data.

In a further step, material information is extracted from the image. Preferably, the image comprises the pattern image and/or the partial image. Material information is identically denoted as material data within this specification of the invention. In an embodiment, the extracting of material information is performed as described herein above and below with further details.

In an embodiment, wherein the image comprises a pattern image, the extracting of material information comprises extracting material information of the object from the pattern image of the object, and/or applying an image filter, in particular, a material dependent image filter, on a beam profile of the image to generate a depth map.

In an embodiment, wherein the extracting material information of the object from a pattern image of the object comprises: receiving the pattern image showing the object; manipulating the pattern image to generate a partial image; extracting material information of the object from the partial image by providing the partial image to a data-driven model, wherein the data-driven model is parametrized according to a training data set including partial images and material information; providing the extracted material information.

In an embodiment, the image comprises a pattern image. Pattern image may show the object and may be received. Extracting material information of the object from a pattern image of the object may comprise manipulating the pattern image to generate a partial image; extracting material information of the object from the partial image by providing the partial image to a data-driven model, wherein the data-driven model is parametrized according to a training data set including partial images and material information. Extracted material information may be provided.

In an embodiment, all possible combinations of the embodiments of extracting material information of the object from a pattern image of the object as described above, apply.

Preferably, material information may be derived by using a NN and/or depth information may be derived from a beam profile analysis via one or more appropriate filters. More preferably, in contrast to the prior art using triangulation in structured light approach, in an embodiment, patter analysis, preferably, regular pattern analysis, of the pattern, may be used for depth recognition.

As explained above, one process for generating material data from an (infrared) image (data) is via BPA. Hence, the model may comprise one or more filtering techniques. This approach inter alia applies and is relevant for recognition, of e.g. a face etc., based on material information, and hence, for extracting material information for validation in authentication and/or identification process. BPA as described in WO 2020/187719 A1, as explained below. BPA provides a possible generation of material information by applying material dependent image filter to one or more pattern features. The disclosure of WO 2020/187719 A1 is hereby incorporated by reference.

In a further step, the object is identified and/or authenticated based on the material information. In a particular embodiment, a data-driven model may be parametrized to map the image to a classifier such as human skin or not, a certain material (e.g. metal, silicone, etc.) or not, et cetera. In an embodiment, the model may also be parametrized to more complex outputs such as human skin, material class or the like. Based on the material information, the authentication and/or identification process may be validated. For example, in case no human skin is detected in the image via the material information, the authentication and/or identification process may be stopped. In such case, spoofing is likely. However, if skin is detected, an authentication process on the flood light image may be performed as described with further details below.

In an embodiment, identification and/or authentication may use a facial recognition authentication process that operates on the pattern image and/or the infrared pattern image and/or the material information and/or the material data. In an even more preferred embodiment, the facial authentication process may be validated based on the material information and/or the material data.

In an embodiment, the generation of material information may include determining a material heatmap (as described below) signifying the material distribution in the region of interest. The heat map may be a scalar field of material information as derived from the data-driven model. In an embodiment, the operation requiring identification and/or authentication may includes unlocking the device. In an embodiment, material information may be extracted for a region of interest of the object shown in the image, e.g. the face, or parts of the face of the user of e.g. the device. In an embodiment, the patterned infrared illumination may comprise a periodic and/or regular pattern, preferably, a hexagonal dot pattern with 1000-2000 dots per image or pseudo-random structured light. In an embodiment, the method further comprises the step of generating depth map from infrared image data, e.g. a heat map (as described below) for which the parameters relate to the depth and/or the depth distribution of the object shown by the image. In an embodiment, the step of extracting material information from the image may comprise a generation of material information and/or material data.

In an embodiment, the generation of material information may comprise determining a binary classifier discriminating, e.g. between skin and no-skin and/or a particular material (e.g. silicon, metal etc.) and not that particular material. In a more preferred embodiment, the generation of material information may comprise determining a material classifier signifying the material.

The extraction of material information may be based on a data-driven model such as a trained neural network such as a convolutional neural network, in the following simply denoted as a model. The model may be parametrized to map a partial image or an image to a classifier such as human skin or no human skin, material or no material. Alternatively or supplementary the model may be parametrized to more complex outputs such as material classifier signifying the material, e.g. human skin, material class (latex, silicon, fabric) or the like. Based on such extraction of material information the identification and/or the authentication process may be performed and/or validated.

A label may be the binary classifier that e.g. discriminates between material/no-material or human skin/no human skin. Preferably, a label may include more metadata such as additional annotations per masks, mask materials like silicon, latex mask, mask brand or one or more facial features such as beard, glasses, hat or the like.

During training of model, data including an image and/or a representation and/or label and/or cluster may be fed into a classifier network such as a convolutional neural network (CNN) using supervise or self-supervised learning techniques. The trained model after may output, and hence extract, the material information relating to and/or comprising one or more labels.

In a further embodiment of the present invention the technical problem of the invention is solved by the computer implemented method, wherein the illumination comprises pattern illumination and/or flood light illumination, in particular, an infrared pattern illumination and/or an infrared flood light illumination, the at least one image comprises a series of images captured while the pattern illumination and/or the flood light illumination is provided; and wherein the series comprises pairs of at least two images and/or at least two composite images.

According to a preferred embodiment, a flood light image and/or a pattern image may be received. Preferably, the flood light image shows the object while it is illuminated with flood light, e.g. flood light illumination is provided. The pattern image shows the object while it is illuminated with pattern illumination. In an embodiment, alternative to a flood light image also a natural light image showing the object while illuminated by a natural light or artificial indoor light can be utilized. In an embodiment, the pattern illumination may be an infrared pattern illumination and/or the flood light illumination may be an infrared flood light illumination.

In an embodiment, the device being an image recording device, for example a mobile device, a cell phone or the like, can be provided with two illuminators, one for illuminating flood light, e.g. an LED, and one for illuminating a light pattern, e.g. a VCSEL array. A camera, or the like, of the device may capture at one point in time the object illuminated by flood light and at another point in time illuminated by light patterns. In a more preferred embodiment, these images, may then passed to a processor which can be configured to execute a neural network. In an even more preferred embodiment, the processor may be adapted to perform at least the image processing in a secure environment to avoid external access to the operation.

In an embodiment, the pattern of the pattern illumination and/or the pattern image may comprises pattern features, e.g. point clouds, hexagonal or tricline lattices of spots. In the pattern image, the position of each spot may be determined, for example, by determining local intensity maxima in the pattern image. In the flood light image, the object can be identified by its shape. For each or both determinations for example trained convolutional neural networks may be used.

It is preferred that the images of the series of images are taken at the same time or at least in a predetermined time range around the time at which the pattern image has been taken. It is further preferred that the images of the series are taken by the same camera or an additional camera comprising a predetermined distance the first camera.

In a further embodiment of the present invention the technical problem of the invention is solved by the computer implemented method, wherein the method comprises generating at least one representation from the material information, and matching the representation with an associate reference template vector for material.

In a further embodiment of the present invention the technical problem of the invention is solved by the computer implemented method,
    wherein material information is extracted by
        providing the partial images to a data-driven model, wherein
            the data-driven model is trained on a training dataset of partial images and material information, and
            generating material information related to the partial images.
In a further embodiment, image may be a partial image including one or more pattern features generated out of the pattern image showing at least a part of the object while the object is illuminated with a light pattern via manipulation and material information is extracted by providing the partial images to a data-driven model, wherein
            the data-driven model is trained on a training dataset of partial images and material information, and
            generating material information related to the partial images.
In a further embodiment, image may be a partial image showing at least a part of the object while the object is illuminated with a light pattern
    and material information is extracted by providing the partial images to a data-driven model, wherein
            the data-driven model is trained on a training dataset of partial images and material information, and
            generating material information related to the partial images.
In a further embodiment of the present invention the technical problem of the invention is solved by the computer implemented method, wherein at least one representation is generated by applying a material filter to one or more pattern features of the pattern image. The representation may comprise a representation of a luminance included in the material information and/or a representation of a translucence included in the material information.

In an embodiment, a representation is a mapping of a discrete variable to a vector of continuous numbers. In the context of e.g. neural networks, representations are low dimensional, learned continuous vector representations of discrete variables. The use and/or generation of at least one representation within the invention achieves that the dimensionality of categorical variables is reduced. The representations overcome the limitations of traditional encoding methods and may be used for purposes such as finding nearest neighbours, input into another model, and visualizations. As a result, the generation and/or use of at least one representation provides the technically advantageous effect, for example, that background may be suppressed and hence that the size of the model is reduced. Thus, storage and/or processing of the model on the device is significantly reduced.

In an embodiment the extracting of the material information from the image comprises extracting of the material information from a manipulated image, wherein the manipulated image is provided by manipulating the image, wherein the manipulating of the image comprises: suppressing texture information from the object located in a region of interest, in particular, a face of the user; and/or partitioning the image and/or data of the image; and/or cropping the image to a partial image; and/or determining a bounding box for a region of interest in the image and cropping the image to extract the region of interest.

The texture information may arise from an object of interest and/or one or more parts of interest of one or more objects, all located in the region of interest. In an embodiment, the manipulation of the image corresponds to the manipulation of the pattern image as described herein with further details.

In a further embodiment, wherein the extracting of the material information comprises determining a binary classifier discriminating between material and no-material, in particular, skin and no-skin; and/or determining a material classifier signifying the material; and/or determining a material heatmap signifying a material distribution in a region of interest, in particular, a face of the user.

In a further embodiment of the present invention the technical problem of the invention is solved by a device for identifying an object, in particular, for authenticating an object, wherein the device comprises a processor comprising a receiving unit configured to receive a request to unlock the device; a provisioning unit configured to to provide, in response to receiving the request, an illumination; a capturing unit configured to capture at least one image while the illumination is provided; an extracting unit configured to extract material information from the image; and an identifying unit, in particular, an authenticating unit configured to identify the object, in particular, authenticate the object based on the material information.

In a further embodiment of the present invention the technical problem of the invention is solved by the device, wherein the object is a user of the device, the device is for authorizing the user to perform at least one operation on the device that requires authentication, in particular, unlocking the device, wherein the receiving of the request comprises receiving from a user interface associated with a device, the request to unlock the device, the capturing of the at least one image comprises capturing the at least one image of the user using a camera located on the device while the user is being illuminated with the illumination; the processor is configured to perform allowing or declining the user to perform the at least one operation on the device that requires authentication based on the material information.

In a further embodiment of the present invention the technical problem of the invention is solved by a non-transitory computer-readable data medium storing a computer program including instructions causing a computer to execute the steps of the method of the invention.

In a further embodiment of the present invention the technical problem of the invention is solved by a computer program for identifying an object, in particular, for authenticating an object, the computer program including instructions causing a computer to execute the steps of the method according to the invention.

In a further embodiment of the present invention the technical problem of the invention is solved by a computer program for identifying an object, in particular, for authenticating an object, the program comprising program code means for causing a system and/or an apparatus and/or a device, or the like, to execute a method according to the invention, when the program is run on a computer controlling the system and/or the apparatus and/or the device, or the like.

In a further aspect of the present invention the technical problem of the invention is solved by a computer implemented method for authorizing a user of a device to perform at least one operation on the device that requires authentication, wherein the method comprises: receiving, a request to unlock the device; receiving, in response to receiving the request, at least one image of the user; generating pattern image data, in particular infrared pattern image data, for a region of interest from the at least one image; extracting the material information from the pattern image data; determining at least one occlusion from the material information; allowing or declining the user to perform at least one operation on the device that requires authentication based on the material information and/or the at least one occlusion.

In an embodiment, the method steps are performed by the device. In an embodiment, the user may be an object to be identified and/or authenticated.

In general, an occlusion may be an object and/or part which is not of interest and which hides another object and/or part which is of interest and/or shall be examined, e.g. extraction of information, identification, authentication, etc. Occlusion detection may refer to a technique aiming to detect areas in an object and/or an image of such object that are or appear occluded, i.e. hidden due to the presence of an occlusion. An occlusion is insofar problematic, as it limits the information available of the object or in the image of the object. An occlusion may be transparent or non-transparent or partially transparent. In general, for the present invention, an occlusion is an object that may be not relevant and/or disturb for identification and/or authentication of another object that shall be identified and/or authenticated and/or for authorizing a user of a device. An occlusion may in some way hide parts of the object to be identified and/or authenticated and/or authorized. In an embodiment, when the object to be identified and/or authenticated and/or authorized, relates to a face, an occlusion may relate to glasses, scarf, mask, replica, random objects like books, cups, or the like.

A human being aiming to identify and/or authenticate and/or authorized an object is capable of ignoring an occlusion and focuses the identification and/or authentication and/or authorization on the non-occluded parts or areas of the object. However, even for perfectly trained neural networks it is highly challenging to detect an occlusion or perform a process of identification and/or authentication and/or authorization of an object when an occlusion is present. In particular, CNN based models do not function well because of larger intra-class variation and higher inter-class similarity caused by one or more occlusions.

Extracting material information and determining at least one occlusion from the material information, as it is provided by the invention, allows a more reliable and simpler occlusion detection. In particular, the size of the model (e.g. NN or CNN etc.) can be reduced and at the same time much improved results of identification and/or authentication and/or authorization are achieved. In particular, identification and/or authentication and/or authorization of a face is improved, as according to the invention material information may be used, that is skin or non-skin, metal, silicone or the like, to detect at least one occlusion. Based on the material information, e.g. material distribution, occlusions may be determined. Material information may be equally denoted as material data.

In an embodiment, the object and/or the user may aim to perform an operation on the device. The device may require identification and/or authentication and/or authorization that may be based on the material information and/or the occlusion and/or the occlusion evaluation for allowing or declining the user to perform at least one operation on the device.

In an embodiment, the pattern image may comprise an infrared pattern image.

In an embodiment, the region of interest relates to the whole image or one or more parts of the image that may be disjoint or may overlap. For example, in case the image shows the upper part of a body, the region of interest may be the face. In an embodiment, in case the user is wearing a mask, the material information of the region of interest, e.g. the face, may be extracted and/or determined. In an embodiment, it then may be determined that e.g. half of the region of interest is of skin material and e.g. the other half is of mask material, e.g. paper, tissue or the like.

In an embodiment, in response of determining the occlusion a full or a partial recognition may be performed, e.g. of a region of interest, a face, or the like.

In a further embodiment, wherein the receiving of the request comprises receiving the request from a user interface associated with the device, the request to unlock the device, the at least one image is captured by a camera located on the device while the user is being illuminated with an illumination, in particular, a flood illumination and/or a patterned illumination, in particular, an infrared flood illumination and/or an infrared patterned illumination.

In a further embodiment, wherein the image comprises a pattern image, the extracting of material information comprises extracting material information of the user from the pattern image of the user through a filtering technique. Filtering techniques may include applying an image filter, in particular, a material dependent image filter, to one or more pattern features.

In a further embodiment, wherein the extracting material information comprises: manipulating the pattern image or one or more partial image(s) to generate a partial image; extracting material information of the user from the partial image by providing the partial image or the one or more partial image(s) to a data-driven model, wherein the data-driven model is parametrized according to a training data set including partial images and material information; providing the extracted material information.

In a further embodiment, wherein the illumination comprises pattern illumination and/or flood light illumination, in particular, an infrared pattern illumination and/or an infrared flood light illumination, the at least one image comprises a series of images captured while the pattern illumination and/or the flood light illumination is provided. The pattern image may show the object while the object is illuminated with a pattern illumination. The pattern illumination may be a regular pattern and/or a periodic pattern with pattern features such as dots and/or speckles. The pattern features may include at least 2, preferably at least 6, more preferably at least 20 pattern features and/or dots and/or speckles per face area at a distance of 5-200 cm, preferably 30-60 cm, more preferably 15-80 cm. The pattern illumination, in particular, the infrared pattern illumination may have a wavelength from 700 nm to 1100 nm. The series may comprise pairs of at least two images and/or at least two composite images; and wherein the pattern illumination, in particular, the infrared pattern illumination comprises a periodic and/or regular pattern, preferably, a hexagonal dot pattern with 1000-2000 dots per image and/or pseudo-random structured light.

In a further embodiment, wherein the method according to any of the preceding claims, wherein the extracting of the material information from the image comprises: determining a binary classifier discriminating between material and no-material, in particular, skin and no-skin; and/or determining a material classifier signifying the material; and/or determining a material heatmap signifying a material distribution in a region of interest, in particular, a face of the user; and/or extracting of the material information from a manipulated image, wherein the manipulated image is provided by manipulating the image, wherein the manipulating of the image comprises: suppressing texture information from the user located in a region of interest, in particular, a face of the user; and/or partitioning the image and/or data of the image; and/or cropping the image to a partial image; and/or determining a bounding box for a region of interest in the image and cropping the image to extract the region of interest.

In an embodiment, all possible combinations of the embodiments of extracting material information of the object from a pattern image of the object as described above, apply.

In an embodiment, all possible combinations of the embodiments of identifying an object, in particular, for authenticating an object as described above, apply.

In a further embodiment of the present invention, the technical problem of the invention is solved by the computer implemented method, further comprising determining at least one material heat map signifying the material distribution in the region of interest.

In an embodiment, the identifying and/or authenticating of the object and/or authorizing of the user is further based on the material distribution e.g. in the region of interest and/or the amount of the occlusion and/or at least one material type for one or more parts of the image. In an embodiment, the amount of occlusion is of the object and/or the image showing the object and/or at least one region of interest and/or the face. In a more preferred embodiment of the invention, the heat map is generated for the object and/or at least one region of interest and/or the face in the at least one image.

In an embodiment, a material heat map provides a possibility of presenting and/or assigning of different colors to different parameters, e.g. different material information. Hence, providing material heat maps signifying the material distribution provides a way of visualizing parts of the image which show parts of the object or user comprising and/or relating to different material information. In general, a heat map is a visualization of data comprising a visualization of certain parameters, e.g. material information, by the use of different colors.

In general, a landmark relates to a feature that is detected, a feature of the object or user that is detected in the image of the object, e.g. a flood light image. In case the object or user is a face, a landmark may be the eye, the nose, the mouth or the like. In an embodiment, a model, e.g. the CNN is trained and/or is provided that is capable of detecting one or more landmarks inside an image.

In an embodiment, based on the material information the results for the one or more partial images may be stitched together to a full image. Hence, a material distribution of the object may be determined. Preferably, based on the material distribution the at least one occlusion may be determined. In an even more preferred embodiment, the at least one occlusion may be associated with one or more landmarks like eyes, mouths or the like, preferably from the flood light image.

In an embodiment, based on the association with one or more landmarks a rule set may be used to validate the face authentication process. For example if a mask or the like is associated with the eye landmark, the process may be stopped. Similar features like beard, glasses, hat, scarf or the like may undergo a rule based consistency check. Hence, spoofing attacks prevented to a high degree and the security level is increased.

In an embodiment, based on the material distribution associated with landmarks, the one or more occlusion may be specified. If e.g. the face is not occluded, e.g. a full face recognition is performed. If e.g. the face is occluded, partial face recognition may be performed. Preferably, for face recognition, the amount of occlusion may be determined from material heatmap. If the amount is below a threshold and/or validated via a rule set, the partial face recognition may be performed.

In a further embodiment, wherein in response to the determining of at least one occlusion, a full recognition and/or a partial recognition, in particular of a face of the user, is performed.

In a further embodiment, the method further comprises: determining a position of one or more landmarks in the at least one image, and aligning at least one material heat map with the position of the one or more landmarks.

In a further embodiment, the method further comprises: determining and/or evaluating an amount of the occlusion, in particular of the face, from at least one material heatmap, wherein determining and/or evaluating the amount comprises evaluating a rule set and/or one or more occlusion scores from the material heat map, and/or providing a response signal to decline or execute recognition, in particular full recognition and/or a partial recognition. In a further embodiment, the method further comprises: determining and/or evaluating an amount of the occlusion of the face, wherein the determining and/or evaluating the amount comprises evaluating the amount of occlusion of the nose and/or mouth and/or at least one eye on the face in the at least one image.

In a further embodiment, wherein based on the amount of occlusion of the face determined and/or evaluated in the at least one image, a partial and/or complete facial authentication process on the at least one image is performed.

In a further embodiment of the present invention the technical problem of the invention is solved by the computer implemented method, wherein the illumination comprises pattern illumination and/or flood light illumination, the at least one image comprises at least one pattern image and/or at least one flood light image, the pattern image is an image captured while the pattern illumination is provided and the flood light image is an image captured while the flood light illumination is provided; and wherein the method further comprises determining a portion of the at least one occlusion from a heatmap of the at least one pattern image, cropping the at least one flood light image to exclude the portion, and performing authentication, in particular face authentication, on flood light image, in particular, based on facial features.

In an embodiment, flood light image may be used in the full and/or partial facial authentication process. Preferably, the portion may relate to the parts of the image showing the full and/or parts of the one or more occlusion. In an embodiment, cropping, as inter alia described herein for the invention is applied to the portion, e.g. such that the part of the image showing the eye area of the face may be used for further processing, e.g. for extracting material information, identifying and/or authenticating and/or authorizing the object or user.

In a further embodiment of the present invention the technical problem of the invention is solved by a device for authorizing a user of a device to perform at least one operation on the device that requires authentication, the device comprising a processor configured to perform the following steps: receiving, a request to unlock the device; receiving, in response to receiving the request, at least one image of the user; generating pattern image data, in particular infrared pattern image data, for a region of interest from the at least one image; extracting the material information from the pattern image data; determining at least one occlusion from the material information; allowing or declining the user to perform at least one operation on the device that requires authentication based on the material information and the at least one occlusion.

In a further embodiment of the present invention the technical problem of the invention is solved by a non-transitory computer-readable data medium storing a computer program including instructions causing a computer to execute the steps of the method according to the invention.

In a further embodiment of the present invention the technical problem of the invention is solved by a computer program for authorizing a user of a device to perform at least one operation on the device that requires authentication, the computer program including instructions causing a computer to execute the steps of the method according to the invention.

In a further embodiment of the present invention the technical problem of the invention is solved by a computer program for authorizing a user of a device to perform at least one operation on the device that requires authentication, the program comprising program code means for causing a system and/or an apparatus and/or a device, or the like, to execute a method according to the invention, when the program is run on a computer controlling the system and/or the apparatus and/or the device, or the like.

In a further embodiment of the invention, the following is presented, a method for extracting material information from a pattern image of an object, wherein the pattern image includes contributions from reflections of the pattern illumination and from the texture of the object: receiving pattern image(s) acquired by a sensor from a pattern illuminated object; manipulating pattern image(s) to generate partial image(s) including at least part of the (one or more) pattern features; training a data-driven model to determine material information from the pattern image, wherein the training includes parametrizing the data-driven model according to a training data set including partial images and material information, providing the trained model.

In a further embodiment of the invention, a method for extracting material information from a pattern image of an object, wherein the pattern image includes contributions from reflections of the pattern illumination and from the texture of the object: receiving pattern image(s) acquired by a sensor from a pattern illuminated object; manipulating pattern image(s) to generate partial image(s) including at least part of the (two or more) pattern features; extracting material information by providing the partial images to a data-driven model, wherein the data-driven model is parametrized according to a training data set including partial images and material information; providing the extracted material information.

In a further embodiment of the invention, an apparatus for processing pattern image of an object to extract material information, wherein the pattern image includes contributions from reflections of the pattern illumination and from the texture of the object, the apparatus including: receiving unit configured to receive pattern image(s) acquired by a sensor from a pattern illuminated object; manipulating unit configured to manipulate pattern image(s) to generate partial image(s) including at least part of the (one or more) pattern features; training unit configured to train a data-driven model to determine material information from the pattern image, wherein the training includes parametrizing the data-driven model according to a training data set including partial images and material information, providing unit configured to provide the trained model.

In a further embodiment of the invention, an apparatus for processing pattern image of an object to extract material information, wherein the pattern image includes contributions from reflections of the pattern illumination and from the texture of the object, the apparatus including: receiving unit configured to receive pattern image(s) acquired by a sensor from a pattern illuminated object; manipulating unit configured to manipulate pattern image(s) to generate partial image(s) including at least part of the (one or more) pattern features; extracting unit configured to extract material information by providing the partial images to a data-driven model, wherein the data-driven model is parametrized according to a training data set including partial images and material information; providing unit configured to provide the extracted material information.

In a further embodiment of the invention, manipulated image data for extracting material information from a pattern image acquired by an IR sensor, wherein the manipulated image data includes partial images including at least part of the pattern features present in the pattern image and at least one representation associated with the physical signature embedded in the reflections of the partial image or at least one class associated with the representation.

In a further embodiment of the invention, use of the trained model to authenticate an object, in particular to biometrically authenticate an object.

In a further embodiment of the invention, use of the manipulated data to extract material information to authenticate an object, in particular to biometrically authenticate an object.

In a further embodiment of the invention, the pattern in the pattern image results from a pattern illuminated object.

In a further embodiment of the invention, the illumination pattern is a regular or periodic pattern.

In a further embodiment of the invention, the pattern is a dot or speckle pattern, preferably with at least 20 dots or speckles per face area at a distance of 20-60 cm or 15-80 cm.

In a further embodiment of the invention, the object is a face.

In a further embodiment of the invention, the material information is derived from reflections of the pattern illumination.

In a further embodiment of the invention, the material information relates to human skin, silicone, resin, latex, paper and/or mask materials.

In a further embodiment of the invention, the manipulation includes determining a representation of the partial image, wherein the representation is associated with the physical signature embedded in the reflections of the partial image.

In a further embodiment of the invention, the manipulation includes and/or the method comprises clustering of the partial images based on their representation, wherein the determined cluster is associated to the representation.

In a further embodiment of the invention, clustering comprises classifying and/or grouping of similar images due to luminance, translucency and/or a background such that the material information is independent of the background.

In a further embodiment of the invention, the partial image, the representation of the corresponding partial image and the cluster of the corresponding partial image are provided to the trained model to extract material information from the pattern image.

In a further embodiment of the invention, the model is a data-driven model, wherein the model is parametrized based on partial image training data, the representation of the corresponding partial image and the cluster of the corresponding partial image, wherein the model is parameterized to extract material information from the partial images.

In a further embodiment of the invention, the material information includes a material class or type.

In a further embodiment of the invention, the following is presented, a method for authorizing a user of a device to perform at least one operation on the device that requires authentication, comprising the steps: receiving, from a user interface associated with a device, an unlock request for the device from a user; in response to receiving the unlock request, triggering illumination of the user with flood infrared illumination and patterned infrared illumination; triggering to capture at least one image of the user using a camera located on the device while the user is being illuminated with the patterned infrared illumination; extracting material data from the infrared pattern image data; and allowing or declining the user to perform at least one operation on the device that requires authentication based on the material data.

In a further embodiment of the invention, a device for authorizing a user of a device to perform at least one operation on the device that requires authentication, the device comprising a processor configured to perform the following steps: receiving, from a user interface associated with a device, an unlock request for the device from a user; in response to receiving the unlock request, triggering illumination of the user with flood infrared illumination and patterned infrared illumination; triggering to capture at least one image of the user using a camera located on the device while the user is being illuminated with the patterned infrared illumination; extracting material data from the infrared pattern image data; and allowing or declining the user to perform at least one operation on the device that requires authentication based on the material data.

In a further embodiment of the invention, the user is illuminated with the flood infrared illumination, wherein a series of images may be captured while user is exposed to pattern illumination and flood light illumination, wherein the series may include pairs of images or composite images.

In a further embodiment of the invention, the authentication uses a facial recognition authentication process operating on the infrared pattern image data and the material data.

In a further embodiment of the invention, the facial authentication process is validated based on the material information.

In a further embodiment of the invention, the facial recognition authentication process or its validation includes generating at least one feature vector (or representation) from the material data and matching the material feature vector (or representation) with associate reference template vector for material.

In a further embodiment of the invention, at least one material feature vector (or representation) is generated from providing the material data to a convolutional neural network trained on a training dataset of material data, generating an output and transforming the output to the material feature vector.

In a further embodiment of the invention, at least one material feature vector (or representation) is generated by applying a material filter to the material data.

In a further embodiment of the invention, the material feature vector (or representation) includes a representation of the luminance or translucence included in the material data.

In a further embodiment of the invention, the generation of material data includes manipulating the infrared image data to suppress texture information from an object of interest located in the region of interest.

In a further embodiment of the invention, the manipulation includes partitioning the infrared image data and cropping to partial images.

In a further embodiment of the invention, the generation of material data includes determining a binary classifier discriminating between skin and no-skin.

In a further embodiment of the invention, the generation of material data includes determining a material classifier signifying the material.

In a further embodiment of the invention, the generation of material data includes determining a material heatmap signifying the material distribution in the region of interest.

In a further embodiment of the invention, the operation requiring authentication includes unlocking the device.

In a further embodiment of the invention, the region of interest is a face of the user.

In a further embodiment of the invention, generating the infrared image data includes determining a bounding box for the region of interest in the image and cropping the image to extract the region of interest.

In a further embodiment of the invention, the patterned infrared illumination includes a periodic or regular pattern, preferably a hexagonal dot pattern with 1000-2000 dots per image or pseudorandom structured light.

In a further embodiment of the invention, the method comprises the step of generating depth map from infrared image data.

In a further embodiment of the invention, the following is presented, a method for authorizing a user of a device to perform at least one operation on the device that requires authentication, comprising: receiving, in response to receiving the unlock request, at least one image of the user using a camera located on the device while the user is being illuminated with the flood infrared illumination and/or the patterned infrared illumination; generating infrared pattern image data for the region of interest from the at least one image; extracting material data from the infrared pattern image data and determining occlusion from material data; and allowing or declining the user to perform at least one operation on the device that requires authentication based on the material data and the occlusion evaluation.

In a further embodiment of the invention, a device for authorizing a user of a device to perform at least one operation on the device that requires authentication, the device comprising a processor configured to perform the following steps: receiving, in response to receiving the unlock request, at least one image of the user using a camera located on the device while the user is being illuminated with the flood infrared illumination and/or the patterned infrared illumination; generating infrared pattern image data for the region of interest from the at least one image; extracting material data from the infrared pattern image data and determining occlusion from material data; and allowing or declining the user to perform at least one operation on the device that requires authentication based on the material data and the occlusion evaluation.

In a further embodiment of the invention, the generation of material data includes determining a material heatmap signifying the material distribution in the region of interest.

In a further embodiment of the invention, in response to the occlusion determination a full or a partial face recognition is performed.

In a further embodiment of the invention, an amount of occlusion is determined from material heatmap.

In a further embodiment of the invention, evaluating the amount of occlusion of the face includes evaluating a rule set or one or more occlusion scores from the material heat map generated for the face in the at least one image.

In a further embodiment of the invention, based on the amount of occlusion of the face evaluated in the at least one image complete facial authentication process on the at least one image is performed.

In a further embodiment of the invention, the method comprises the further step of determining the position of one or more landmarks in the at least one image, and aligning the at least one material heat map with the position of the landmark.

In a further embodiment of the invention, evaluating the amount of occlusion of the face comprises evaluating the amount of occlusion of the nose and mouth on the face in the at least one image.

In a further embodiment of the invention, evaluating the amount of occlusion of the face comprises determining a material type.

In a further embodiment of the invention, the user is illuminated with the flood infrared illumination, wherein a series of images may be captured while user is exposed to pattern illumination and flood light illumination, wherein the series may include pairs of images or composite images, wherein the face authentication is performed on flood light image based on facial features.

In a further embodiment of the invention, the at least one flood light image for the partial facial authentication process is cropped to exclude the occluded portion as determined from the corresponding heatmap of the at least one pattern image (preferably to the eye area of the face).

In a further embodiment material information may be extracted by evaluation of at least one beam profile of the pattern image. The at least one material information may be determined by applying at least one first material dependent image filter to the pattern image. The material dependent image filter may be at least one filter selected from the group consisting of: a luminance filter; a spot shape filter; a squared norm gradient; a standard deviation; a smoothness filter such as a Gaussian filter or median filter; a grey-level-occurrence-based contrast filter; a grey-level-occurrence-based energy filter; a grey-level-occurrence-based homogeneity filter; a grey-level-occurrence-based dissimilarity filter; a Law's energy filter; a threshold area filter; or a linear combination thereof; or a second material dependent image filter which may correlate to one or more of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof.

In an embodiment distance information may be extracted from the pattern image. The at least one distance feature may be determined by applying at least one first distance dependent image filter to the patter image. The first distance dependent image filter may be at least one filter selected from the group consisting of: a depth-from-photon-ratio filter; a depth-from-defocus filter; or a linear combination thereof; or a second distance dependent image filter. The second distance dependent image filter may correlate to the depth-from-photon-ratio filter and/or the depth-from-defocus filter or a linear combination thereof. In a further embodiment, a third image filter and a forth image filter may apply. The third image filter may be one of the depth-from-photon-ratio filter or the depth-from-defocus filter or a linear combination thereof. The forth image filter may be one of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof.

In an embodiment the distance information, e.g. a longitudinal coordinate, and/or the material information may be determined based on applying a filter to one or more pattern feature(s) of the pattern image.

In an embodiment the method for authorizing a user may include generating a heatmap of the distance and/or material information. A heatmap of the distance and/or material information may provide a depth map to avoid spoofing the authorization process with a simple image.

In a further embodiment of the invention, the at least one material information may be a property selected from the group consisting of: a scattering coefficient, a translucency, a transparency, a deviation from a Lambertian surface reflection, a speckle, and the like.

In a further embodiment of the invention, the distance dependent image filter and the material dependent image filter be applied concurrent to the reflection image.

In a further embodiment of the invention, the sensor element may comprise at least one CMOS sensor.

In a further embodiment of the invention, the detector may comprise at least one illumination source. The illumination source may configured for generating at least one illumination pattern for illumination of the object. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature; at least one regular pattern; at least one triangular pattern; at least one hexagonal pattern; at least one rectangular pattern; at least one pattern comprising convex uniform tilings; at least one line pattern comprising at least one line; at least one line pattern comprising at least two lines such as parallel or crossing lines.

In a further embodiment of the invention, the illumination source may comprise at least one laser source and at least one diffractive optical element. It shall be understood that the methods as described above, the apparatus as described above and the computer-readable data media as described above have similar and/or identical preferred embodiments, in particular, as defined in the dependent claims. Moreover, also the training methods as described above, the training apparatus as described above, and the training computer-readable data medium as described above have similar and/or preferred embodiments, in particular, as defined in the dependent claims.

It shall be understood that a preferred embodiment of the present invention can also be any combination of the dependent claims or above embodiments with the respective independent claim.

These and other aspects of the present invention will be apparent from and elucidated with reference to the embodiments described hereinafter.

BRIEF DESCRIPTION OF THE DRAWINGS

In the following drawings:

FIG. 4 show schematically and exemplarily an embodiment of a flowchart for an embodiment of a biometric authentication process using facial features;

DETAILED DESCRIPTION OF EMBODIMENTS

Figure 1:
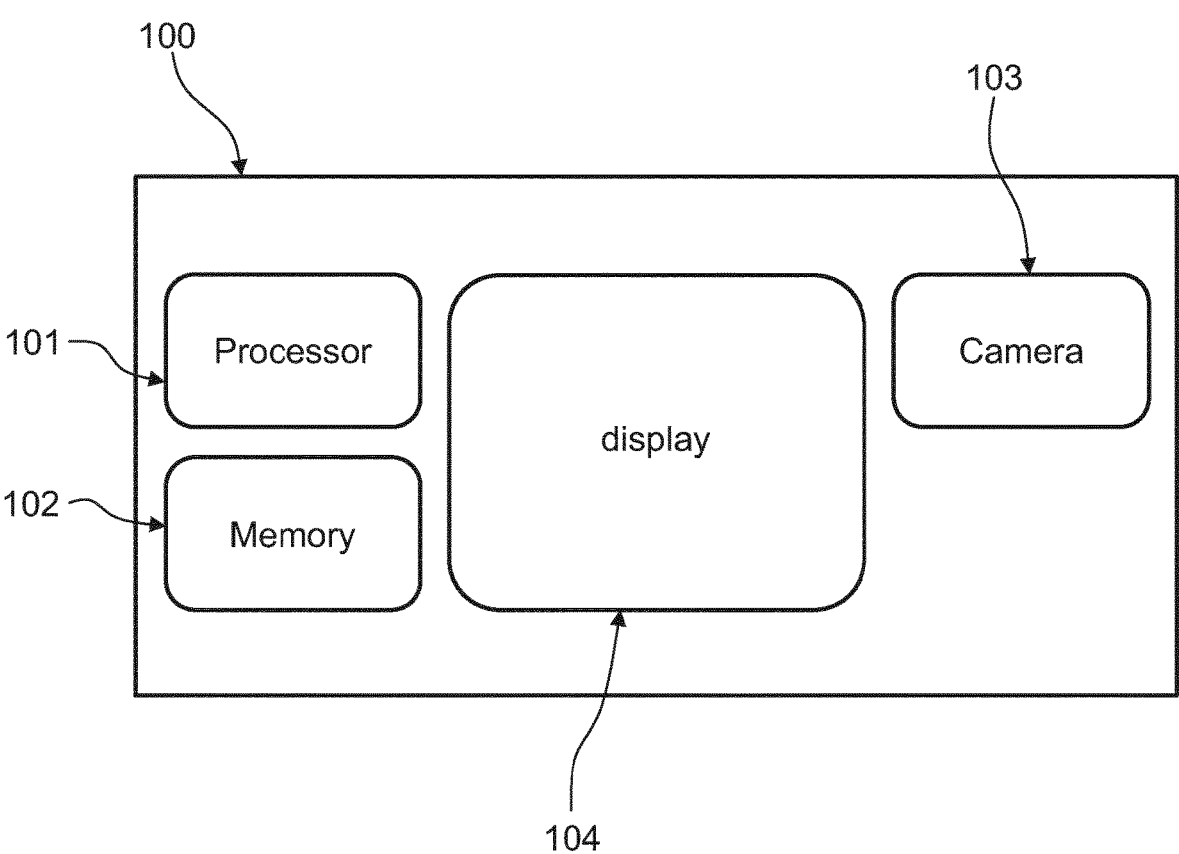
FIG. 1 shows schematically and exemplarily an embodiment of a device with processor, memory and camera.

FIG. 1 illustrates schematically and exemplarily an embodiment of a device 100 with processor 101, memory 102 and camera 103. In particular, FIG. 1 illustrates schematically and exemplarily the General hardware setup.

The device 100 may include camera 103, processor 101, memory 102, and display 104. The processor 101 is described with further details with respect to FIG. 3. Device 100 may be a computing device, such as a handheld device. Device 100 may any computing device which is mobile or portable. The device 100 may be a mobile device with wireless or RF communication capabilities (e.g., WLAN, Wi-Fi, cellular, and/or Bluetooth). Examples of mobile devices include mobile telephones or smart phones, tablet computers, laptop computers, portable gaming devices, portable Internet devices, and other handheld devices, as well as wearable devices such as smart watches, smart glasses, headphones, pendants, earpieces, etc. Display 104 may be, for example, an LCD screen or touchscreen configured for interactive input from the user. Camera 103 may be configured to capture images of the external environment of device. Camera may be positioned to capture images in front of display. Camera may be positioned to capture images of the user (e.g., the user's face) while the user interacts with display. The camera 103 is described with further details with respect to FIG. 2. Memory 102 may be a data memory. Memory 102 may be a physical system memory, which may be volatile and/or non-volatile. Memory 102 may comprise any computer-readable storage media such as a non-volatile mass storage. If the computing system is distributed, the processing and/or memory capability may be distributed as well.

Figure 2:
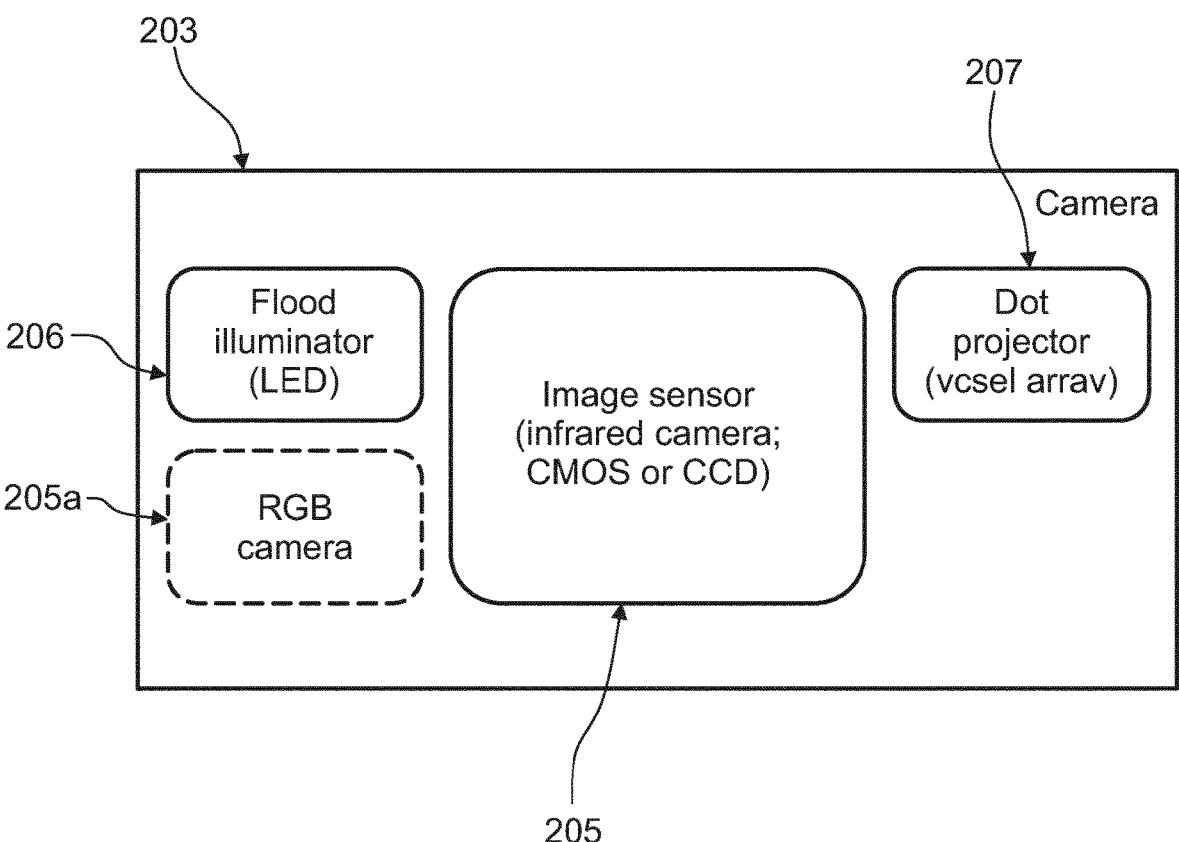
FIG. 2 shows schematically and exemplarily an embodiment of a camera.

As further described with respect to FIG. 2, the device 100 may comprise at least one projector being an illumination source. The illumination source may comprise at least one light source. The illumination source may comprise a plurality of light sources. The illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300 to 1100 nm, especially 500 to 1100 nm. Additionally or alternatively, light in the infrared spectral range may be used, such as in the range of 780 nm to 3.0 μm. Specifically, the light in the part of the near infrared region where silicon photodiodes are applicable specifically in the range of 700 nm to 1100 nm may be used. Using light in the near infrared region allows that light is not or only weakly detected by human eyes and is still detectable by silicon sensors, in particular standard silicon sensors. The illumination source may be adapted to emit light at a single wavelength. In other embodiments, the illumination may be adapted to emit light with a plurality of wavelengths allowing additional measurements in other wavelengths channels. The light source may be or may comprise at least one multiple beam light source. For example, the light source may comprise at least one laser source and one or more diffractive optical elements (DOEs).

The illumination source may be configured for generating at least one illumination pattern for illumination of the object. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature; at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. As used herein, the term "pattern" refers to an arbitrary known or predetermined arrangement comprising at least one arbitrarily shaped feature. The pattern may comprise at least one feature such as a point or symbol. The pattern may comprise a plurality of features. The pattern may comprise an arrangement of periodic or non-periodic features. As used herein, the term "at least one illumination pattern" refers to at least one arbitrary pattern comprising at least one illumination feature adapted to illuminate at least one part of the object. As used herein, the term "illumination feature" (also denoted as "pattern feature") refers to at least one at least partially extended feature of the pattern. The illumination pattern may comprise a single illumination feature. The illumination pattern may comprise a plurality of illumination features. For example, the illumination pattern may comprise at least one line pattern. For example, the illumination pattern may comprise at least one stripe pattern. For example, the illumination pattern may comprise at least one checkerboard pattern. For example, the illumination pattern may comprise at least one pattern comprising an arrangement of periodic or non periodic features. The illumination pattern may comprise regular and/or constant and/or periodic pattern such as a triangular pattern, a rectangular pattern, a hexagonal pattern or a pattern comprising further convex tilings. The illumination pattern may exhibit the at least one illumination feature selected from the group consisting of: at least one point; at least one line; at least two lines such as parallel or crossing lines; at least one point and one line; at least one arrangement of periodic or non-periodic feature; at least one arbitrary shaped featured. For example, the illumination source may be adapted to generate and/or to project a cloud of points. A distance between two features of the illumination pattern and/or an area of the at least one illumination feature may depend on the circle of confusion in the image. The illumination source may comprise the at least one light source configured for generating the at least one illumination pattern. Specifically, for generating and projecting the illumination pattern, the illumination source may comprise at least one laser source and at least one diffractive optical element (DOE). The detector may comprise at least one point projector, such as the at least one laser source and the DOE, adapted to project at least one point pattern. As further used herein, the term "projecting at least one illumination pattern" refers to providing the at least one illumination pattern for illuminating the at least one object. The projected illumination pattern may be scarce, as only a single illumination feature, such as a single point, may be present. For increasing reliability, the illumination pattern may comprise several illumination features such as several points. If the pattern is scarce, a single image can be used for detection of biological tissue and face identification simultaneously.

As used herein, the term "object" refers to a point or region emitting at least one light beam, in particular the at least one reflection pattern. For example, the object may be at least one object selected from the group consisting of: a scene, a part of a human body (e.g. the face, or parts of the face, etc.), a human such as a human, wood, carpet, foam, an animal such as a cow, a plant, a piece of tissue, a metal, a toy, a metallic object, a beverage, a food such as a fruit, meat, fish, a dish, a cosmetics product, an applied cosmetics product, cloth, fur, hair, a maintenance product, a cream, an oil, a powder, a carpet, a juice, a suspension, a paint, a plant, a body, a part of a body, organic material, inorganic material, a reflective material, a screen, a display, a wall, a sheet of paper, such as photograph. The object may comprise at least one surface on which the illumination pattern is projected. The surface may be adapted to at least partially reflect the illumination pattern back towards the detector. For example, without wishing to be bound by this theory, human skin may have a reflection profile, also denoted back scattering profile, comprising parts generated by back reflection of the surface, denoted as surface reflection, and parts generated by very diffuse reflection from light penetrating the skin, denoted as diffuse part of the back reflection. With respect to reflection profile of human skin reference is made to "Lasertechnik in der Medizin: Grundlagen, Systeme, Anwendungen", "Wirkung von Laserstrahlung auf Gewebe", 1991, pages 171 to 266, Jürgen Eichler, Theo Seiler, Springer Verlag, ISBN 0939-0979. The surface reflection of the skin may increase with the wavelength increasing towards the near infrared. Further, the penetration depth may increase with increasing wavelength from visible to near infrared. The diffuse part of the back reflection may increase with penetrating depth of the light. These material properties may be used to distinguish skin from other materials, specifically by analyzing the back scattering profile.

FIG. 2 illustrates schematically and exemplarily an embodiment of a camera 203. Camera 203 may correspond to the camera 103 of FIG. 1. In particular, FIG. 2 illustrates schematically and exemplarily the general hardware setup.

The invention relates to a dividing a pattern image into partial pattern images. For this purpose, at least two projectors may be provided: Flood illuminator 206 for illuminating flood light, e.g. an LED, and dot projector 207 for illuminating a light pattern, e.g. a VCSEL array. A vertical-cavity surface-emitting laser (VCSEL) is a type of semiconductor laser diode with laser beam emission perpendicular from the top surface, contrary to conventional edge-emitting semiconductor lasers (also denoted as in-plane lasers) which emit from surfaces formed by cleaving the individual chip out of a wafer.

Dot projector 207 may generate a light pattern on an object. The light pattern may refer to a predetermined light pattern. The light pattern may comprises a plurality of pattern features. For example, light spots as pattern features that can be arranged, in a triangular, cubic or hexagonal pattern. Camera 203 may then capture at one point in time the object illuminated by flood light and at another point in time illuminated by light patterns. That is, camera 203 may receive the light reflected by the object when illuminated with the light of flood illuminator 206 and/or dot projector 207 may generate from the reflected light an image and/or a pattern image of the object. The images, i.e. the pattern image and the flood light image, are then passed to an image processor, as inter alia described in FIG. 3, which can be configured to execute a neural network.

The camera may include one or more image sensors 205 (also simply denoted sensor 205) for capturing digital images. Image sensor 205 may be an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. The term (image) sensor or (image) sensor element generally refers to a device or a combination of a plurality of devices configured for sensing at least one parameter. The parameter may be an optical parameter, and the sensor may be an optical sensor. The sensor may be formed as a unitary, single device or as a combination of several devices. The sensor may comprises a matrix of optical sensors. The sensor element may comprise at least one CMOS sensor. The matrix may be composed of independent pixels such as of independent optical sensors. Thus, a matrix of inorganic photo-diodes may be composed. Alternatively or in addition, a commercially available matrix may be used, such as one or more of a CCD detector, such as a CCD detector chip, and/or a CMOS detector, such as a CMOS detector chip. Thus, generally, the sensor may be and/or may comprise at least one CCD and/or CMOS (device) and/or the optical sensors may form a sensor array or may be part of a sensor array, such as the above-mentioned matrix. The camera 203 may include more than one image sensor 205 to capture multiple types of images. For example, the camera 203 may include both IR sensors and RGB (red, green, and blue) sensors, e.g. RGB camera 205a.

The sensor may be or may comprise at least one inorganic photodiode which are sensitive in the infrared spectral range, preferably in the range of 700 nm to 3.0 micrometers. Specifically, the sensor may be sensitive in the part of the near infrared region where silicon photodiodes are applicable specifically in the range of 700 nm to 1100 nm. Alternatively and/or in addition, the sensor may be sensitive in one or more of the ultraviolet, the visible or the infrared spectral range. Specifically, the sensor may be sensitive in the visible spectral range from 500 nm to 780 nm, most preferably at 650 nm to 750 nm or at 690 nm to 700 nm. Specifically, the sensor may be sensitive in the near infrared region. Specifically, the sensor may be sensitive in the part of the near infrared region where silicon photodiodes are applicable specifically in the range of 700 nm to 1000 nm. The sensor, specifically, may be sensitive in the infrared spectral range, specifically in the range of 780 nm to 3.0 micrometers.

Camera 203 includes illuminators for illuminating subjects with different types of light detected by image sensor. For example, camera may include an illuminator for visible light (e.g., a "flash illuminator), illuminators for RGB light, and/or illuminators for infrared light. In particular, camera 203 may include a flood IR illuminator 206 and a pattern illuminator 207. In certain embodiments, illuminators include an array of light sources such as, but not limited to, VCSELs (vertical-cavity surface-emitting lasers). Image sensors and illuminators may be included in a single or separate chip package. In some embodiments, image sensors and illuminators are located on separate chip packages.

In certain embodiments, image sensor 205 is an IR image sensor and the image sensor is used to capture infrared images used for face detection, facial recognition authentication, material detection and/or depth detection. For face detection, illuminator 206 may provide flood IR illumination to flood the subject with IR illumination and image sensor 205 may capture images of the flood IR illuminated subject. Flood IR illumination images may be, for example, two-dimensional images of the subject illuminated by IR light.

For depth or material detection, illuminator 207 may provide IR illumination with a pattern. The pattern may be a pattern of light with a known, and controllable, configuration and pattern projected onto a subject. The pattern may be regularly arranged or irregularly arranged in a structured pattern of light pattern. In certain embodiments, the pattern is a speckle pattern. The pattern may include, but not be limited to, dots, speckles, stripes, dashes, nodes, edges, and combinations thereof.

Images captured by camera 203 include images with the user's face (e.g., the user's face is included in the images). An image with the user's face may include any digital image with at least some portion of the user's face shown within the frame of the image. Such an image may include just the user's face or may include the user's face in a smaller part or portion of the image. The user's face may be captured with sufficient resolution in the image to allow image processing of one or more features of the user's face for face authentication.

Figure 3:
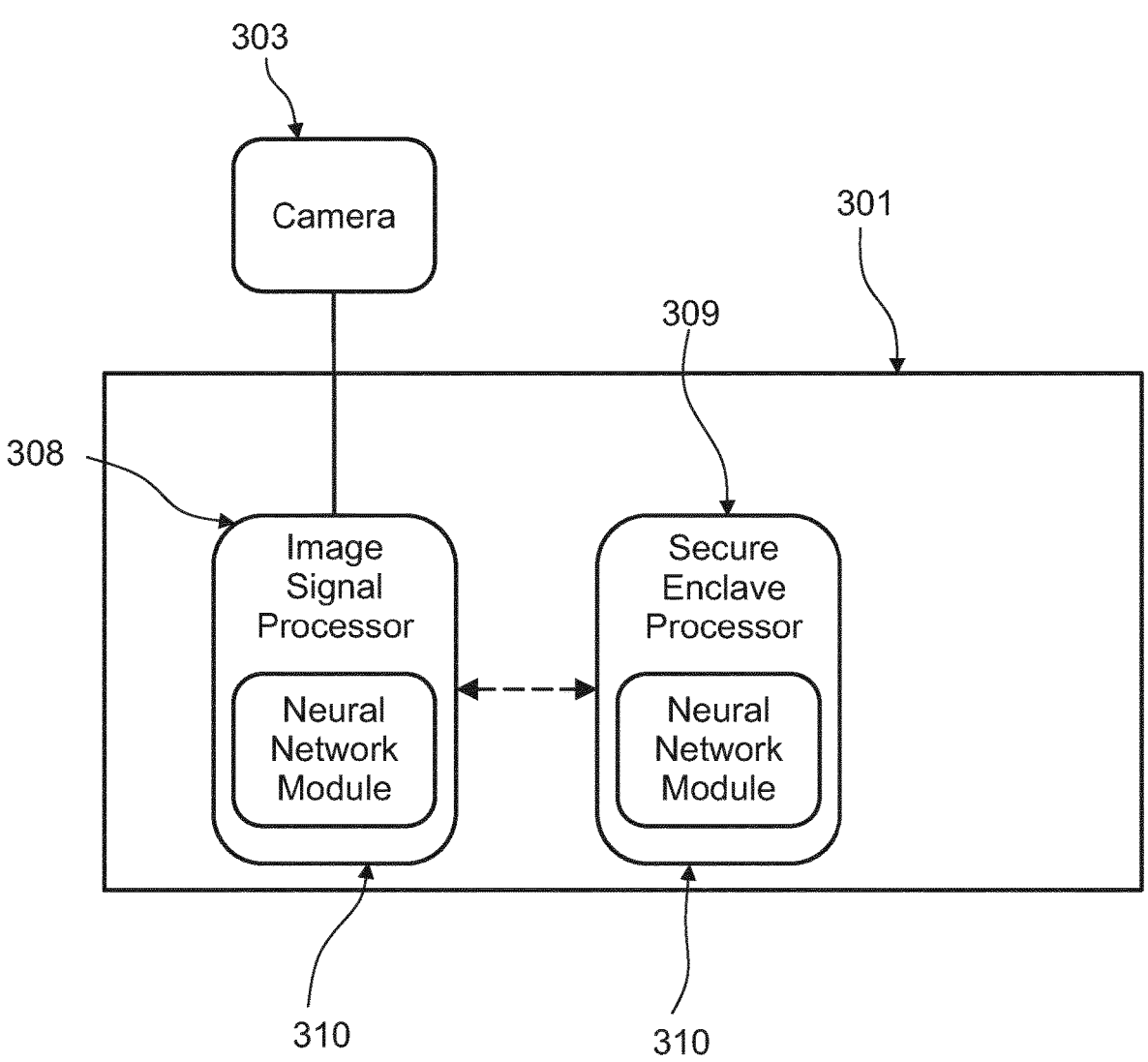
FIG. 3 shows schematically and exemplarily an embodiment of a processor associated with the camera for processing camera signals.

FIG. 3 illustrates schematically and exemplarily an embodiment of a processor 301 associated with the camera 303 for generally processing input data, in particular, for processing camera signals. Camera 303 may correspond to the camera 103 of FIG. 1. Processor 301 may correspond to the processor 101 of FIG. 1.

The processor 301 may be adapted, for instance, by executing respective computer control signals, to select from the pattern image pattern features located on the image of object and/or to generate a partial images of the pattern image based on the selected pattern features, for example via cropping, and/or extracting material information of the object from the partial image and/or identifying the object, in particular, authenticating the object based on the material information, for example, by providing the partial image to a neural network module 310.

In particular, images captured by camera 303 may be processed by processor 301. Processor may include circuitry configured to execute instructions defined in an instruction set architecture implemented by the processor. Processor may execute the applications running on the device.

Processor may include image signal processor 308 (IP), also denotes as image processor 308 (IP). IP 308 may include circuitry suitable for processing images received from camera. IP 308 may include any hardware and/or software (e.g., program instructions) capable of processing or analyzing images captured by camera.

According to a preferred embodiment comprising special feature in context of authentication processes, for sensitive operations, processor may include secure enclave processor 309 (SP), also denoted as secure processor 309 (SP). SP 309 may be a secure circuit configured to authenticate an active user. SP 309 may be a circuit that protects an isolated, internal resource from being directly accessed by an external circuit. The internal resource may be memory that stores sensitive data such as biometric information, encryptions keys, or the like.

SP 309 may run facial recognition authentication process based on images captured by camera 303 and processed by IP 308. The functions of IP 308 and SP 309 may be performed by a single processor. Processor may perform an enrollment process. During the enrollment process, camera 303 may capture or collect images and/or image data from an authorized user to subsequently authenticate the user using the facial recognition authentication process. From images of the enrollment process templates may be generated and stored in SP 309.

On facial authentication camera 303 and/or a camera module may communicate image data to SP 309 via a secure channel. The secure channel may be, for example, either a dedicated path for communicating data (i.e., a path shared by only the intended participants) or a dedicated path for communicating encrypted data using cryptographic keys known only to the intended participants. SP 309 may operate one or more machine learning models.

One or more neural network modules 310 may be used to operate the machine learning models. The neural network module 310 may be located in IP 308 and/or SP 309. SP 309 may compare the image characteristics with stored templates for each type of image to generate an authentication score depending on a matching score or other ranking of matching between the user in the captured image and in the stored templates. The authentication scores for the images such as the flood IR and patterned illumination images may be combined to decide on the identity of the user and, if authenticated, allow the user to use device e.g., unlock the device.

FIG. 4 illustrates schematically and exemplarily a flowchart for an embodiment of a biometric authentication process using facial features. The flowchart comprises the steps of capturing image data 401, providing image data from camera 402, pre-processing of image data 403, recognizing human skin or material and validate 404, validating 405, providing other unlock mechanism e.g. user pin 406, authentication via authentication process based on flood light image 407, matching face features 408, providing other unlock mechanism e.g. user pin 406, and generating operating parameters such as unlock application, device or other 410.

One or more images may be captured, step 401, by camera and provided, e.g. to the processor, step 402. Images may be captured in response to a prompt by the user. For example, the unlock attempt images may be captured when the user attempts to access to device. A series of several images of the face of the user may be taken over a short period of time (e.g., one second or less). The series of several images of the face of the user may include pairs of flood IR images and patterned illumination images. Additionally or alternatively, image may include an image captured while the object may be illuminated with visible light.

An image may include a flood IR image and/or a patterned illumination image, and may preferably relate to an embodiment of physical randomization such that background is suppressed. Flood IR image data may include image data of the user captured when the user is illuminated by flood IR illumination. Patterned illumination image data may include image data of the user generated from an image of the user captured when the user is illuminated by patterned illumination. The patterned illumination used to generate patterned illumination image may include a pattern of any pattern features and pattern density. Pattern may be irregular (structured light for triangulation), regular or periodic arrangement or pattern features (triclinic, hexagonal, or the like).

Image capture may be configured to provide manipulated images of the same scene, e.g. user's face. For instance, partial images may be generated by capturing different parts of the scene or by different camera settings such as different spot patterns. This way the image data of the same scene may be manipulated on capture. For example, a physical randomizer without digital may take in 20 ms 5 frames as time series with variation correct S-N-R or augment image capture by luminance, distance, or the like.

Figure 4A:
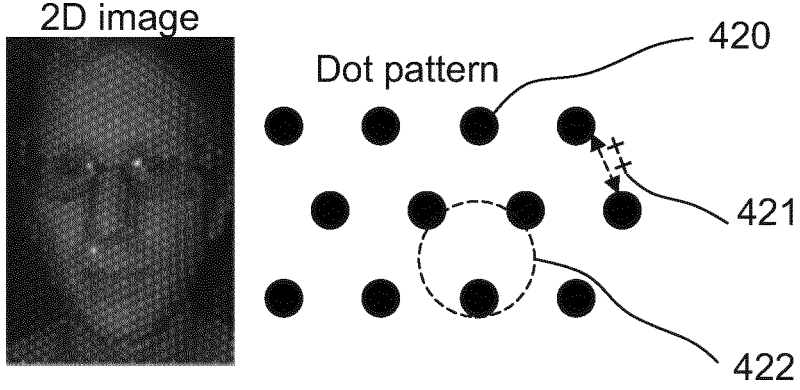
FIGS. 4a-c show schematically and exemplarily an embodiment of a biometric authentication using facial features.
Figure 4B:
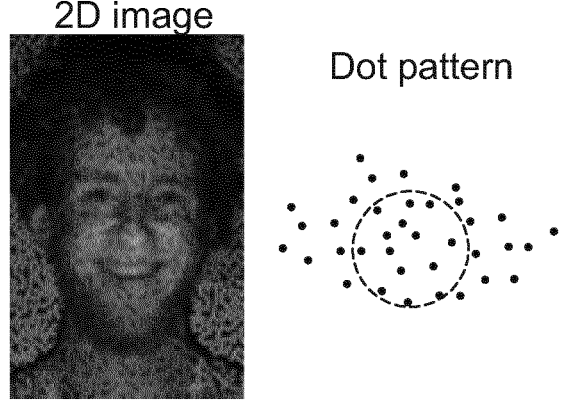
Figure 4C:
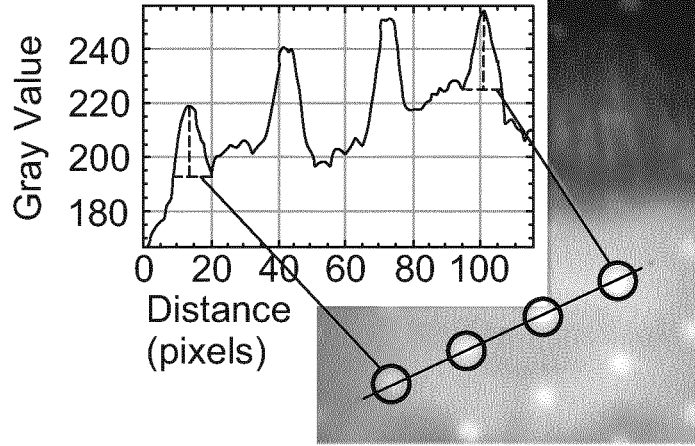

FIG. 4a-b depict an illustration of an image, e.g. a 2-dimensional image of a human face, that comprises a patterned illumination image, also denoted as speckle projection e.g. on a human face. Pattern features may be dots, spots, speckles, triangles, or the like. FIG. 4a depicts a hexagonal dot pattern. When applying the BPA technology underlying the invention, as inter alia described with respect to FIG. 6 below, each dot 420 of the dot pattern contains information on distance and material of the object. This reduces the required number of dots per area. In particular, 1000 to 2000 dots per image are sufficient for precise 3D mapping and/or material detection and/or identifying, in particular, authenticating the object based on the material information. In addition and consequently, a distance 421 between dots 420 may be increased without loosing functionality and/or accuracy. In addition and consequently, a low number of dots 420, e.g. in the eye-safety angular cone 422, allows for high power output per dot 420. For example, the laser output power in BPA may be 0.5 mW per dot. FIG. 4b depicts irregular structured lights dot pattern, when applying e.g. the structured light technology. FIG. 4c depicts section through a detected intensity distribution showing background intensity contribution and pattern contribution for the case of 0.5 mW per spot within an image of a face taken at 100 k Lux and a distance to the object of 70 cm. As can be seen, on a 8 bit gray scale, the contrast between background intensity contribution and pattern contribution is in the range of 20-40 digits which is sufficient for a reliable BPA for recognizing of human skin or material and/or authentication.

In step 403 the image may be provided to processor for pre-processing. The processor may be secure processor (SP or secure enclave on smartphone) or normal IP, as described with respect to FIG. 3. The combination of flood IR image data and patterned illumination image data may allow for SP to authenticate user through face authentication. Camera module and/or camera may communicate image data to SP via a secure channel. The secure channel may be a dedicated path for communicating data (i.e., a path shared by only the intended participants) or a dedicated path for communicating encrypted data using cryptographic keys known only to the intended participants. Camera module and/or camera and/or IP may perform various processing operations on image data before supplying the image data to SP in order to facilitate biometric authentication based on user-specific biometric features performed by the SP.

Image pre-processing may include detecting a bounding box around the face in the flood light image. Such bounding box may be detected via a model such as neural network or via commonly known techniques for bounding box determination in face recognition. Furthermore, landmarks may be determined. The bounding box and the landmarks may be associated with the corresponding pixels in the pattern image data. In particular, the pattern image data associated with the face and within the bounding box from the flood light image may be used to e.g. crop the pattern image to the region of interest.

Images may be pre-processed for extracting material information, preferably, a digital randomization is applied to suppress background. One pre-processing may include digitally manipulating image data. In particular, images may be manipulated by image augmentation techniques such as cropping, rotating, blurring, or the like. Through such manipulation the background information with the facial features may be suppressed. For extraction of the material information, the pattern is of interest. Hence, any model extracting the material information may be trained on manipulated image data, e.g. image data after described manipulation. This way the size of the model can be reduced. For example, by this way, storage and processing of the model on the smartphone can be significantly reduced, e.g. for face recognition with an CNN from >20 mio parameters to <10 mio, preferably <8 mio parameters, or between 3 and 7 mio, preferably about 4 mio parameters for the partial image.

Figure 5A:
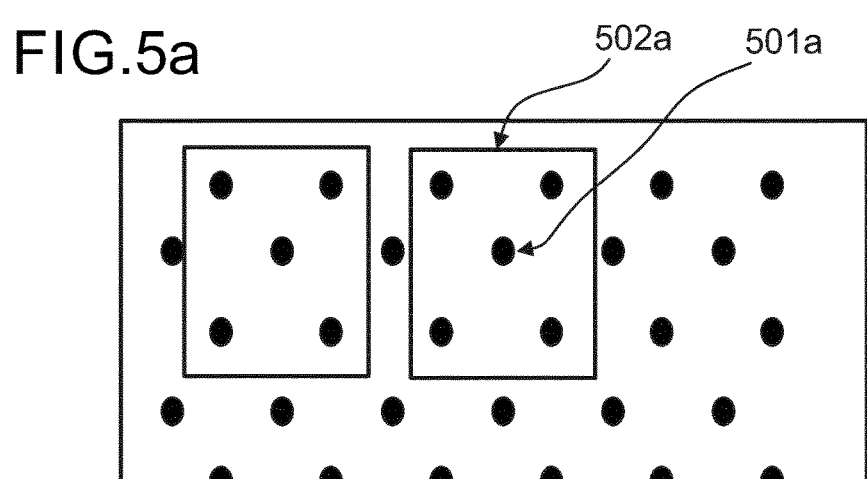
FIG. 5a shows schematically and exemplarily an embodiment of cropping the images into partial images, wherein peaks are at the center of the image.
Figure 5B:
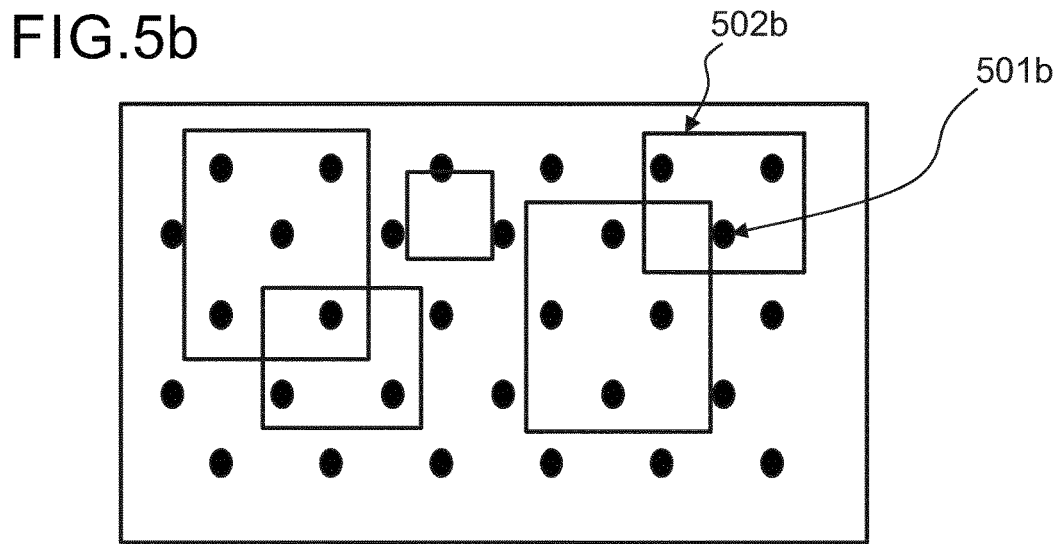
FIG. 5b shows schematically and exemplarily an embodiment of cropping the images into partial images, wherein the cropping is random in terms of position of the peaks.
Figure 5C:
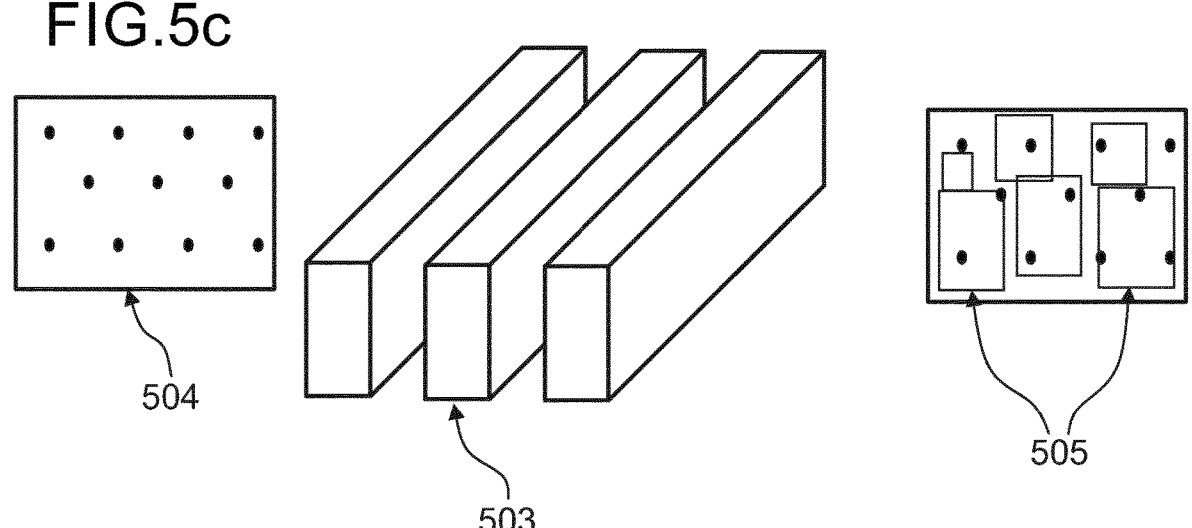
FIG. 5c shows schematically and exemplarily a neural network for partial images

One option of pre-processing may be cropping the images into partial images, as schematically and exemplarily shown in FIGS. 5a and 5b. FIG. 5c visualizes a neural network 503 for cropping an image 504 into a plurality of partial images 505. Cropping may be based on identifying peaks of pattern and cropping a certain size around the peaks and/or next to the peak. In one embodiment the peak 501a may be at the center of the particular partial image 502a (see FIG. 5a). The partial images may have a fixed size and may not overlap. In another embodiment the cropping may be random in terms of position of the peaks (FIG. 5b). The partial images 502b may have any size. The partial images may overlap. The partial images may comprise at least one pattern feature 501b (intensity peak) or more pattern features. The partial images may comprise parts of pattern features or outlier signatures of pattern features. In preferred embodiments based on neural networks, other options are Single shot detection (SSD; region based neural network or mask RCNNs) to provide bounding boxes for partial image cutout. Manipulation may hence be based on cut-out via anchor points based on pattern features of pattern image (cropping or SSD or RCNN).

From partial image data material may be recognized (step 404), preferably, material recognition may be used for a validation step 405. Such recognition may be based on a data-driven model such as a trained neural network such as a convolutional neural network. The training of such network will be lined out in more detail below. The model may be parametrized to map the partial images to a classifier such as human skin or no human skin, material or no material. The model may also be parametrized to more complex outputs such as human skin, material class (latex, silicon, fabric) or the like. Based on such recognition the authentication process may be validated (step 405). For instance, if no human skin is detected in image (validation 405 yields "No"), the authentication process may be stopped and a notification may be provided to the user. In such case authentication is not possible or spoofing is likely (anti spoof). Alternatively or in addition, other unlock mechanisms, e.g. user pin etc., may apply. However, if e.g. skin is detected, the validation may lead to further processing such as providing material present in the image. Such material detection may be associated with landmarks e.g. as detected in flood light image for consistency check. The consistency check may include a rule set. If for instance, latex is detected to be associated with the eyes, than the authentication process may be stopped. The material recognition and validation step may also be performed after face recognition.

For authentication flood light image data and partial image data may be processed to provide material recognition and facial recognition. In particular, in case validation 405 yields "Yes", for authentication, flood light image may be analyzed for facial features (step 407). Analyzed facial features may be compared to templates. Templates of a template space may be provided to get matching score. In certain embodiments, a template space may include a template for an enrollment profile for an authorized user on device (e.g., a template generated during an enrollment process). A matching score may be a score of the differences between facial features and corresponding features in template space (e.g., feature vectors for the authorized user generated during the enrollment process). Matching score may be higher when feature vectors are closer to (e.g., the less distance or less differences) the feature vectors in template space.

Comparing feature vectors and templates from a template space to get a corresponding matching score may include using one or more classifiers or a classification-enabled network to classify and evaluate the differences between the generated feature vectors and feature vectors from the template space. Examples of different classifiers that may be used include, but are not limited to, linear, piecewise linear, nonlinear classifiers, support vector machines, and neural network classifiers. In some embodiments, matching score may be assessed using distance scores between feature vectors and templates from the template space.

For authentication, matching score may be compared to an unlock threshold for device, step 408. Unlock threshold may represent a minimum difference in feature vectors between the face of the authorized user according to templates and the face of the user in the unlock attempt to unlock the device. For example, unlock threshold may be a threshold value that determines whether the unlock feature vectors close enough to the template vectors associated with the authorized user's face.

If matching score is above unlock threshold, e.g. in case step 408 yields "Yes", the user's face in the captured image for unlocking matches the face of the authorized user. With the user's face "matching" the template, enrolment profile or authorized user, the user in the captured images is authenticated as the authorized user for the enrollment profile on device and the device is unlocked (step 410). Unlocking may allow the user to access to use the device and/or allow the user to have access to a selected functionality of the device (e.g., unlocking a function of an application running on the device, payment systems or making a payment, access to personal data, expanded view of notifications, etc.).

If matching score is below unlock threshold, e.g. in case step 408 yields "Yes", the device remains locked and facial recognition process stops or other unlock options may be requested (step 409). For example, unlock options may include using another authentication protocol to unlock device. Unlock options may include the user being presented with one or more options for proceeding with a different type of authentication to unlock or access features on device (e.g., the user is presented options for proceeding with a second authentication protocol). Presenting the options may include, for example, displaying one or more options on display of device and prompting the user through audible and/or visual communication to select one of the displayed options to proceed with unlocking the device or accessing features on the device. The user may then proceed with unlocking/accessing device using the selected option. After successfully being authenticated using the selected option, the user's initial request for unlocking/accessing device may be granted. Unlock options may include using a passcode, a password, pattern entry, a different form of biometric authentication, or another authentication protocol to unlock device.

Another criterion may be the unlock attempts that may be compared to a threshold. The threshold may be a maximum number of unlock attempts allowed or a maximum allotted time for unlock attempts.

If unlock attempt above threshold other unlock mechanism, device may be locked from further attempts to use facial authentication in for a specified period of time and/or until another authentication protocol is used to unlock the device.

If the unlock attempts are below the threshold in (e.g., number of unlock attempts are below the maximum number of attempts allowed), then new images of the user may be captured In some embodiments, device may prompt the user to provide input to re-initiate the facial recognition process. For example, the user may be prompted to acknowledge or otherwise confirm (either visually and/or audibly) the attempt to re-initiate the facial recognition process.

Figure 6:
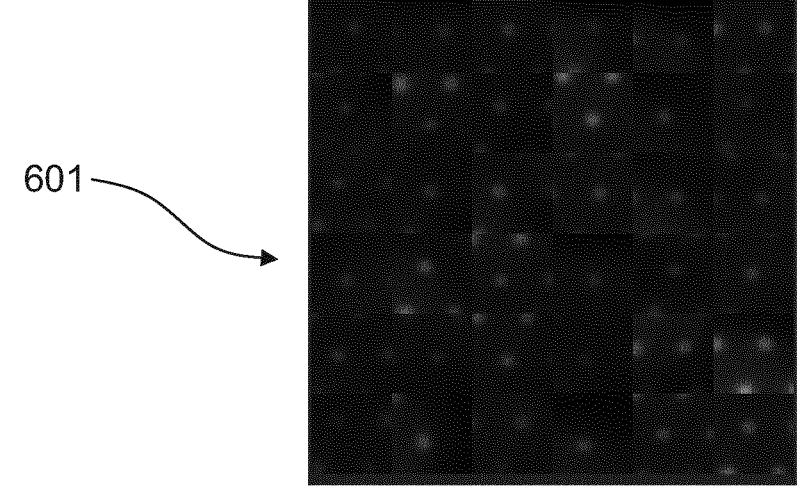
FIG. 6 illustrates schematically and exemplarily various examples of clusters.
Figure 6:
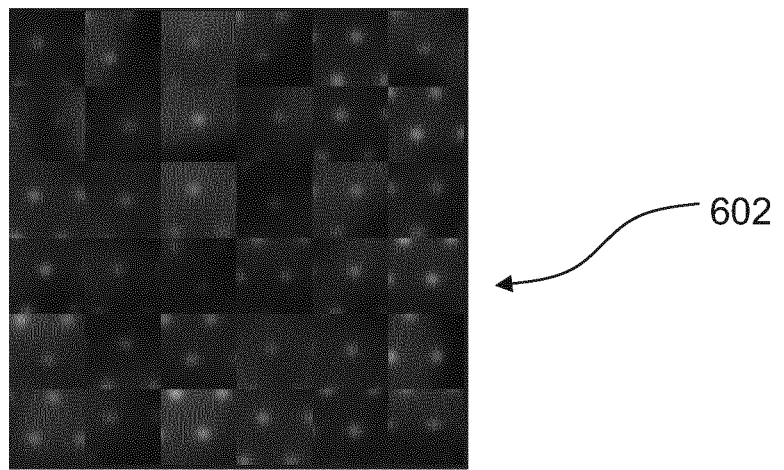
Figure 6:
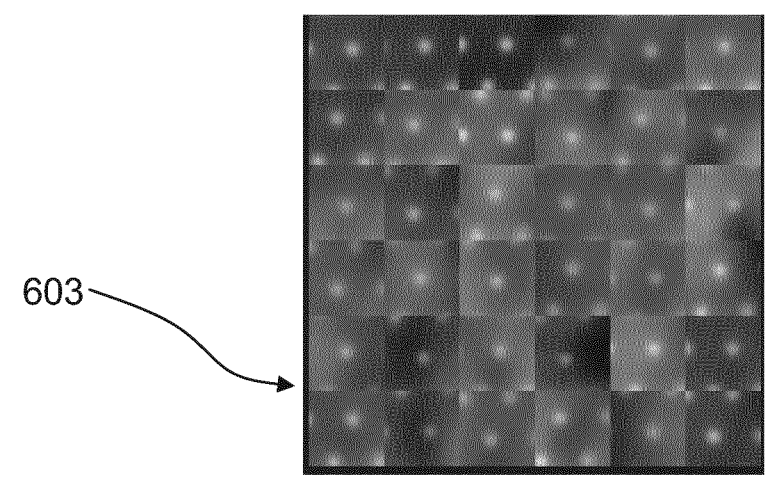

FIG. 6 illustrates schematically and exemplarily various examples of clusters, that is a first cluster 601, a second cluster 602 and a third cluster 603. The generation of a (lower dimensional) representation of a partial image and a clustering, that is an assignment of a representation to a cluster, is described with respect to FIGS. 7a-7c. As described therein below, the brightness and possible background may play a role in clustering. This is illustrated in FIG. 6 by plotting the partial images associated with one representation that is part of the same cluster 601, 602 or 603.

A possible process for generating material information and/or material data from an image and/or image data may be a suitable filtering technique. Material information, also denoted as material data, is generated by applying material dependent image filter to one or more pattern feature(s) of the pattern image. Such a technique may be beam profile analysis (BPA), as described in WO 2020/187719 A1. The disclosure of WO 2020/187719 A1 is hereby incorporated by reference.

In particular, a sensor (element) may be configured for recording a beam profile of at least one (reflection feature) of the (reflection) image. An evaluation device may be configured for determining and/or for selecting the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. pro-portion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

The edge information may comprise information relating to a number of photons in the first area of the beam profile and the center information may comprise information relating to a number of photons in the second area of the beam profile. The evaluation device may be adapted for determining an area integral of the beam profile. The evaluation device may be adapted to determine the edge information by integrating and/or summing of the first area. The evaluation device may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized, for example, by replacing the area integrals in the combined signal Q by a line integral along the slice or cut. For improved accuracy, several slices or cuts through the light spot may be used and averaged. In case of an elliptical spot profile, averaging over several slices or cuts may result in an improved distance information.

The evaluation device may be configured for deriving the combined signal Q by one or more of dividing the edge information and the center information, dividing multiples of the edge information and the center information, dividing linear combinations of the edge information and the center information. Thus, essentially, photon ratios may be used as the physical basis of the method.

The sensor element may be configured for recording a beam profile of at least one reflection feature of the reflection image. The detector comprises at least one evaluation device. The evaluation device may be configured for identifying and/or selecting at least one reflection feature in the reflection image, specifically at least one light spot, provided by the sensor element. The evaluation device may be configured for performing at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a blob detector; applying a corner detector; applying a Determinant of Hessian filter; applying a principle curvature-based region detector; applying a maximally stable extremal regions detector; applying a generalized Hough-transformation; applying a ridge detector; applying an affine invariant feature detector; applying an affine-adapted interest point operator; applying a Harris affine region detector; applying a Hessian affine region detector; applying a scale-invariant feature transform; applying a scale-space extrema detector; applying a local feature detector; applying speeded up robust features algorithm; applying a gradient location and orientation histogram algorithm; applying a histogram of oriented gradients descriptor; applying a Deriche edge detector; applying a differential edge detector; applying a spatio-temporal interest point detector; applying a Moravec corner detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. Specifically, the evaluation of the reflection image comprises selecting the region of interest in the reflection image. The region of interest may be determined manually by a user or may be determined automatically, such as by recognizing an object within an image generated by the sensor element. For example, in case of a spot-like reflection feature the region of interest may be selected as a region around the spot profile.

The evaluation device 132 may be configured for determining the material property m by evaluating the beam profile of the reflection image. The beam profile of the reflection image may be selected from the group consisting of a trapezoid beam profile; a triangle beam profile; a conical beam profile and a linear combination of Gaussian beam profiles. The evaluation device may be configured for applying at least one distance dependent image filter and at least one material dependent image filter to the beam profile and/or to at least one specific region of the beam profile. Specifically, the image filter $\phi$ maps an image f, or a region of interest in the image, onto a real number, $\phi(f(x,y))=\phi$, wherein $\phi$ is denotes a feature, in particular a distance feature in case of distance dependent image filters and a material feature in case of material dependent image filters. Images may be subject to noise and the same holds true for features. Therefore, features may be random variables. The features may be normally distributed. If features are not normally distributed, they may be transformed to be normally distributed such as by a Box-Cox-Transformation.

The evaluation device is configured for determining at least one distance feature $\phi_{1z}$ by applying at least one distance dependent image filter $\phi_1$ to the reflection image. The distance feature may be or may comprise at least one information about the distance of the object such as at least one measure for the distance of the object, a distance value, a longitudinal coordinate of the object or the like. The distance dependent image filter is at least one filter selected from the group consisting of: a depth-from-photon-ratio filter; a depth-from-defocus filter; or a linear combination thereof; or a further distance dependent image filter $\phi_{1other}$ which correlates to the depth-from-photon-ratio filter and/or the depth-from-defocus filter or a linear combination thereof by $|\rho_{\phi1other,\phi z}|\geq0.40$ with $\phi_z$ being one of the depth-from-photon-ratio filter or the depth-from-defocus filter or a linear combination thereof. The further distance dependent image filter $\phi_{1other}$ may correlate to one or more of the distance dependent image filters $\phi_z$ by $|\rho_{\phi1other,\phi z}|\geq0.60$, preferably by $|\rho_{\phi1other,\phi z}|\geq0.80$. The similarity of two image filters $\phi_i$ and $\phi_j$ may be assessed through the correlation of their features, specifically, by calculating Pearson's correlation coefficients, $$\rho_{\Phi_i\Phi_j} = \frac{\text{cov}((\Phi_i(f(x,\,y))-\mu_i)(\Phi_j(f(x,\,y))-\mu_j))}{\sigma_i\sigma_j},$$

wherein $\mu$ and $\sigma$ are mean value and standard deviation of the obtained features. The testing of correlation of filters may be performed using a set of random test images, specifically matrices filled with random numbers. The number of random test images may be chosen as such that the results of the correlation test are statistically significant. The correlation coefficient takes values between $-1$ and 1, whereas 0 means there is no linear correlation. The correlation coefficients are well suited to determine whether two filters are similar or even equivalent. To measure whether the features of a filter correlate with a given property, for example the distance, the test images may be chosen as such, that a correlated filter actually yields the property. As an example, in order to measure whether the features of a filter correlate with distance, beam profiles recorded in different distances may be used as test images. To obtain a comparable, transferable, and transparent assessment, a fixed test-set of test images may be defined.

For example, the distance dependent image filter may be a depth-from-photon-ratio filter. The depth-from-photon-ratio filter may comprise evaluating a combined signal Q from at least two sensor signals of the sensor element. The evaluation device may be configured for determining the distance feature $\phi_{1z}$ by evaluation of the combined signal Q. The distance feature determined by evaluation of the combined signal Q may correspond directly to the longitudinal coordinate of the object. The combined signal Q may be determined by using various means. As an example, a software means for deriving the combined signal, a hardware means for deriving the combined signal, or both, may be used and may be implemented in the evaluation device. Thus, the evaluation device, as an example, may comprise at least one divider, wherein the divider is configured for deriving the quotient signal. The divider may fully or partially be embodied as one or both of a software divider or a hardware divider.

The evaluation device may be configured for deriving the combined signal Q by one or more of dividing the sensor signals, dividing multiples of the sensor signals, dividing linear combinations of the sensor signals. The evaluation device may be configured for using at least one predetermined relationship between the combined signal Q and the distance feature $\phi_{1z}$ for determining the distance feature $\varphi_{1z}$. For example, the evaluation device may be configured for deriving the combined signal Q by $$Q(z_O) = \frac{\displaystyle\iint_{A_1} E(x, y; z_O)dxdy}{\displaystyle\iint_{A_2} E(x, y; z_O)dxdy},$$

wherein x and y are transversal coordinates, A1 and A2 are different areas of at least one beam profile of the light beam propagating from the object to the detector at the sensor position, and $E(x,y,z_o)$ denotes the beam profile given at the object distance $z_o$. Area A1 and area A2 may differ. In particular, A1 and A2 are not congruent. Thus, A1 and A2 may differ in one or more of the shape or content. The beam profile may be a cross section of the light beam. The beam profile may be selected from the group consisting of a trapezoid beam profile; a triangle beam profile; a conical beam profile and a linear combination of Gaussian beam profiles. Generally the beam profile is dependent on luminance $L(z_o)$ and beam shape $S(x,y;z_o)$. Thus, by deriving the combined signal it may allow determining the longitudinal coordinate independent from luminance. In addition, using the combined signal allows determination of the distance $z_0$ independent from the object size. Thus, the combined signal allows determination of the distance $z_0$ independent from the material properties and/or reflective properties and/or scattering properties of the object and independent from alterations of the light source such as by manufacturing precision, heat, water, dirt, damages on the lens, or the like. As an example, the distance dependent feature $\varphi_{1z}$ may be a function of the combined signal Q, $\varphi_{1z}=\varphi_{1z}(Q)$, whereas the function may be a linear, quadratic, or higher order polynomial in Q. Further, as an example, the object distance $z_0$ may be a function of the distance dependent feature $\varphi_{1z}$, $z_0=z_0(\varphi_{1z})$, whereas the function may be a linear, quadratic, or higher order polynomial in $\varphi_{1z}$. Thus, the object distance $z_0$ may be a function of the combined signal Q, $z_0=z_0(Q)$, whereas the function may be a linear, quadratic, or higher order polynomial in Q.

The light-sensitive areas of at least two optical sensors may be arranged such that a first sensor signal comprises information of a first area of the beam profile and a second sensor signal comprises information of a second area of the beam profile. The first area of the beam profile and the second area of the beam profile are one or both of adjacent or overlapping regions.

The evaluation device may be configured for determining and/or for selecting the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. Preferably the center information has a proportion of edge information of less than 10%, more preferably of less than 5%, most preferably the center information comprises no edge content. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

The edge information may comprise information relating to a number of photons in the first area of the beam profile and the center information may comprise information relating to a number of photons in the second area of the beam profile. The evaluation device may be adapted for determining an area integral of the beam profile. The evaluation device may be adapted to determine the edge information by integrating and/or summing of the first area. The evaluation device may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized, for example, by replacing the area integrals in the combined signal Q by a line integral along the slice or cut. For improved accuracy, several slices or cuts through the light spot may be used and averaged. In case of an elliptical spot profile, averaging over several slices or cuts may result in an improved distance information.

The evaluation device may be configured for deriving the combined signal Q by one or more of dividing the edge information and the center information, dividing multiples of the edge information and the center information, dividing linear combinations of the edge information and the center information. Thus, essentially, photon ratios may be used as the physical basis of the method.

The evaluation device specifically may be configured for deriving the combined signal Q by dividing the first and second sensor signals, by dividing multiples of the first and second sensor signals or by dividing linear combinations of the first and second sensor signals. As an example, Q may simply be determined as $Q=s_1/s_2$ or $Q=s_2/s_1$, with $s_1$ denoting the first sensor signal and $s_2$ denoting the second sensor signal. Additionally or alternatively, Q may be determined as $Q=a \cdot s_1/b \cdot s_2$ or $Q=b \cdot s_2/a \cdot s_1$, with a and b being real numbers which, as an example, may be predetermined or determinable. Additionally or alternatively, Q may be determined as $Q=(a \cdot s_1+b \cdot s_2)/(c \cdot s_1+d \cdot s_2)$, with a, b, c and d being real numbers which, as an example, may be predetermined or determinable. As a simple example for the latter, Q may be determined as $Q=s_1/(s_1+s_2)$. Other combined or quotient signals are feasible.

With respect to further details and embodiments of evaluation of the combined signal Q and determination of the longitudinal coordinate z reference e.g. may be made to WO 2018/091640, WO 2018/091649 A1 and WO 2018/091638 A2 the full disclosure of which is incorporated herein by reference.

For example, the distance dependent image filter may be a depth-from-defocus filter. As outlined above, the evaluation device may be configured for determining at least one image of the region of interest from the sensor signals. The evaluation device may be configured for determining from the image the distance feature $\varphi_{1z}$ of the object by optimizing at least one blurring function $f_a$. The determined distance feature $\varphi_{1z}$ may correspond directly to the longitudinal coordinate of the object. The distance feature $\varphi_{1z}$ may be determined by using at least one convolution-based algorithm such as a depth-from-defocus algorithm. To obtain the distance from the image, the depth-from-defocus algorithm estimates the defocus of the object. For this estimation, the blurring function is assumed. Specifically, the blurring function models the blur of a defocused object. The at least one blurring function $f_a$ may be a function or composite function composed from at least one function from the group consisting of: a Gaussian, a sinc function, a pillbox function, a square function, a Lorentzian function, a radial function, a polynomial, a Hermite polynomial, a Zernike polynomial, a Legendre polynomial.

The blurring function may be optimized by varying the parameters of the at least one blurring function. The reflection image may be a blurred image $i_b$. The evaluation device may be configured for reconstructing the distance feature $\varphi_{1z}$ from the blurred image $i_b$ and the blurring function $f_a$. The distance feature $\varphi_{1z}$ may be determined by minimizing a difference between the blurred image $i_b$ and the convolution of the blurring function $f_a$ with at least one further image $i'_b$, $$\min\|(i'_b * f_a(\sigma(\varphi_{1z})) - i_b)\|,$$

by varying the parameters $\sigma$ of the blurring function. $\sigma(z)$ is a set of distance dependent blurring parameters. The further image may be blurred or sharp. The at least one further image may be generated from the blurred image $i_b$ by a convolution with a known blurring function. Thus, the depth-from-defocus algorithm may be used to obtain the distance feature $\varphi_{1z}$.

The evaluation device may be configured for determining at least one combined distance information z considering the distance feature $\varphi_{1z}$ determined by applying the depth-from-photon-ratio filter and the distance feature $\varphi_{1z}$ determined by applying the depth-from-defocus filter. The combined distance information z may be a real function depending on the distance feature $\varphi_{1z}$ determined by applying the depth-from-photon-ratio filter and the distance feature $\varphi_{1z}$ determined by applying the depth-from-defocus filter. The combined distance information z may be a rational or irrational polynomial of the distance feature $\varphi_{1z}$ determined by applying the depth-from-photon-ratio filter and the distance feature $\varphi_{1z}$ determined by applying the depth-from-defocus filter. Depth-from-defocus is a complementary method to depth-from-photon-ratio but uses a similar hardware set up. Further, depth-from-defocus distance measurements may have a similar accuracy. Combining both technologies may yield to advantageous distance measurement results with enhanced precision.

For example, the distance dependent image filter may be a structured-light-filter in combination with a depth-from-photon-ratio filter and/or a depth-from-defocus image filter. The detector may comprise at least two sensor elements each having a matrix of optical sensors. At least one first sensor element and at least one second sensor element may be positioned at different spatial positions. A relative distance between the first sensor element and the second element may be fixed. The at least one first sensor element may be adapted to determine at least one first reflection pattern, in particular at least one first reflection feature, and the at least one second sensor element may be adapted to determine at least one second reflection pattern, in particular at least one second reflection feature. The evaluation device may be configured for selecting at least one image determined by the first sensor element or the second sensor element as reflection image and to select at least one image determined by the other one of the first sensor element or the second sensor element as reference image. The reference image may be determined by one or more of recording at least one reference feature, imaging the at least one reference feature, calculating of the reference image. The reference image and the reflection image may be images of the object determined at different spatial positions having a fixed distance. The distance may be a relative distance, also called baseline. The evaluation device may be adapted to select the at least one reflection feature in the reflection image and to determine at least one distance estimate of the selected reflection feature of the reflection image given by the distance feature $\varphi_{1z}$ determined by applying the depth-from-photon ratio image filter and/or the depth-from-defocus image filter and an error interval $\pm \varepsilon$.

The evaluation device may be adapted to determine the at least one reference feature in the at least one reference image corresponding to the at least one reflection feature. The evaluation device may be adapted to perform an image analysis and to identify features of the reflection image. The evaluation device may be adapted to identify at least one reference feature in the reference image having an essentially identical longitudinal coordinate as the selected reflection feature. The evaluation device may be adapted to determine an epipolar line in the reference image. The relative position of the reference image and reflection image may be known. For example, the relative position of the reference image and reflection image may be stored within at least one storage unit of the evaluation device. The evaluation device may be adapted to determine a straight line extending from the selected reflection feature of the reflection image. The straight line may comprise possible object features corresponding to the selected feature. The straight line and the baseline span an epipolar plane. As the reference image is determined at a different relative position from the reflection image, the corresponding possible object features may be imaged on a straight line, called epipolar line, in the reference image. Thus, a feature of the reference image corresponding to the selected feature of the reflection image lies on the epipolar line. Due to distortions of the image or changes in the system parameters such as due to ageing, temperature changes, mechanical stress or the like, epipolar lines may intersect or be very close to each other and/or the correspondence between reference feature and reflection feature may be unclear. Further, each known position or object in the real world may be projected onto the reference image and vice versa. The projection may be known due to a calibration of the detector, whereas the calibration is comparable to a teach-in of the epipolar geometry of the specific camera.

The evaluation device may be configured for determining at least one displacement region in the reference image corresponding to the distance estimate. Specifically, the displacement region may be a region in the reference image in which the reference feature corresponding to the selected reflection feature is expected to be located in the reference image. Depending on the distance to the object, an image position of the reference feature corresponding to the reflection feature may be displaced within the reference image compared to an image position of the reflection feature in the reflection image. The displacement region may comprise only one reference feature. The displacement region may also comprise more than one reference feature. The displacement region may comprise an epipolar line or a section of an epipolar line. The displacement region may comprise more than one epipolar line or more sections of more than one epipolar line. The displacement region may extend along the epipolar line, orthogonal to an epipolar line, or both. The evaluation device may be adapted to determine the reference feature along the epipolar line corresponding to the distance feature and to determine an extent of the displacement region along the epipolar line corresponding to the error interval the or orthogonal to an epipolar line. The measurement uncertainty of the distance estimate may result in a displacement region which is non-circular since the measurement uncertainty may be different for different directions. Specifically, the measurement uncertainty along the epipolar line or epipolar lines may be greater than the measurement uncertainty in an orthogonal direction with respect to the epipolar line or epipolar lines. The displacement region may comprise an extend in an orthogonal direction with respect to the epipolar line or epipolar lines. The evaluation device may determine the displacement region around the image position of the reflection feature. The evaluation device may be adapted to determine the distance estimate and to determine the displacement region along the epipolar line corresponding to $\varphi_{1z} \pm \varepsilon$.

The evaluation device may be configured for matching the selected feature of the reflection pattern with at least one feature of the reference pattern within the displacement region. The evaluation device may be configured for matching the selected feature of the reflection image with the reference feature within the displacement region by using at least one evaluation algorithm considering the determined distance estimate. The evaluation algorithm may be a linear scaling algorithm. The evaluation device may be adapted to determine the epipolar line closest to and/or within the displacement region. The evaluation device may be adapted to determine the epipolar line closest to the image position of the reflection feature. The extent of the displacement region along the epipolar line may be larger than the extent of the displacement region orthogonal to the epipolar line. The evaluation device may be adapted to determine an epipolar line before determining a corresponding reference feature. The evaluation device may determine a displacement region around the image position of each reflection feature. The evaluation device may be adapted to assign an epipolar line to each displacement region of each image position of the reflection features, such as by assigning the epipolar line closest to a displacement region and/or within a displacement region and/or closest to a displacement region along a direction orthogonal to the epipolar line. The evaluation device may be adapted to determine the reference feature corresponding to the image position of the reflection feature by determining the reference feature closest to the assigned displacement region and/or within the assigned displacement region and/or closest to the assigned displacement region along the assigned epipolar line and/or within the assigned displacement region along the assigned epipolar line.

The evaluation device may be configured for determining a displacement of the matched reference feature and the selected reflection feature. The evaluation device may be configured for determining a longitudinal information of the matched features using a predetermined relationship between the longitudinal coordinate and the displacement. For example, the longitudinal information may be a distance value. The predetermined relationship may be one or more of an empiric relationship, a semi-empiric relationship and an analytically derived relationship. The evaluation device may comprise at least one data storage device for storing the predetermined relationship, such as a lookup list or a lookup table. The evaluation device may be adapted to determine the pre-determined relationship by using triangulation methods. In case position of the selected reflection feature in the reflection image and position of the matched reference feature and/or relative displacement of the selected reflection feature and the matched reference feature are known, longitudinal coordinate of the corresponding object feature may be determined by triangulation. Thus, the evaluation device may be adapted to select, for example subsequent and/or column by column, a reflection feature and to determine for each potential position of the reference feature the corresponding distance value using triangulation. Displacement and corresponding distance value may be stored in at least one storage device of the evaluation device 132.

Additionally or alternatively, the evaluation device may be configured for performing the following steps:

Determining the displacement region for the image position of each reflection feature;

Assigning an epipolar line to the displacement region of each reflection feature such as by assigning the epipolar line closest to the displacement region and/or within the displacement region and/or closest to the displacement region along a direction orthogonal to the epipolar line;

Assigning and/or determining at least one reference feature to each reflection feature such as by assigning the reference feature closest to the assigned displacement region and/or within the assigned displacement region and/or closest to the assigned displacement region along the assigned epipolar line and/or within the assigned displacement region along the assigned epipolar line.

The evaluation device is configured for determining at least one material feature $\varphi_{2m}$ by applying at least one material dependent image filter $\phi_2$ to the reflection image. The material feature may be or may comprise at least one information about the at least one material property of the object.

The material dependent image filter may be at least one filter selected from the group consisting of: a luminance filter; a spot shape filter; a squared norm gradient; a standard deviation; a smoothness filter such as a Gaussian filter or median filter; a grey-level-occurrence-based contrast filter; a grey-level-occurrence-based energy filter; a grey-level-occurrence-based homogeneity filter; a grey-level-occurrence-based dissimilarity filter; a Law's energy filter; a threshold area filter; or a linear combination thereof; or a further material dependent image filter $\phi_{2other}$ which correlates to one or more of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof by $|\rho_{\phi 2other,\phi m}| \geq 0.40$ with $\phi_m$ being one of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof. The further material dependent image filter $\phi_{2other}$ may correlate to one or more of the material dependent image filters $\phi_m$ by $|\rho_{\phi 2other,\phi m}| \geq 0.60$, preferably by $|\rho_{\phi 2other,\phi m}| \geq 0.80$.

With respect to the description of exemplary material dependent image filter, reference is made to the description of the luminance filter, the spot shape filter, the squared norm gradient, the standard deviation, the smoothness filter such as a Gaussian filter or median filter, the grey-level-occurrence-based contrast filter, the grey-level-occurrence-based energy filter, the grey-level-occurrence-based homogeneity filter, the grey-level-occurrence-based dissimilarity filter, the Law's energy filter, and the threshold area filter given above.

The material dependent image filter may be at least one arbitrary filter $\phi$ that passes a hypothesis testing. The hypothesis testing may comprise testing the material dependency of the image filter by applying the image filter to a predefined data set. The data set may comprise a plurality of beam profile images. The beam profile image may be given by a sum of $N_B$ Gaussian radial basis functions, $$f_k(x, y) = \left| \sum_{l=0}^{N_B-1} g_{lk}(x, y) \right|,$$

$$g_{lk}(x, y) = a_{lk} e^{-(\alpha(x - x_{lk}))^2} e^{-(\alpha(y - y_{lk}))^2}$$

wherein each of the $N_B$ Gaussian radial basis functions is defined by a center $(x_{lk}, y_{lk})$, a prefactor, $a_{lk}$, and an exponential factor $\alpha = 1/\epsilon$. The exponential factor is identical for all Gaussian functions in all beam profile images. The center-positions, $x_{lk}, y_{lk}$, are identical for all images $f_k$: $(x_0, x_1, \ldots, x_{N_B})$, $(y_0, y_1, \ldots, y_{N_B})$. The beam profile images may be generated by using the above formula for $f_k(x, y)$ in combination with the parameter table is displayed in WO 2020/187719 A1.

The values for x, y, are integers corresponding to pixels with $$\binom{x}{y} \in [0, 1, \cdots 31]^2.$$

The images may have a pixel size of 32×32. The dataset of beam profile images may be generated by using the above formula for $f_k$ in combination with a parameter set to obtain a continuous description of $f_k$. The values for each pixel in the 32×32-image may be obtained by inserting integer values from 0, . . . , 31 for x, y, in $f_k(x, y)$. For example, for pixel (6,9), the value $f_k(6,9)$ may be computed. FIG. 3 shows an embodiment of a beam profile image defined by an exemplary data set.

An exemplary data set is presented in WO 2020/187719 A1. The parameter tables in WO 2020/187719 A1 list the center positions, $x_{lk} = x_l$, $y_{lk} = y_l$, of all Gaussian functions $g_{lk}$ for all images $f_k$.

The parameter tables in WO 2020/187719 A1 list the material classifiers, in particular for a white Teflon target (denoted control), a fabric, a dark skin (denoted as dark- _skin), a pale skin (denoted pale_skin), and a highly translucent skin (denoted trans), and the distance z for each image $f_k$, referenced by the image index k.

Figure 7A:
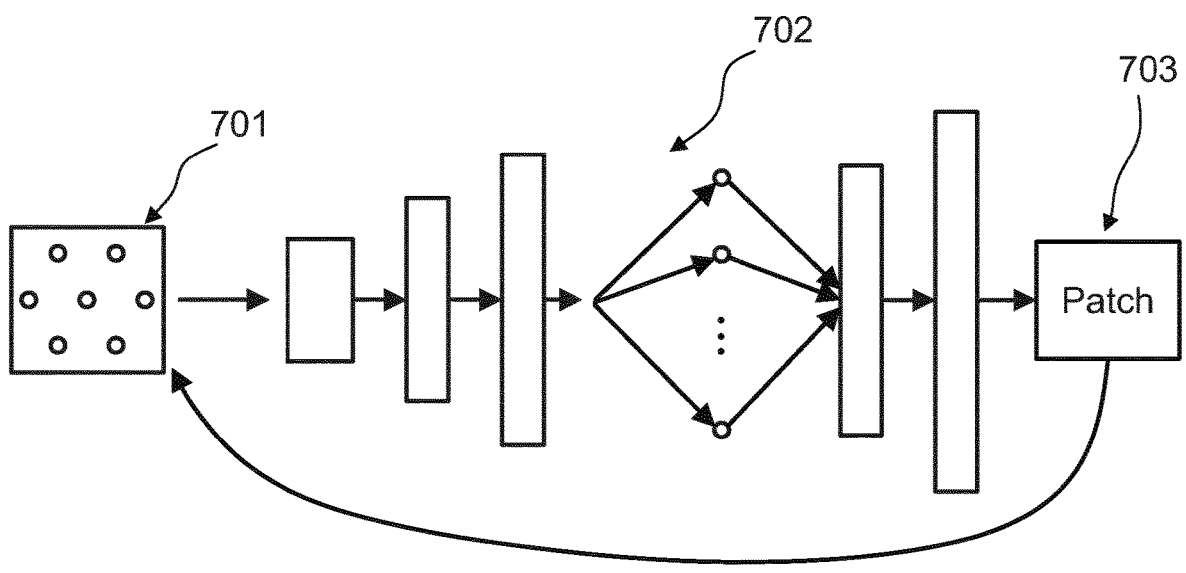
FIGS. 7a-c show schematically and exemplarily an embodiment of generating representation and/or clustering.
Figure 7B:
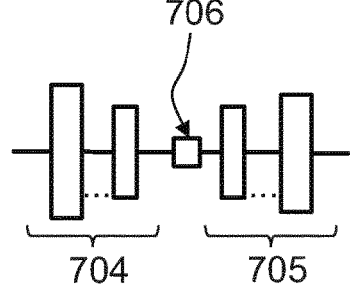
Figure 7C:
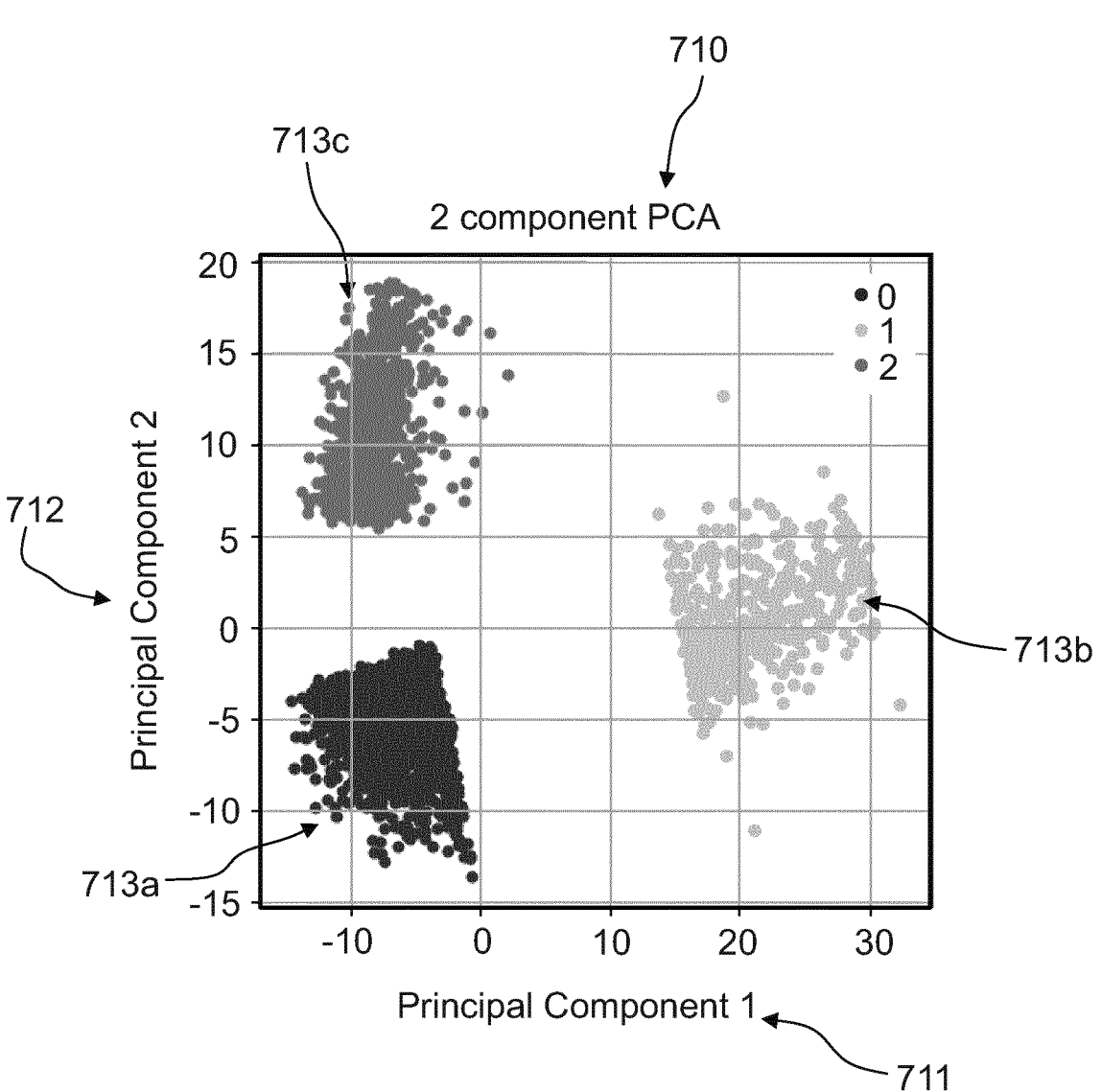

FIGS. 7a and 7b schematically and exemplarily illustrates one process for generating an output 703, representation and/or clustering, out of a partial image 701 via a neural network 702. In particular, for a partial image a low level representation is generated via an autoencoder and/or principle component analysis (PCA). Further, the representation may be clustered. Hence, an embodiment for training for further suppression of background and enhancement of physical information signature by generating representation and clustering is visualized.

After cropping, the signal signature of the texture of the object (background light plus face features) is already randomized. However, such randomization may not be sufficient to extract material information. In particular, for approaches that rely on data-driven models, the attention in the training process needs to be focused on the pattern signature (material) and not the background (face features). Different approaches to further suppress the background signature in the images may be applied.

One process may rely on PCA (Principle component analysis) and/or RBF (Radial basis function (RBF) neural network. In general, via PCA large data sets may be structures by using principal components. This allows data sets to be simplified and illustrated by approximating a large number of statistical variables by a smaller number of linear combinations, i.e. the principal components. By projecting a data point onto only the first few principal components, lower-dimensional data is obtained while preserving as much of the data's variation as possible is preserved. For an embodiment of the invention PCA and/or RBF neural network generate a representation of the partial images. Such representation is a manipulation in the sense of reducing dimensionality of the partial image. The partial image is hence mapped to a lower dimensional representation of the image. The representation is associated with the physical signature embedded in the reflections of the partial image and further suppresses the background signature.

Based on the PCA or RBF mapping representations of the partial images are generated. These may be associated to the corresponding images. Once the representations are generated, they may be assigned to PCA clusters or cluster through an algorithm. As explained, a clustering of patches avoids overfitting, as texture may be suppressed and/or physical features may not be considered. In particular, e.g. masking and augmentation of patches reduces the texture information. A two-dimensional PCA 710 (2 component PCA) is schematically and exemplarily illustrated in FIG. 7c. The PCA 710 comprises a first principal component 711, a second principal component 712 and three clusters 713a-c, that is, a first cluster 713a, a second cluster 713b and a third cluster 713c.

From the representation and potentially the clustering, manipulated image data for extracting material information from a pattern image acquired by an IR sensor is generated. The manipulated image data includes the partial images with at least part or one or more of the pattern features present in the pattern image and at least one representation associated with the physical signature embedded in the reflections of the partial image or at least one class associated with the representation.

Based on such manipulated image data a data driven model can be trained. By manipulating the data in such a way the texture or background signature can be suppressed. This is in contrast to face recognition, where the texture of the object includes the facial features the model is trained on. In material classification it is the pattern and its relation to material signatures the model needs to learn.

FIG. 7b schematically and exemplarily illustrates another process for generating representation and/or clustering. In particular, an embodiment for training for further suppression of background and enhancement of physical information signature by generating representation and/or clustering is visualized. FIG. 7b visualizes an autoencoder, i.e. an encoder-decoder neural network that consists of an encoder neural network 704 and a decoder neural network 705 that are trained to predict and generate the output. In particular, the encoder neural network 704 and/or the decoder neural network 705 may be convolutional neural networks. The manipulation of the partial images is done via a neural network structure including encoder and decoder. The neural network may be a CNN suitable to for image processing. The encoder part 704 of the CNN generates the representation, which is provided to the latent space representation 706, and the decoder part 705 generates the partial image. By comparing the partial image at the input layer of the encoder network with the partial image at the output layer of the decoder network, the representation is trained. Following such training each partial image is associated with one representation trained by the network that further suppresses the background signature by dimensionality reduction. Once the representations are generated, they may be clustered via a clustering algorithm such as k-means or elbow curve. Other clustering methods are possible.

Other options to build low level representations of the partial images are FFT, wavelets, deep learning, like cnns, energy models, normalizing flows, gans, vision transformers, or transformers used for natural language processing, autoregressive image modelling. GANs, Autoregressive Image Modeling, Normalizing Flows, Deep Autoencoders, Deep Energy-Based Models, Vision Transformers. Supervised or unsupervised schemes may be applicable to generate representation, also embedding in e.g. cosine or Euclidian metric in in ML language.

Figure 8:
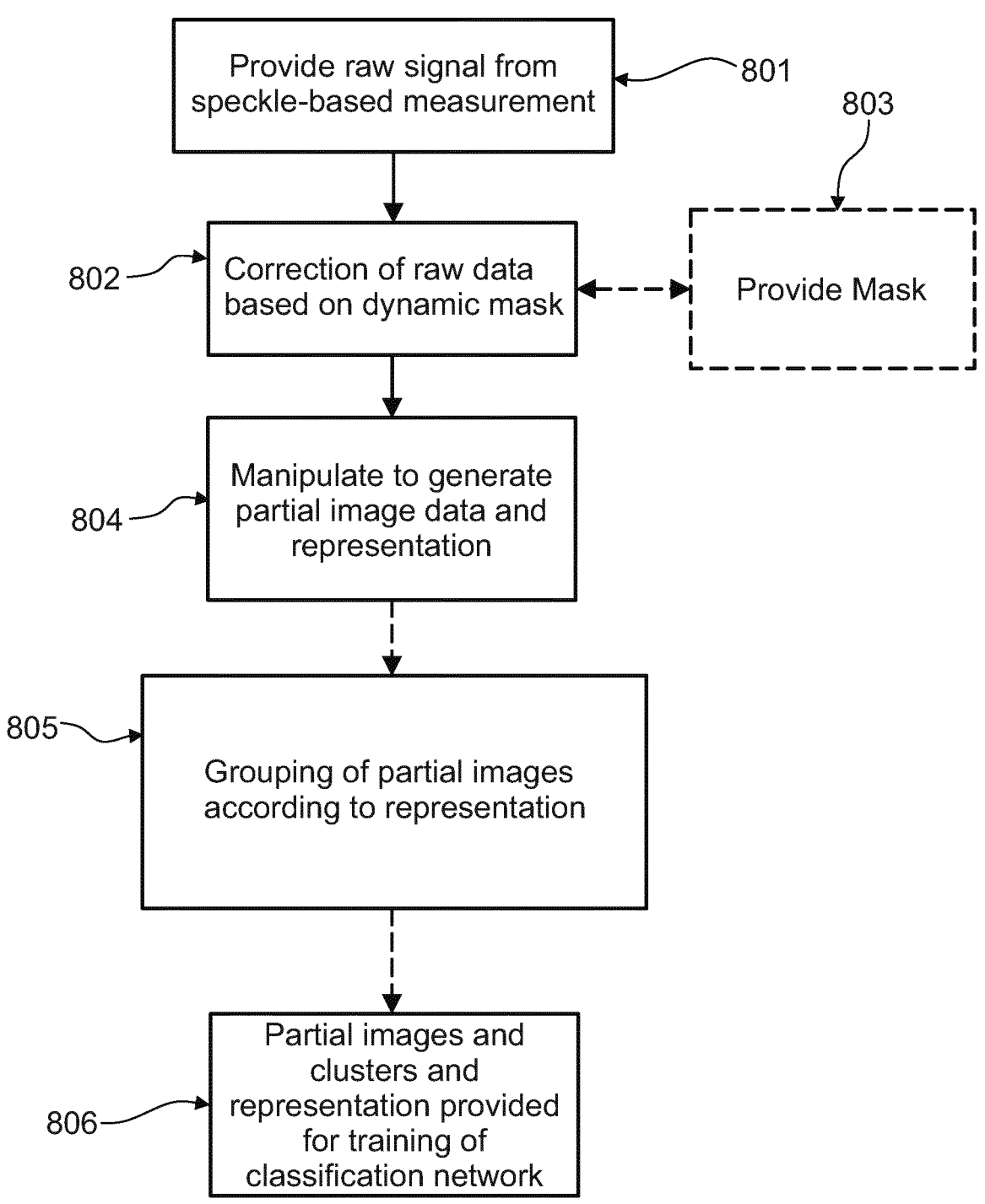
FIG. 8 shows schematically and exemplarily an embodiment of the steps of a training of data driven model for extraction of a skin feature.

FIG. 8 illustrates schematically and exemplarily the steps of a training of data driven model for extraction of a skin feature in one embodiment based on supervised or self-supervised learning, in particular, a training embodiment of a classifier network. The attention in the training process is focused on the pattern signature (material), and not the background (face features). Hence, the model is trained on physical information and not on e.g. features of a face. In particular, the flowchart comprises the following steps:

Providing raw signal from speckle-based measurement 801. Thereby, a grating structure may arise either by a laser array or a diffractive diffraction grating. Even for a pseudo random grating, material information may be determined. Next, raw data is corrected based on dynamic mask (step 802), that may be provided in step 803. A patch size may relate to the camera resolution, the distance regime, the type of object, the field of view, or the like. A mask may be generated dynamically or may be pre-defined. The dynamical adaption may be based on a face recognition from infrared or RGB image flood light and/or the determination of landmarks. For example, via landmark detection and the use of corresponding masks, glasses, beard, or the like may be detected.

In step 804, manipulation to generate partial image data and representation as described above. Next, partial images are grouped according to the representation (step 805). Patches (e.g. randomizer, physical randomizer without digital, etc) may further be augmented. Finally, in step 806, one or more partial images and/or one or more clusters and/or one or more representations provided for training of classification network. The clusters may comprise additional annotations e.g. per masks silicon, latex mask plus brand; external context from metadata, glasses, beard and/or other facial features as image contexts.

The manipulated data may include known data for the partial images. For instance, the training data set of pattern images may be labelled with skin/no-skin labels. Such labels may be carried through the manipulation for the partial images.

The manipulated data including representation, label and/or cluster may be fed into a classifier network such as CNNs using supervise or self-supervised learning techniques. For example, Resnet, triplet loss, npx loss or npair loss may be used. The representation and/or the cluster may be used as input on the input layer of the network or via the model loss function, e.g. via contrastive divergence loss function. In this way the manipulated data including representation and/or cluster are part of the model's training process. In addition, cost function, error function, objective function, key representation and/or cluster may be included in training.

The method may include contrastive self-supervised building representations by learning the differences or similarities between partial images. Contrastive learning is a classification algorithm where the data is classified on the basis of similarity and dissimilarity. In the algorithm of contrastive learning, inner workings can be completed by learning an encoder f such that: Score(f(x),f(x+))>>score(f(x),f(x−)). Thereby x+ can be considered as a positive sample which similar to x and x− can be considered as a negative sample which is dissimilar to x. Score is a function for measuring the similarity level between two samples.

An embedding or representation is a mapping of a discrete—categorical—variable to a vector of continuous numbers. In the context of neural networks, embeddings are low-dimensional, learned continuous vector representations of discrete variables. Neural network embeddings are useful because they reduce the dimensionality of categorical variables and meaningfully represent categories in the transformed space.

Neural network embeddings are learned low-dimensional representations of discrete data as continuous vectors. These embeddings overcome the limitations of traditional encoding methods and can be used for purposes such as finding nearest neighbors, input into another model, and visualizations.

Embeddings may be used to project representation or embedding to human skin—no skin.

The material information extracted from the trained model may relate to the labels. If the label is a binary classifier discriminating between material and no-material, e.g. material to classify and negative control material, or human skin/no human skin the network classifies partial images accordingly. If the labels include more metadata such as additional annotations per masks, mask materials like silicon, latex mask or mask brand. Additional metadata may include external context like facial features such as beard, glasses, hat or the like.

Figure 9A:
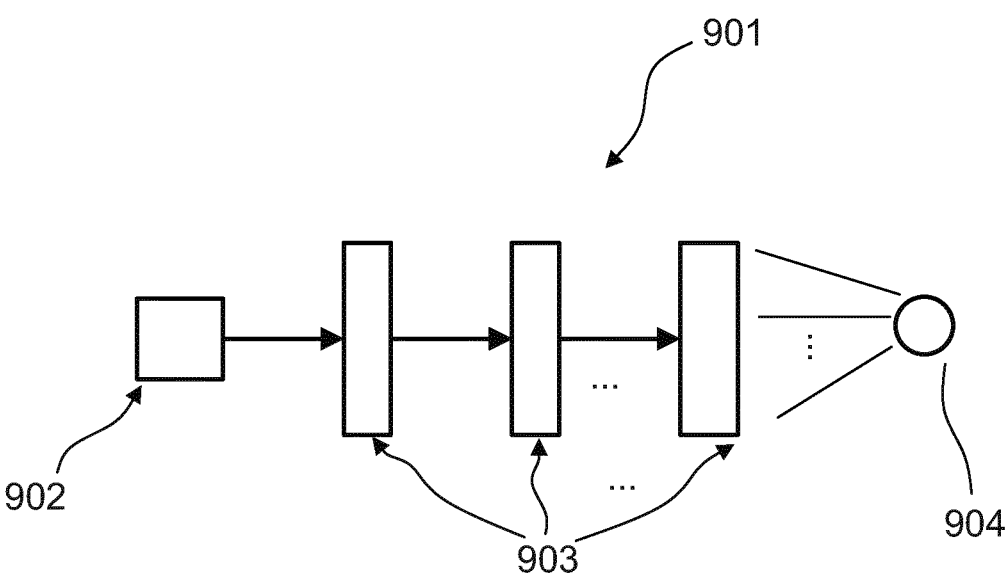
FIG. 9a shows schematically and exemplarily an embodiment of data driven model for extraction of a skin feature.

FIG. 9a illustrates schematically and exemplarily a data driven model 901 for extraction of one or more features, e.g. a skin feature etc., that is, an embodiment of a (classifier) network to be trained.

The model 901 may be a NN or a CNN. Input 902, e.g. the patch as described above, is provided to the model 901. The model 901 inter alia comprises plurality of layers 903

(e.g. input layer, hidden layers, output layer etc.) and outputs an output 904. In an embodiment the output layer comprises a classifier and/or a heatmap, or the like.

The training of the model 901 is performed, as described with respect to FIG. 8. Hence, training data set (i.e. input 902) may comprise one or more (manipulated) images, one or more representations, one or more cluster and/or one or more labels. The training data set preferably refers to historical data. The information extracted from the trained model (i.e. output 904) may relate to the label, that is, the model 901 classifies according to the one or more labels. A label may a binary classifier discriminating between material and no-material, or human skin/no human skin, etc. The one or more labels may include metadata, as described with respect to FIG. 8. In an embodiment the training may be based on supervised or self-supervised learning.

Generally, for training the model the same rules for outputting the one or more labels are applied that are later applied during appliance of the model. In an embodiment, one or more (manipulated) images, one or more represen- tations and/or one or more cluster in the training data set may be generated in accordance with the above described principles and rules. In particular, any known training method for training respective machine learning based algo- rithms like neural networks or convolutional neural net- works may be utilized. After the training process, the model 901 is adapted to identify one or more labels when provided with the described input data. The trained model can then be provided to the device, e.g. the mobile (computing) device, etc. As the model 901 may be trained on manipulated image data, e.g. image data after the described manipulation, the size of the model can be reduced. As a result, storage and processing of the model on the mobile (computing) device can be significantly reduced.

Figure 9B:
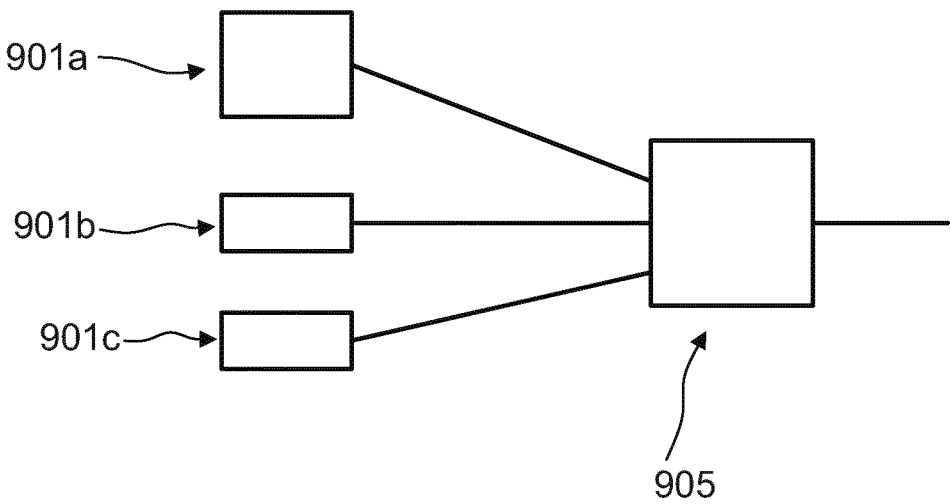
FIG. 9b illustrates schematically and exemplarily the training of ensembles.

FIG. 9b illustrates schematically and exemplarily the training of ensembles. For one or more clusters a stack of ensembles may be trained. That is multiple classifier net- works 901a, 901b and 901c, as described with respect to model 901 of FIG. 9a, are trained per each cluster and/or for different set of clusters. The multiple classifier networks 901a, 901b and 901c may be identical to a certain degree or may be different from each other, as long as all of them are able of processing the comparable input data to yield com- parable outputs. FIG. 9b illustrates schematically and exem- plarily three classifier networks 901a, 901b and 901c, how- ever, any arbitrary positive number of classifier networks may be applied for ensemble training.

Generally, NNs or CNNs may have a high variance. Inter alia by using one or more ensembles and applying ensemble learning, the variance of such a (NN or CNN) model may be reduced. That is multiple models may be trained instead of a single model and the respective predictions from these models may be combined. This solves the technical problem of reducing the variance of predictions, and also results in better predictions. Generally, ensemble learning comprises training of more than one model on the same dataset and combining the predictions of each model in some way to make a final outcome or prediction, which may be the most stable and best possible prediction.

In particular, a collection of models may be trained with the same configuration and different initial random weights is trained on the same dataset. Each model is then used to make a prediction and all such predictions may be averaged or the prediction of the model with the highest confidence level may be selected, to be final output prediction of the ensemble. In various embodiments variations of the follow- ing may apply: training data (i.e. the choice of data used to train each model in the ensemble may be varied), ensemble models (i.e. the choice of the respective models used in the ensemble may be varied) and/or combinations (the manner of how outcomes from ensemble members are combined may be varied).

Regarding the variation of combinations the following embodiments are possible: Based on test data set the con- fidence level of each trained model may be compared and the model with highest confidence level is selected or an average of the predictions from more than one, possibly all, ensemble members is calculated. In an embodiment, average weights may apply, that is, the predictions from each model may be weighted. This provides a weighted average ensemble. In addition, the weights may optimized using a hold-out validation dataset. Alternatively or in addition, stacking may apply, that is a new model may be used to learn how to best combine the predictions from each ensemble member. This new model may be a linear model, a nonlinear model that may further consider a specific input sample in addition to the predictions provided by each ensemble member. Alternatively or in addition, boosting may apply, that is one or more new ensemble members may be added in order to correct the mistakes of prior models. As a result, the variation of combinations may relate to ensemble methods for NNs or CNNs comprising Model Averaging Ensemble, Weighted Average Ensemble, Stacked Generalization (stacking) Ensemble, Boosting Ensemble and/or Model Weight Averaging Ensemble, etc.

Figure 10A:
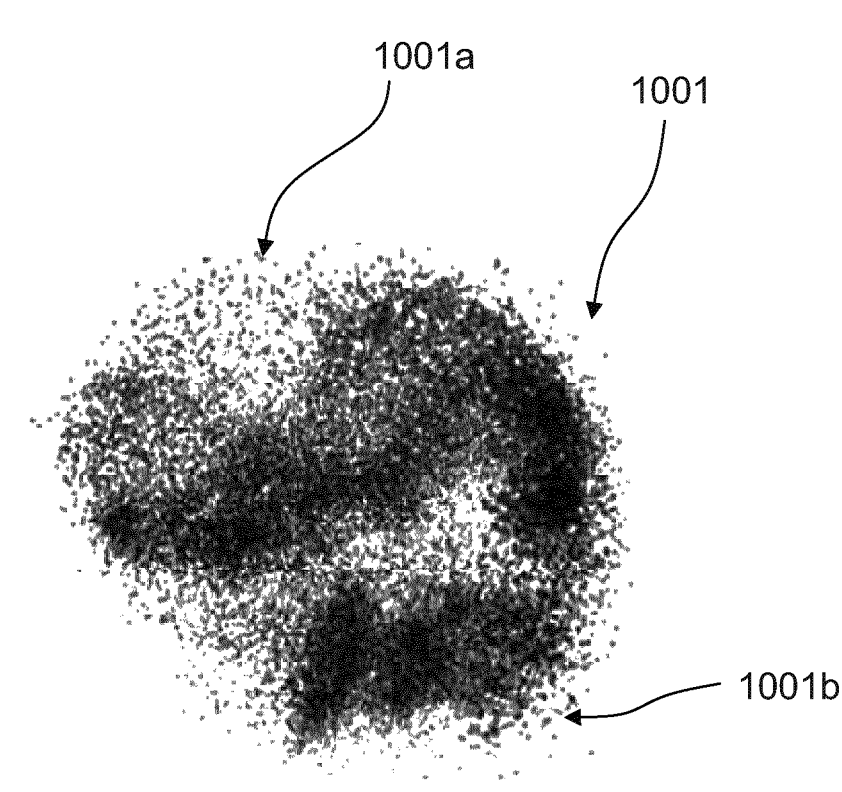
FIGS. 10a, b show schematically and exemplarily an embodiment of clusters of partial images and their material vector human skin/no human skin.
Figure 10B:
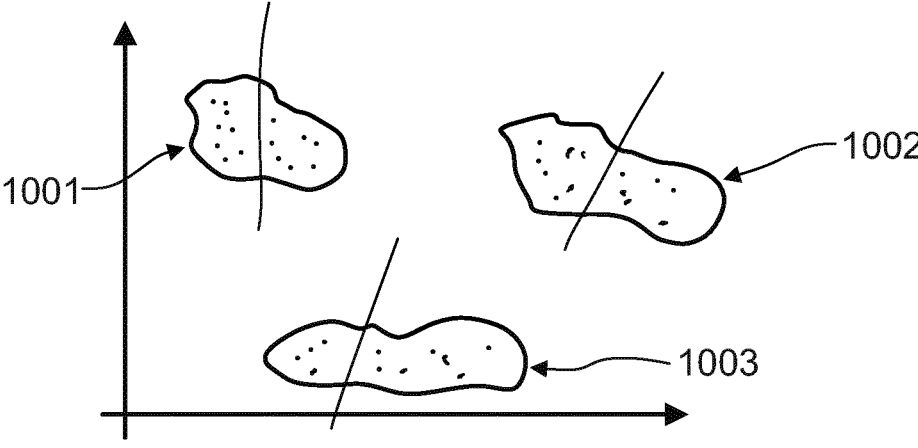

FIGS. 10a and 10b illustrates schematically and exem- plarily a classification per cluster, i.e. clusters 1001, 1002, 1003 of partial images and a classification via a binary classifier, e.g. their material vector human skin 1001a or no human skin 1001a.

Figure 11:
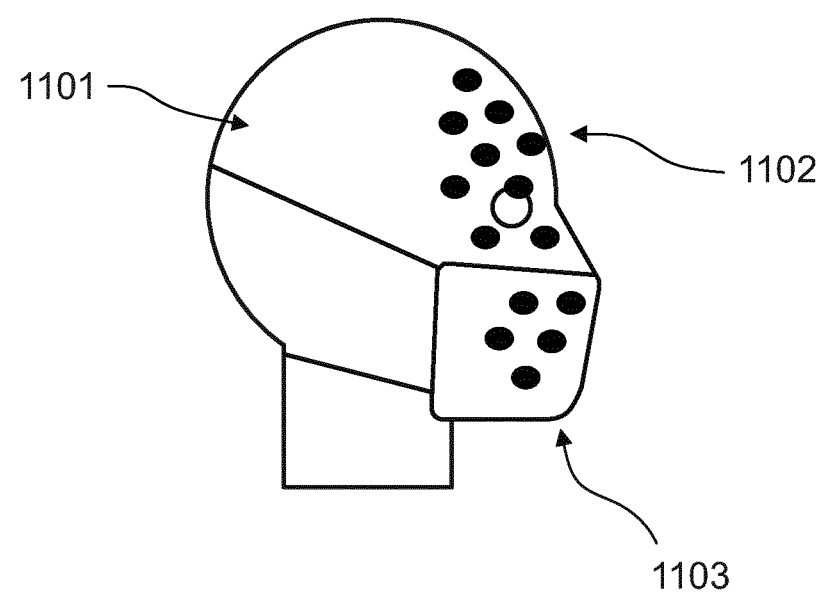
FIG. 11 shows schematically and exemplarily a situation where the user wears a mask and the face is partially occluded.

FIG. 11 illustrates schematically and exemplarily a situ- ation where a user 1101 wears a mask 1103 and the face of the user is partially occluded while being illuminated with a pattern 1102.

Figure 12A:
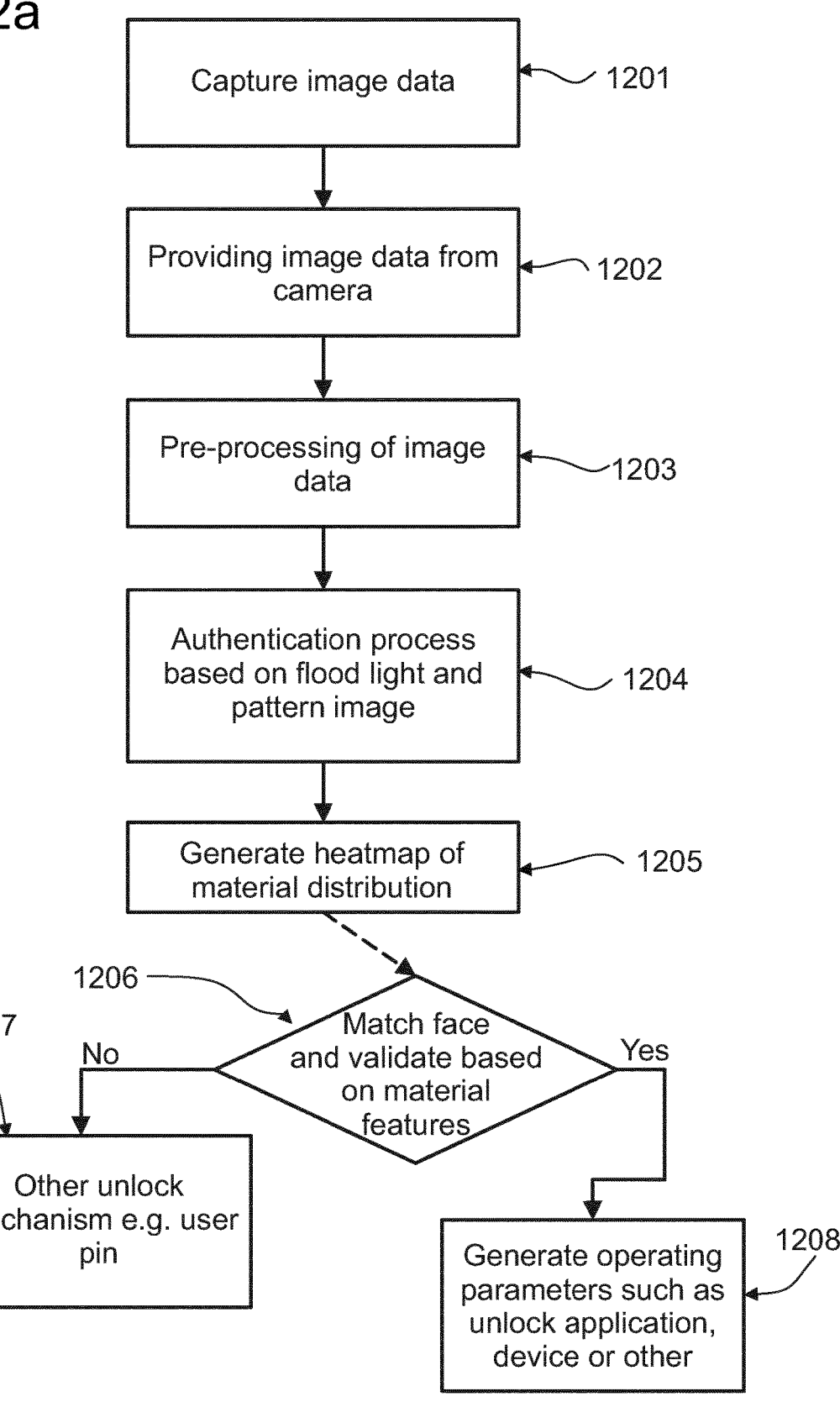
FIGS. 12a, b show schematically and exemplarily an embodiment of generation of a heatmap of material distribution.
Figure 12B:
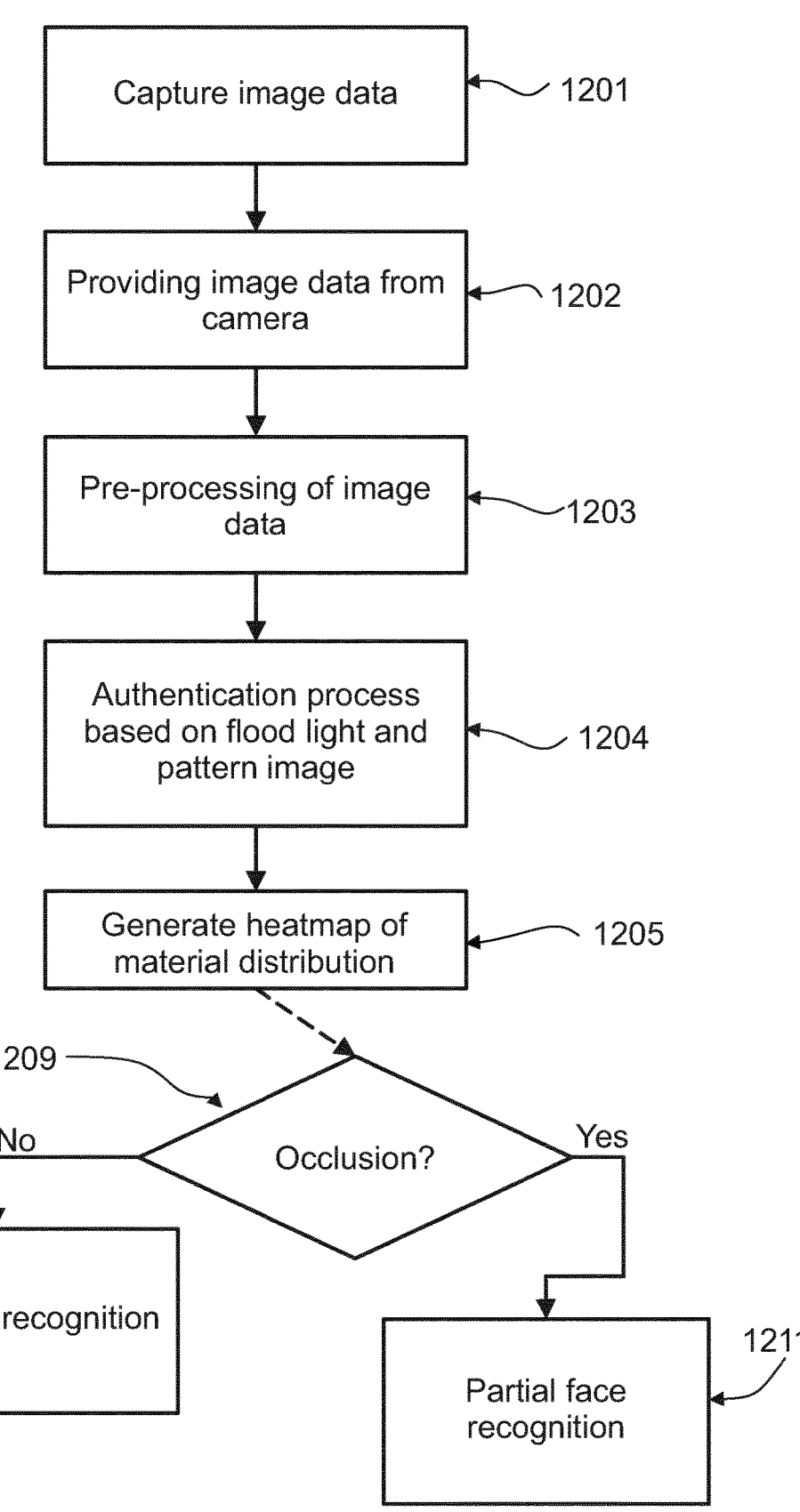

FIGS. 12a and 12b illustrates generation of a heatmap of material distribution and use in face authentication process for validation. The flowchart comprises the steps of captur- ing image data of flood light image and/or pattern image 1201, providing the image data from camera 1202, prepro- cessing of image data 1203, authentication process based on flood light image and/or pattern image 1204, generating a heatmap of material distribution 1205. In case face matching and validating based on material features in step 1206 yields "No", other unlock mechanism e.g. user pin, etc. may apply in step 1207. In case step 1206 yields "Yes", operating parameters such as unlock application, device or other are generated in step 1208. With respect to FIG. 12b, in case an occlusion not is detected in step 1209, a full face recognition is performed in step 1210. In contrast, in case an occlusion is detected in step 1209, a partial face recognition is per- formed in step 1211.

State of the art e.g. EP3623995A1, US2019080149A1 has to use complex algorithms and determination to detect occlusions.

These drawbacks are overcome by the invention, as material information may be extracted and identification and/or authentication is based on the material information. In addition, the extraction of material information allows for more reliable and simpler occlusion detection. In particular, consistency checks based on the material information extraction may apply.

Based on the material detection the results for the partial images may be stitched together again to the full image. This way the material distribution of the face may be determined, and a corresponding heatmap of material distribution may be generated.

Based on such material distribution, possible occlusions, such as a mask, etc. may be determined. These may be associated with landmarks like eyes, mouths or the like from the flood light image.

Based on such material distribution associated with landmarks a rule set may be used to validate the face authentication process. E.g. if a mask is associated with the eye landmark the process may be stopped. If it is associated with the mouth landmark the process may be validated. Similarly features like beard, glasses, hat, scarf or the like may undergo a rule based consistency check to prevent spoofing attacks and increase the security level.

Further based on such material distribution associated with landmarks the occlusion may be specified. If the face is not occluded, a full face recognition is performed. If the face is occluded partial face recognition may be performed. To perform such face recognition, the amount of occlusion may be determined from material heatmap. If it is below a threshold and validated via the rule set, the partial face recognition may be performed. One or more occlusion scores from the material heat map may be generated for the face in the at least one image. Aligning the at least one material heat map with the position of the landmark allows for evaluating the amount of occlusion of the face. In particular it may comprise evaluating the amount of occlusion of the nose and mouth on the face in the at least one image. Furthermore, the analysis may include evaluating the amount of occlusion of the face comprises determining a material type such as a mask type. Based on such determination the occlusion may be cut out of the at least one flood light image for the partial facial authentication process.

Other variations to the disclosed embodiments can be understood and effected by those skilled in the art in practicing the claimed invention, from a study of the drawings, the disclosure, and the appended claims.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the receiving of the pattern image, the selecting of the feature patterns, the cropping of the pattern image, the determining of the identity of the object, etc. performed by one or several units or devices can be performed by any other number of units or devices. These procedures can be implemented as program code means of a computer program and/or as dedicated hardware.

A computer program product may be stored/distributed on a suitable medium, such as an optical storage medium or a solid-state medium, supplied together with or as part of other hardware, but may also be distributed in other forms, such as via the Internet or other wired or wireless telecommunication systems.

Any units described herein may be processing units that are part of a classical computing system. Processing units may include a general-purpose processor and may also include a field programmable gate array (FPGA), an application specific integrated circuit (ASIC), or any other specialized circuit. Any memory may be a physical system memory, which may be volatile, nonvolatile, or some combination of the two. The term "memory" may include any computer-readable storage media such as a non-volatile mass storage. If the computing system is distributed, the processing and/or memory capability may be distributed as well. The computing system may include multiple structures as "executable components". The term "executable component" is a structure well understood in the field of computing as being a structure that can be software, hardware, or a combination thereof. For instance, when implemented in software, one of ordinary skill in the art would understand that the structure of an executable component may include software objects, routines, methods, and so forth, that may be executed on the computing system. This may include both an executable component in the heap of a computing system, or on computer-readable storage media. The structure of the executable component may exist on a computer-readable medium such that, when interpreted by one or more processors of a computing system, e.g., by a processor thread, the computing system is caused to perform a function. Such structure may be computer readable directly by the processors, for instance, as is the case if the executable component were binary, or it may be structured to be interpretable and/or compiled, for instance, whether in a single stage or in multiple stages, so as to generate such binary that is directly interpretable by the processors. In other instances, structures may be hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. Any embodiments herein are described with reference to acts that are performed by one or more processing units of the computing system. If such acts are implemented in software, one or more processors direct the operation of the computing system in response to having executed computer-executable instructions that constitute an executable component. Computing system may also contain communication channels that allow the computing system to communicate with other computing systems over, for example, network. A "network" is defined as one or more data links that enable the transport of electronic data between computing systems and/or modules and/or other electronic devices. When information is transferred or provided over a network or another communications connection, for example, either hardwired, wireless, or a combination of hardwired or wireless, to a computing system, the computing system properly views the connection as a transmission medium. Transmission media can include a network and/or data links which can be used to carry desired program code means in the form of computer-executable instructions or data structures and which can be accessed by a general-purpose or special-purpose computing system or combinations. While not all computing systems require a user interface, in some embodiments, the computing system includes a user interface system for use in interfacing with a user. User interfaces act as input or output mechanism to users for instance via displays.

Those skilled in the art will appreciate that at least parts of the invention may be practiced in network computing environments with many types of computing system configurations, including, personal computers, desktop computers, laptop computers, message processors, handheld devices, multi-processor systems, microprocessor-based or programmable consumer electronics, network PCs, minicomputers, main-frame computers, mobile telephones, PDAs, pagers, routers, switches, datacenters, wearables, such as glasses, and the like. The invention may also be practiced in distributed system environments where local and remote computing system, which are linked, for example, either by hardwired data links, wireless data links, or by a combination of hardwired and wireless data links, through a network, both perform tasks. In a distributed system environment, program modules may be located in both local and remote memory storage devices.

Those skilled in the art will also appreciate that at least parts of the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources, e.g., networks, servers, storage, applications, and services. The definition of "cloud computing" is not limited to any of the other numerous advantages that can be obtained from such a model when deployed. The computing systems of the figures include various components or functional blocks that may implement the various embodiments disclosed herein as explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems shown in the figures may include more or less than the components illustrated in the figures and some of the components may be combined as circumstances warrant.

Any reference signs in the claims should not be construed as limiting the scope.

As used herein "determining" also includes "initiating or causing to determine", "generating" also includes "initiating and/or causing to generate" and "providing" also includes "initiating or causing to determine, generate, select, send and/or receive". "Initiating or causing to perform an action" includes any processing signal that triggers a computing node or device to perform the respective action.

In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Any disclosure and embodiments described herein relate to the methods, the systems, devices, the computer program element lined out above and vice versa. Advantageously, the benefits provided by any of the embodiments and examples equally apply to all other embodiments and examples and vice versa.

The invention claimed is:

1. A method for authorizing an object of a device to perform at least one operation on the device that requires authentication, comprising the steps:
    receiving, from a user interface associated with a device, an unlock request for the device from a user;
    in response to receiving the unlock request, triggering illumination of the object with patterned infrared illumination, wherein the patterned infrared illumination is an irregular dot pattern;
    triggering to capture at least one pattern image of the object using a camera located on the device while the object is being illuminated with the patterned infrared illumination;
    triggering to capture at least one flood image showing the object while it is illuminated with flood light, determining an outline of the object indicating the position and extent of the object from the flood image;
    extracting material data of the object from the at least one pattern image, wherein the material data is extracted from the intensity distribution of the dots reflected by the object, wherein the extracting of material data comprises manipulating the pattern image to generate a partial image using the outline of the object and extracting material data of the object from the partial image by providing the partial image to a data-driven model, wherein the data-driven model is parametrized according to a training data set including partial images and material data to map the partial image to a material classifier signifying the material, and determining a material heat map signifying the material distribution in the partial image, wherein the material data comprising a material class and/or a material type; and
    allowing or declining the object to perform at least one operation on the device that requires authentication based on the material data.

2. The method according to claim 1, wherein, the capturing of the at least one pattern image comprises capturing the at least one image of the object using the camera located on the device while the object is being illuminated with the patterned infrared illumination.

3. The method according to claim 1, wherein the authenticating uses a facial recognition authentication process operating on the pattern image and/or the extracted material data.

4. The method according to claim 3, wherein the authentication process is validated based on the extracted material data.

5. The method according to claim 4, wherein the validating based on the extracted material data comprises determining if the extracted material data corresponds to a desired material data.

6. The method according to claim 4, wherein the authentication process or its validation comprises generating at least one feature vector from the material data and matching the material feature vector with associate reference template vector for a material.

7. The method according to claim 6, wherein the material feature vector comprises a representation of the luminance or translucence included in the material data.

8. The method according to claim 1, wherein the patterned infrared illumination is a regular pattern and/or a periodic pattern with pattern features per face area at a distance of 5-200 cm.

9. The method according to claim 1, wherein the extracting of material data comprises performing a beam profile analysis by applying an image filter on pattern features of the image.

10. The method according to claim 1, wherein the operation requiring authentication comprises unlocking the device.

11. The method according to claim 1, wherein the manipulating of the pattern image comprises: suppressing texture information from the object located in a region of interest; and/or partitioning the pattern image and/or data of the pattern image; and/or cropping the pattern image to a partial image; and/or determining a bounding box for the region of interest in the image and cropping the image to extract the region of interest.

12. A device for authorizing a user of a device to perform at least one operation on the device that requires authentication, the device comprising a processor configured to perform the following steps:

receiving, from a user interface associated with a device, an unlock request for the device from a user;

in response to receiving the unlock request, triggering illumination of the object with patterned infrared illumination, wherein the patterned infrared illumination is an irregular dot pattern;

triggering to capture at least one pattern image of the object using a camera located on the device while the object is being illuminated with the patterned infrared illumination;

triggering to capture at least one flood image showing the object while it is illuminated with flood light, determining an outline of the object indicating the position and extent of the object from the flood image;

extracting material data of the object from the at least one pattern image, wherein the material data is extracted from the intensity distribution of the dots reflected by the object, wherein the extracting of material data comprises manipulating the pattern image to generate a partial image using the outline of the object and extracting material data of the object from the partial image by providing the partial image to a data-driven model, wherein the data-driven model is parametrized according to a training data set including partial images and material data to map the partial image to a material classifier signifying the material, and determining a material heat map signifying the material distribution in the partial image, wherein the material data comprising a material class and/or a material type; and allowing or declining the object to perform at least one operation on the device that requires authentication based on the material data.

13. A computer program for authorizing a user of a device to perform at least one operation on the device that requires authentication, wherein the computer program is recorded on a non-transitory computer readable medium;

the computer program including instructions causing a computer to execute the steps of the method according to claim 1.

14. The method according to claim 1, wherein the patterned infrared illumination is a regular pattern and/or a periodic pattern with at least 2 pattern features per face area at a distance of 5-200 cm.

15. The method according to claim 1, wherein the patterned infrared illumination is a regular pattern and/or a periodic pattern with at least 2 pattern features per face area at a distance of 30-60 cm.

16. The method according to claim 1, wherein the patterned infrared illumination is a regular pattern and/or a periodic pattern with at least 20 pattern features per face area at a distance of 15-80 cm.

17. The method according to claim 1, wherein the extracting of material data comprises performing a beam profile analysis by applying a material dependent image filter on pattern features of the image.

18. The method according to claim 11, wherein the region of interest is a face of the user.

\* \* \* \* \*